US008255306B1

(12) United States Patent
Thomson

(10) Patent No.: US 8,255,306 B1
(45) Date of Patent: Aug. 28, 2012

(54) IDENTIFICATION OF BUSINESSES WITH POTENTIAL TO ACHIEVE SUPERIOR REVENUE GROWTH AND FINANCIAL PERFORMANCE

(76) Inventor: David G. Thomson, Overland Park, KS (US)

( * ) Notice: Subject to any disclaimer, the term of this patent is extended or adjusted under 35 U.S.C. 154(b) by 237 days.

(21) Appl. No.: 12/579,147

(22) Filed: Oct. 14, 2009

Related U.S. Application Data

(63) Continuation of application No. 10/994,212, filed on Nov. 19, 2004, now abandoned.

(60) Provisional application No. 60/524,414, filed on Nov. 21, 2003.

(51) Int. Cl.
*G06Q 40/00* (2012.01)
(52) U.S. Cl. .......................................... 705/35; 705/38
(58) Field of Classification Search .................... 705/35, 705/38
See application file for complete search history.

(56) References Cited

U.S. PATENT DOCUMENTS

| | | | |
|---|---|---|---|
| 6,856,972 B1 * | 2/2005 | Yun et al. ..................... 705/36 R |
| 7,236,940 B2 * | 6/2007 | Chappel ....................... 705/7.31 |
| 2002/0169658 A1 * | 11/2002 | Adler ............................. 705/10 |
| 2004/0068431 A1 * | 4/2004 | Smith et al. ..................... 705/10 |
| 2004/0073442 A1 * | 4/2004 | Heyns et al. ...................... 705/1 |
| 2004/0128174 A1 * | 7/2004 | Feldman ........................... 705/7 |
| 2004/0128187 A1 * | 7/2004 | Neuberger et al. ............. 705/10 |

* cited by examiner

*Primary Examiner* — Thomas Dixon
*Assistant Examiner* — Benjamin S Fields
(74) *Attorney, Agent, or Firm* — Harness, Dickey & Pierce, P.L.C.

(57) ABSTRACT

A method of identifying target businesses with above-average potential to achieve a selected financial performance target, in accordance with the principles of one embodiment of this invention comprises identifying a plurality of model businesses which have already achieved the selected financial performance target; identifying financial statistics common to the identified model businesses; and screening target businesses for the financial statistics common to the identified businesses. The financial statistics preferably include: at least one of historic annual sales, annual sales growth rates, and time since found to exceed selected annual sales thresholds, gross margins, SG&D, R & D expense, EBIDTA, cash flow from operations, market capitalization.

20 Claims, 69 Drawing Sheets

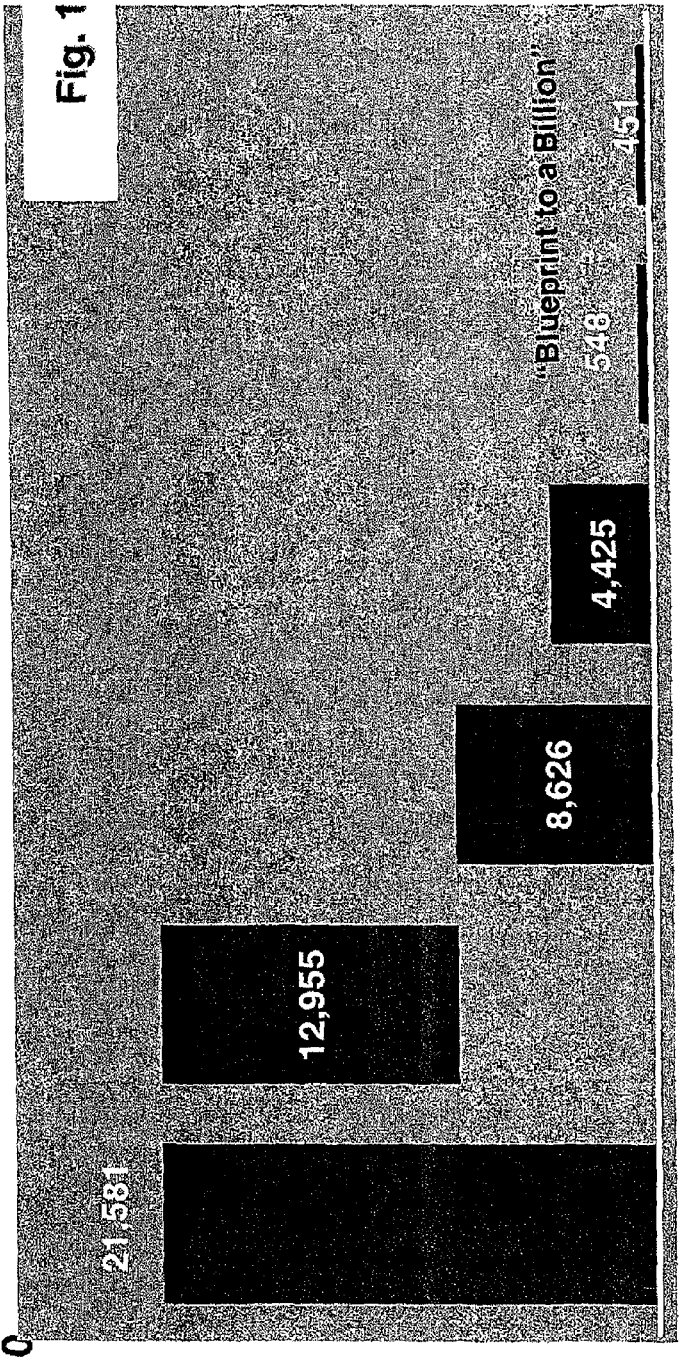

REVENUE GROWTH- THE MASSES VS THE BLUEPRINT COMPANIES
Revenue
$ Millions
*ILLUSTRATIVE EXAMPLES*
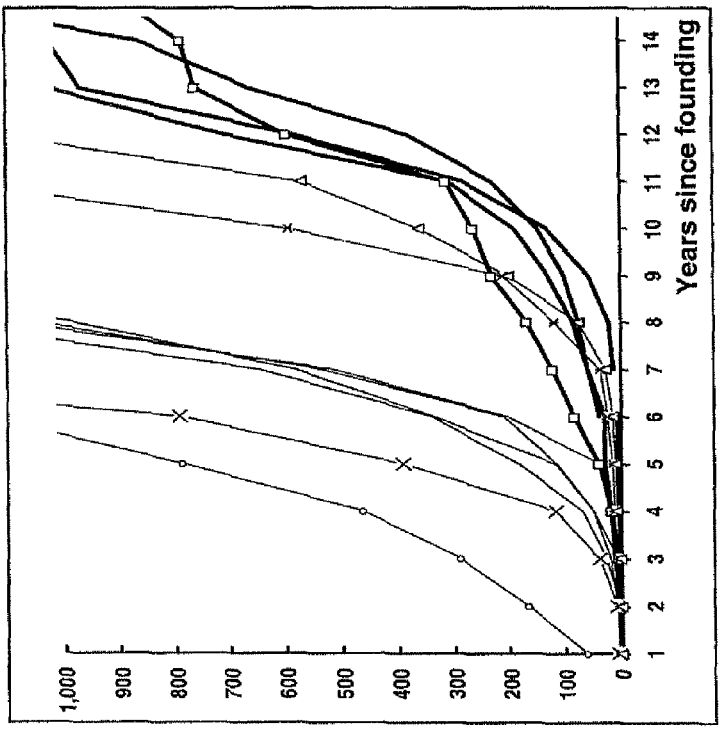
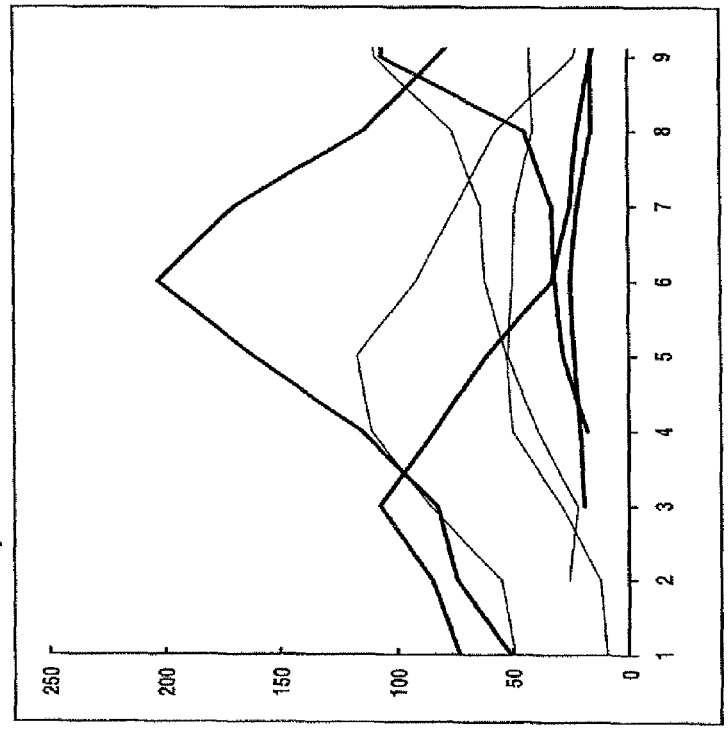
Fig. 2A
Source: Compustat

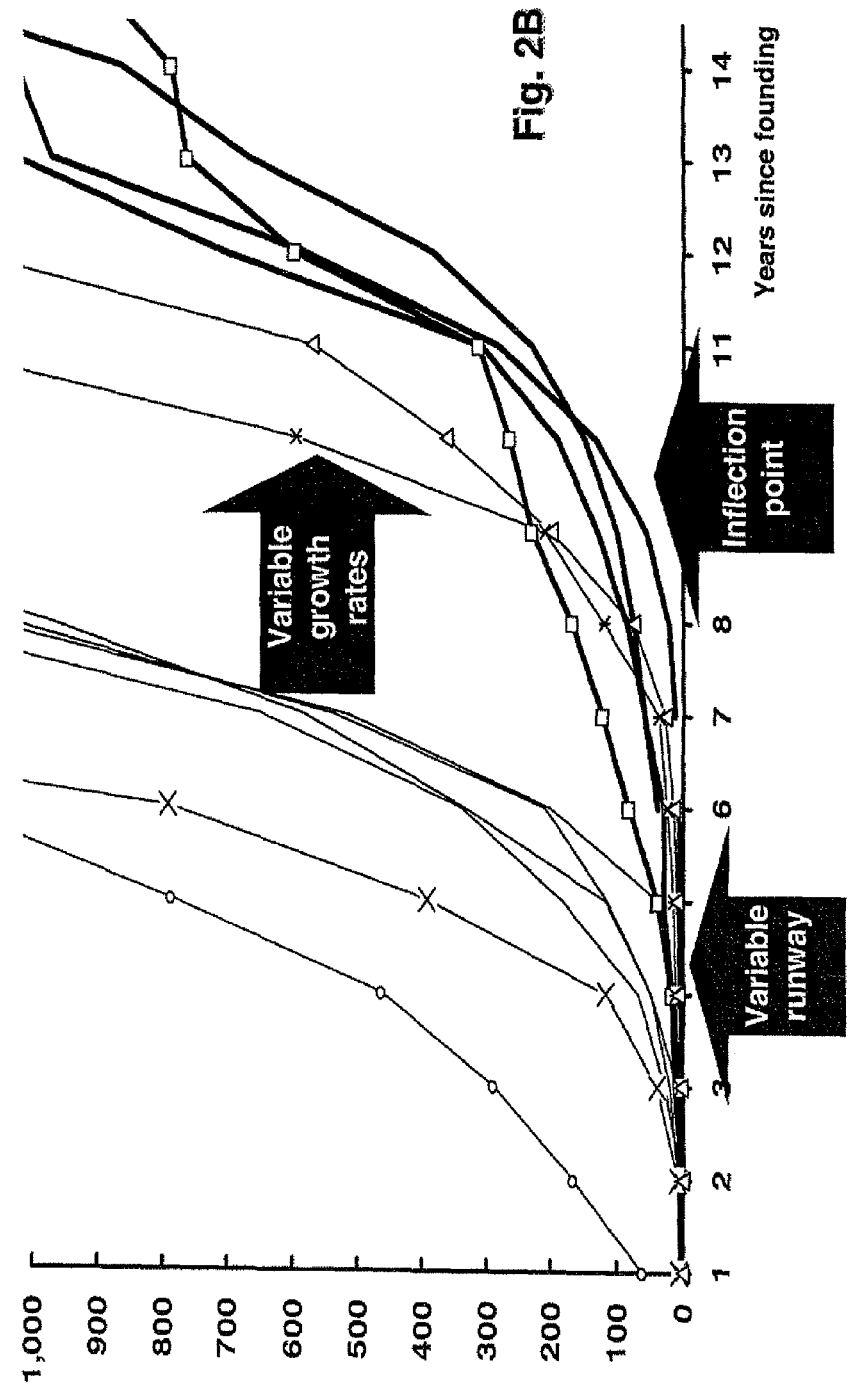

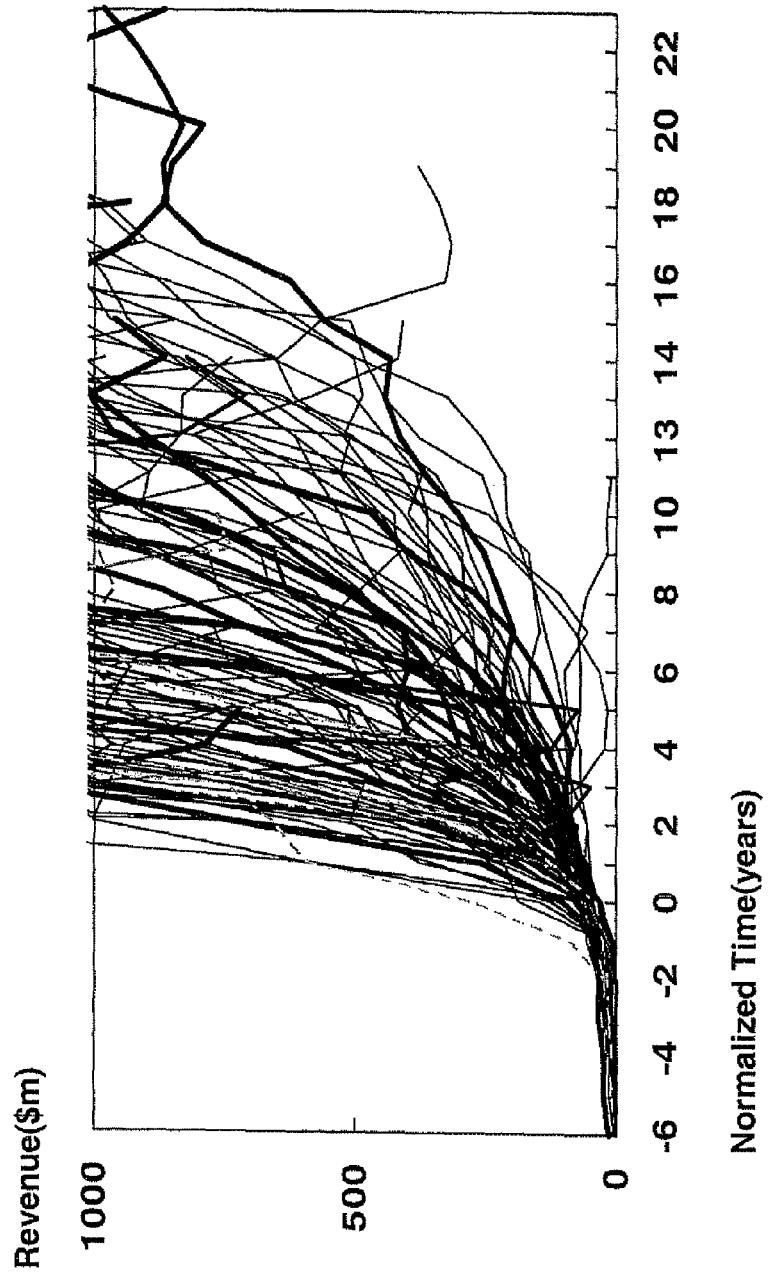
Fig. 2C COMPANIES WITH EXPONENTIAL REVENUE GROWTH TO $1B REVENUE
Source: RBC, team analysis

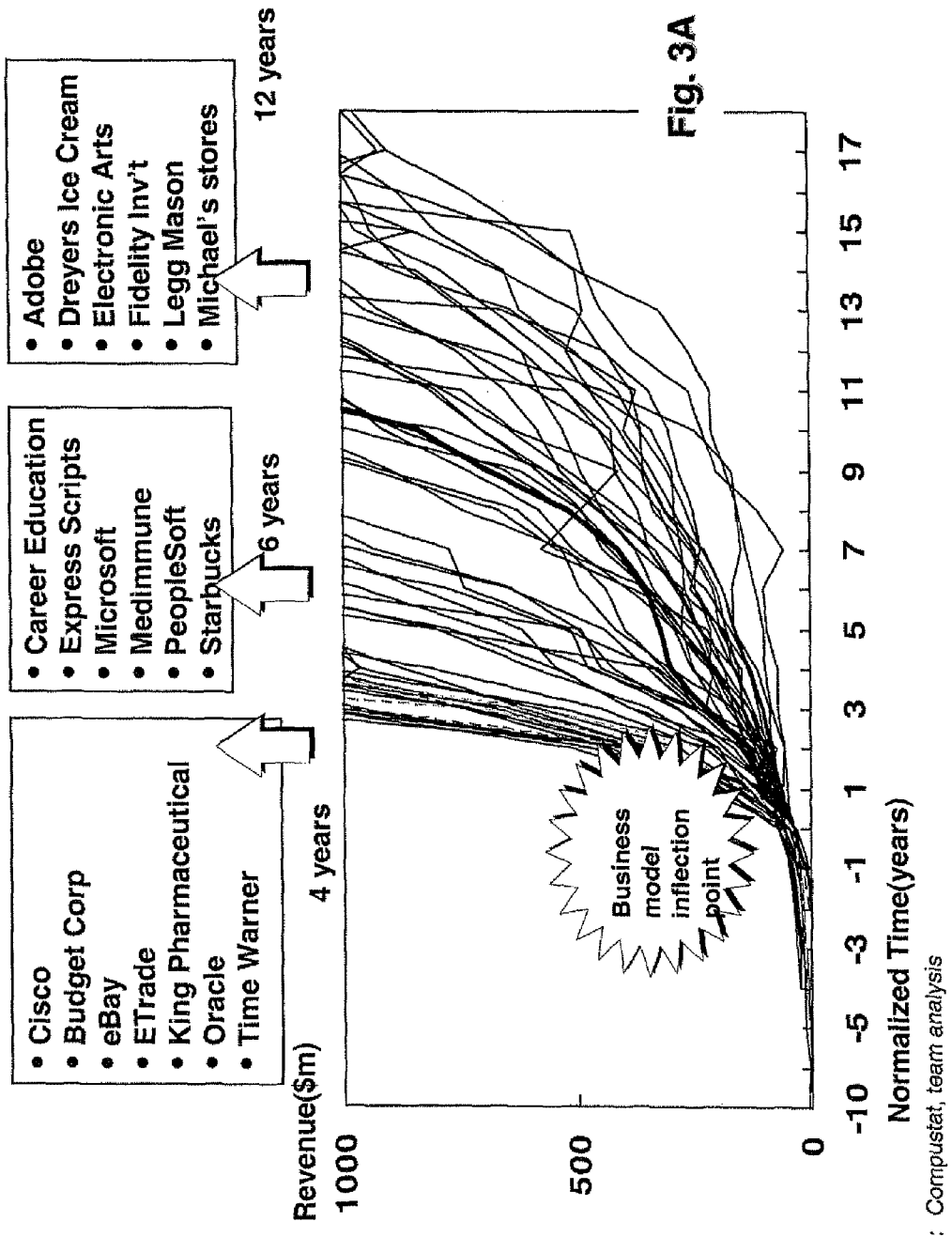

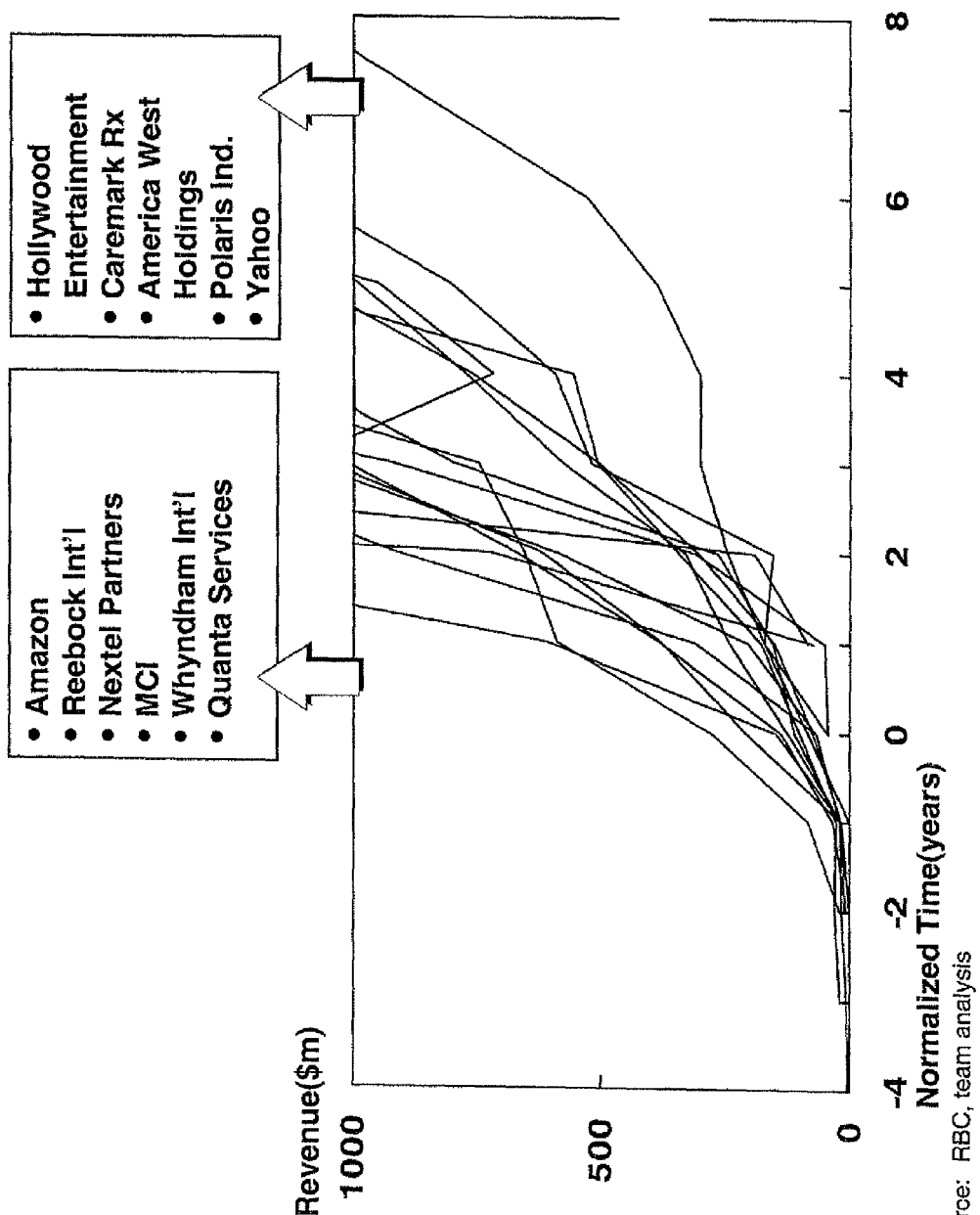

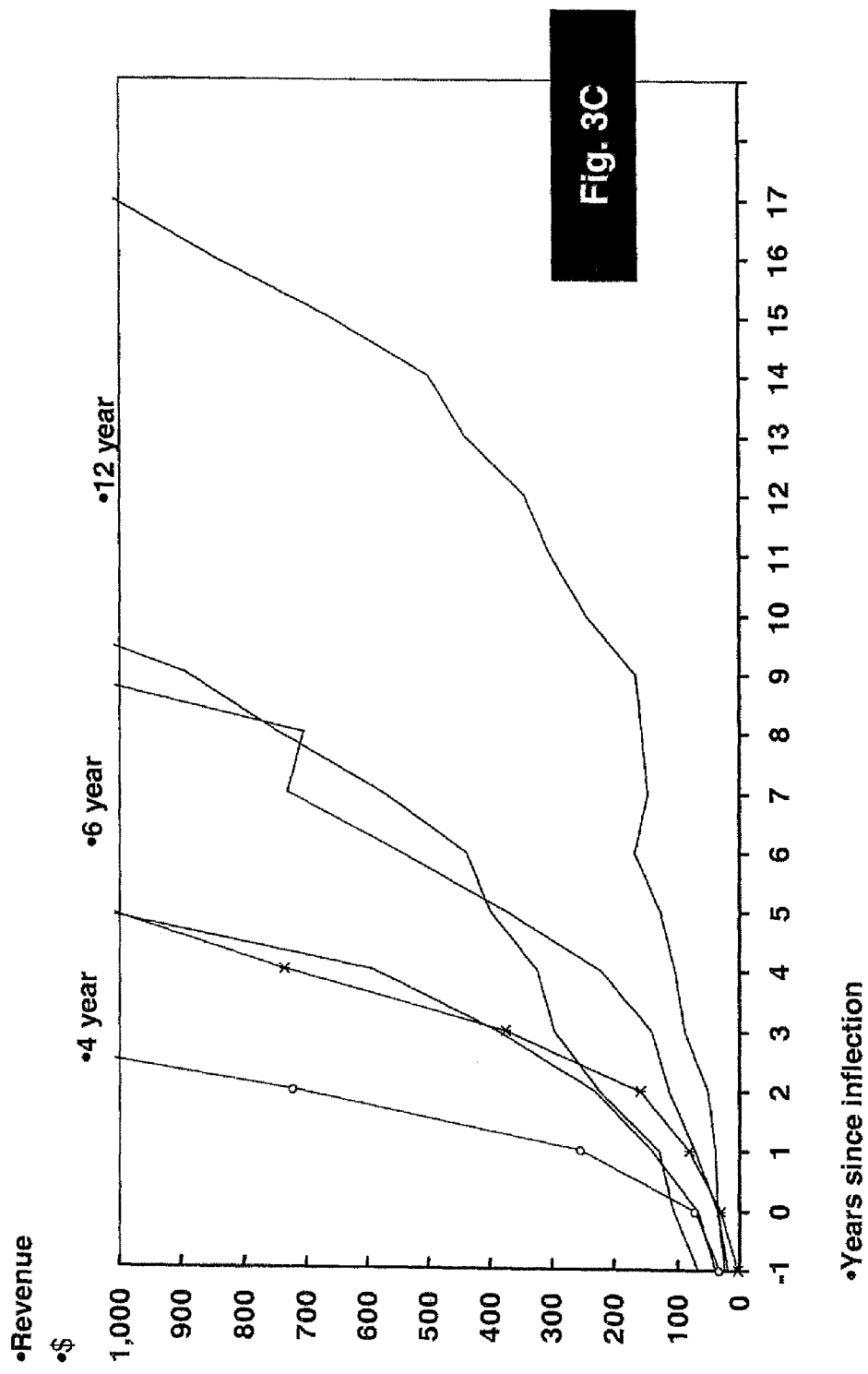

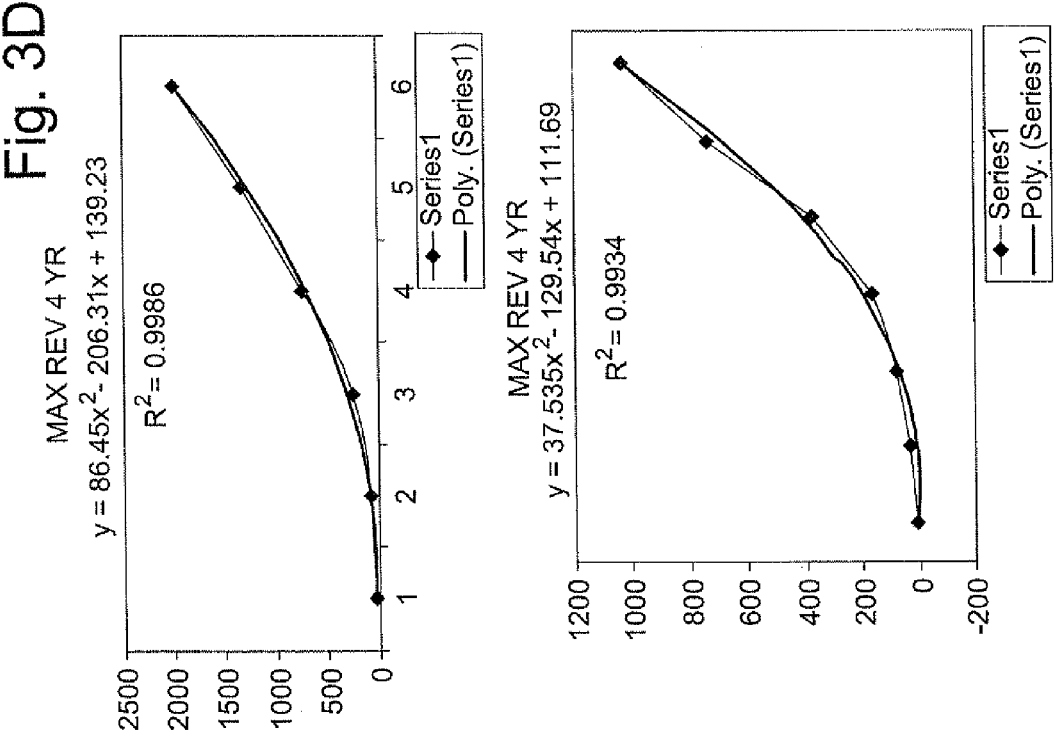
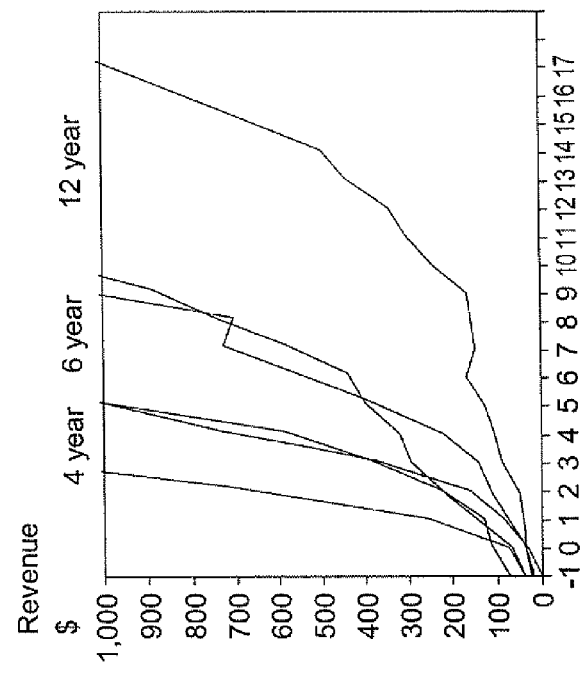
Fig. 3D

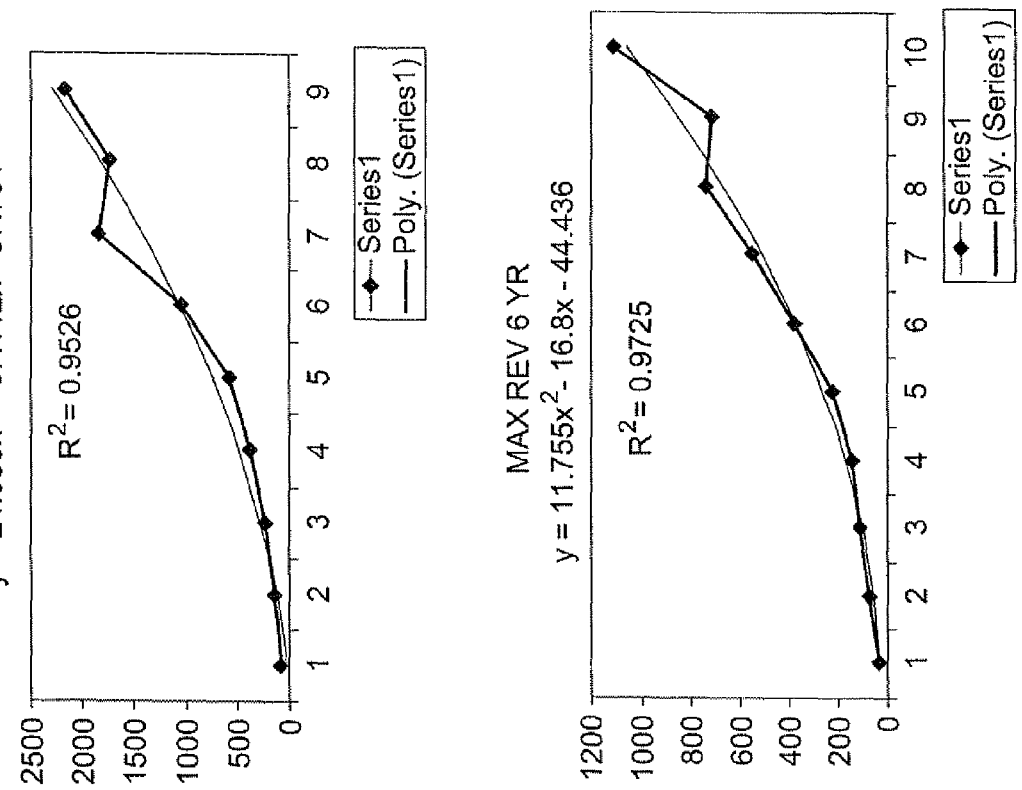
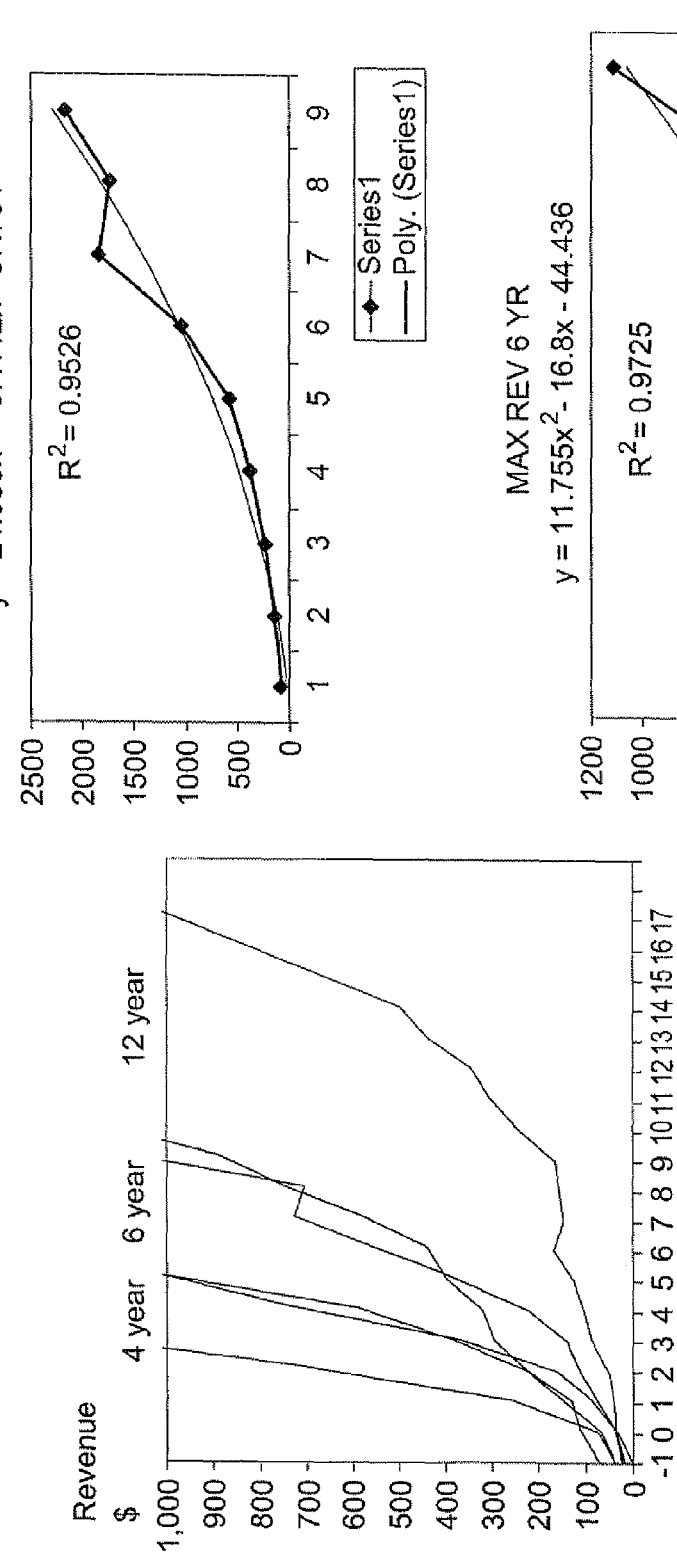
Fig. 3E

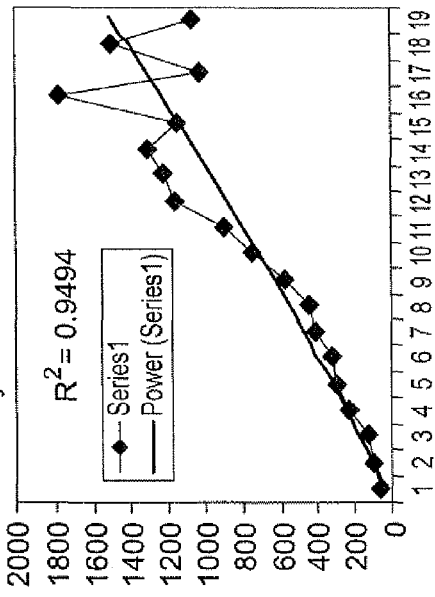
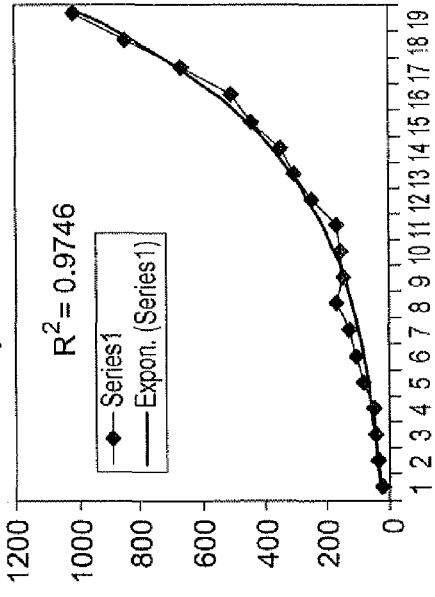
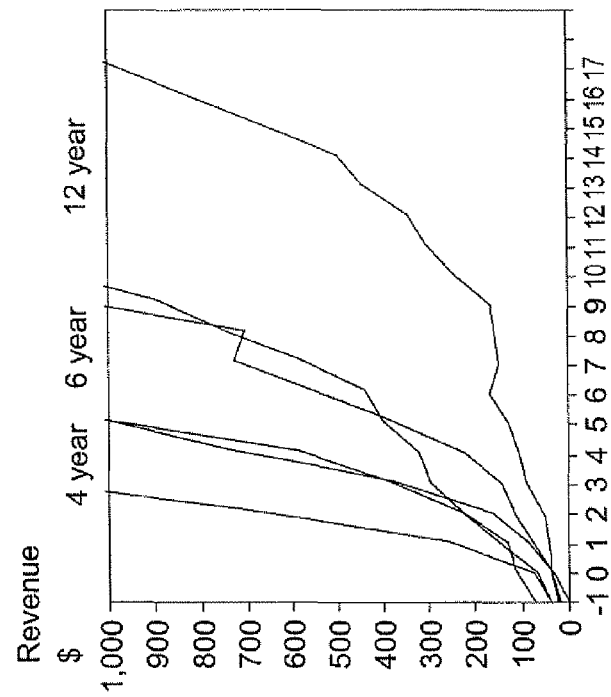
Fig. 3F

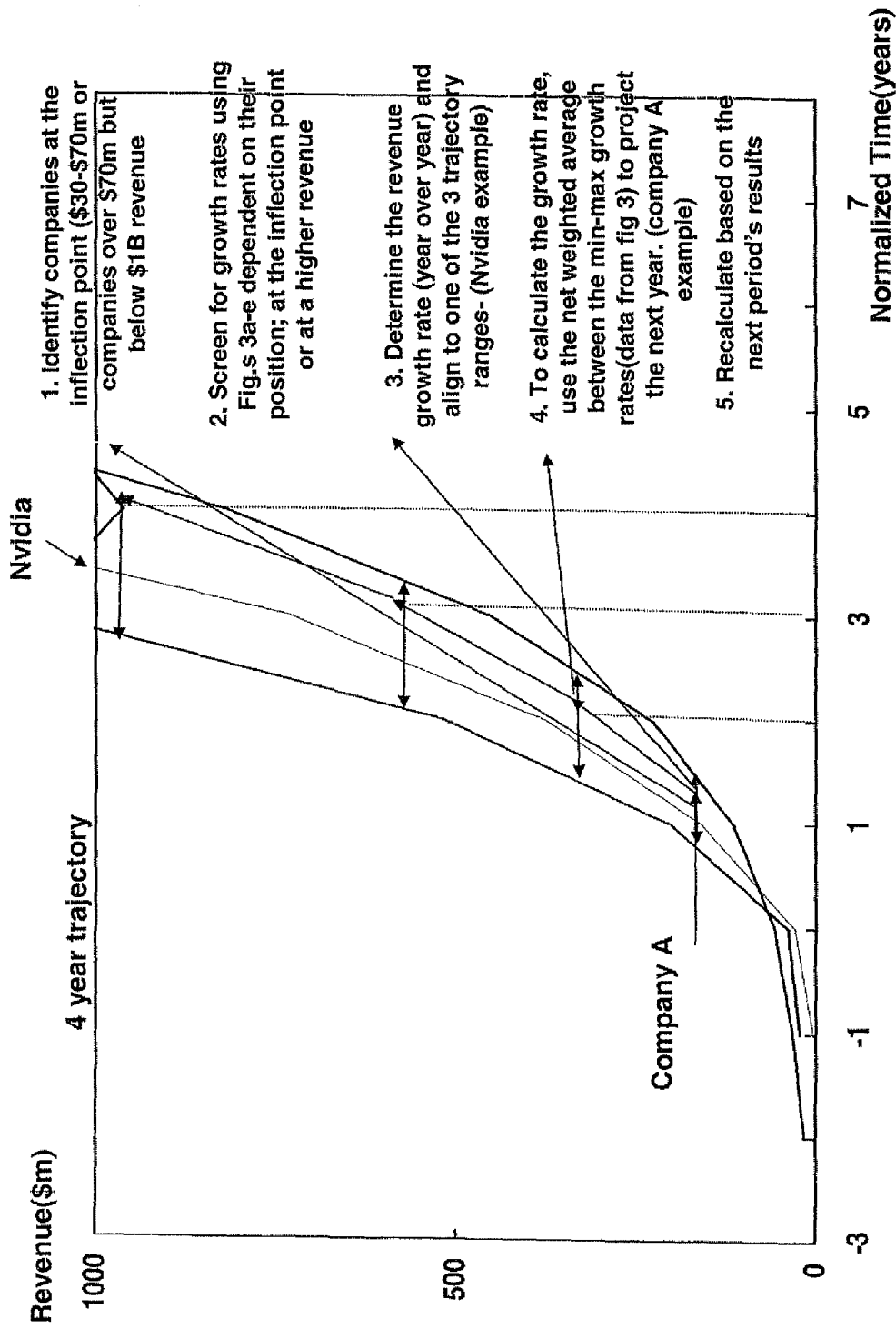

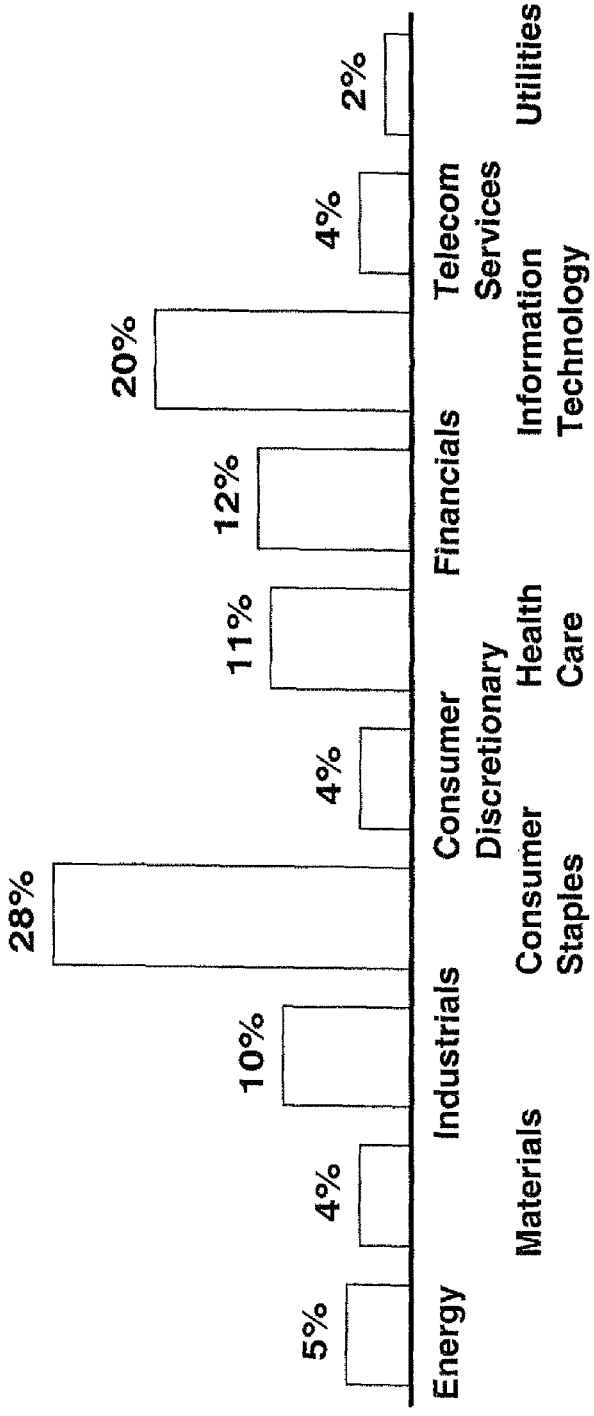

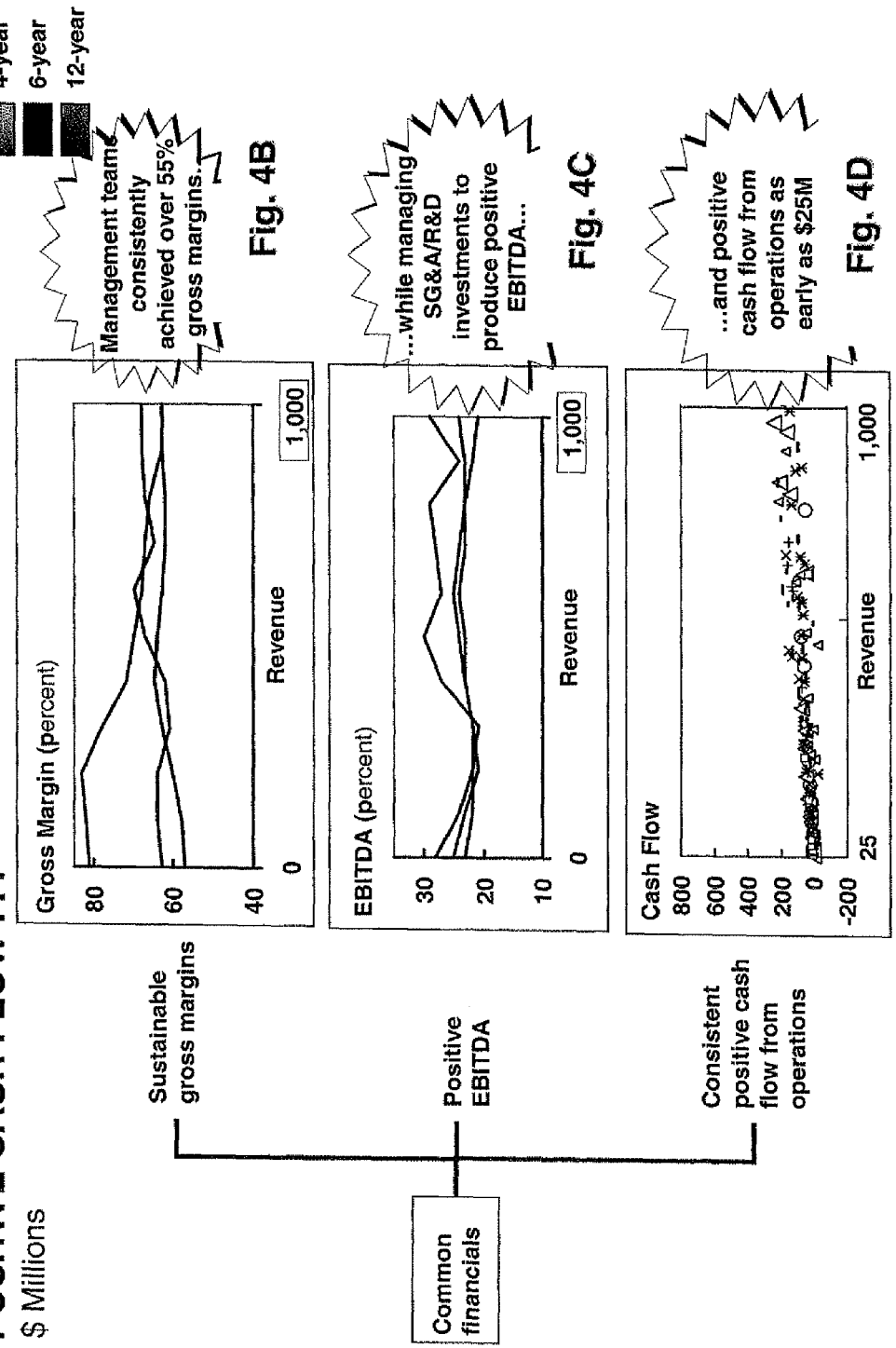

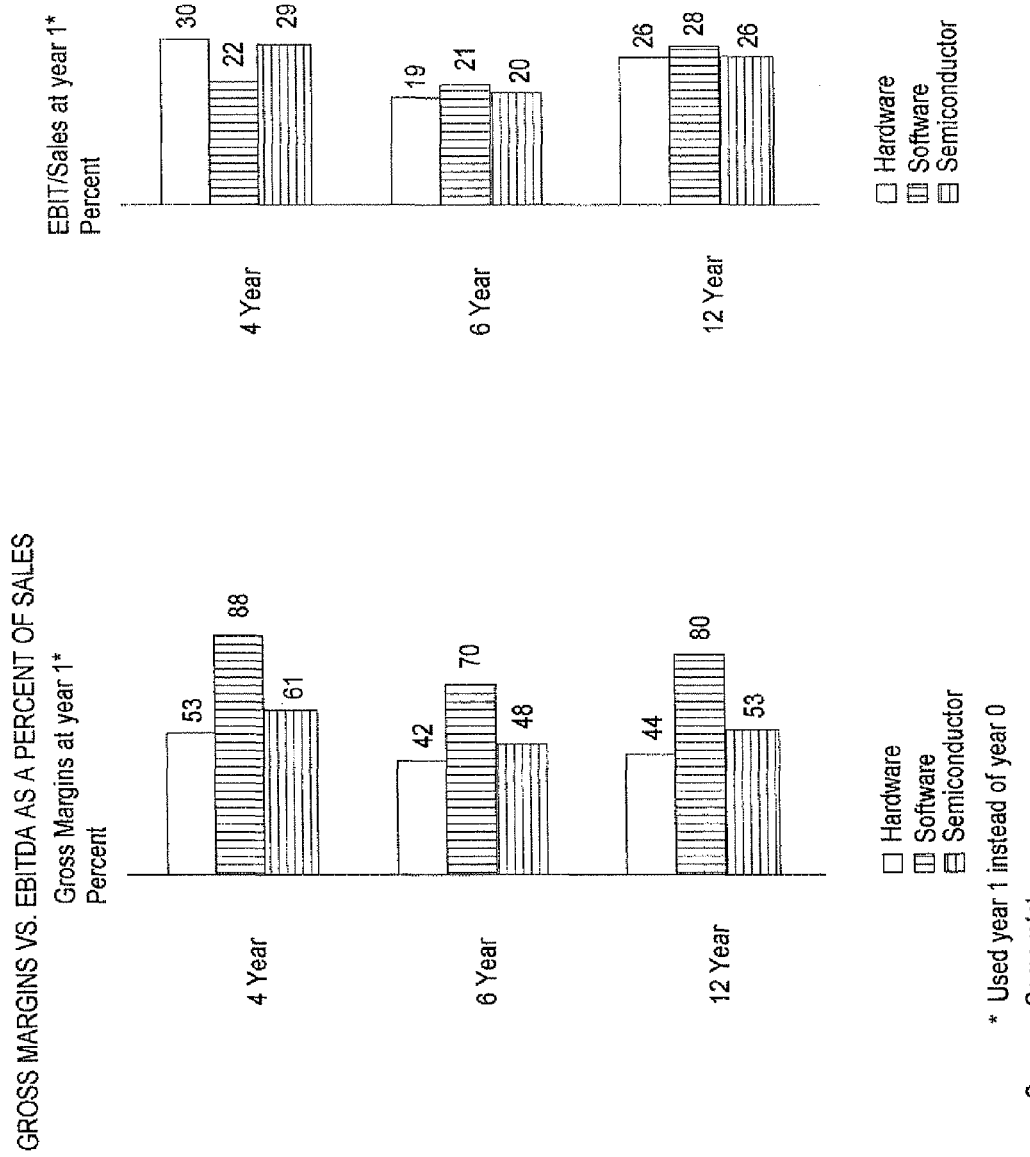

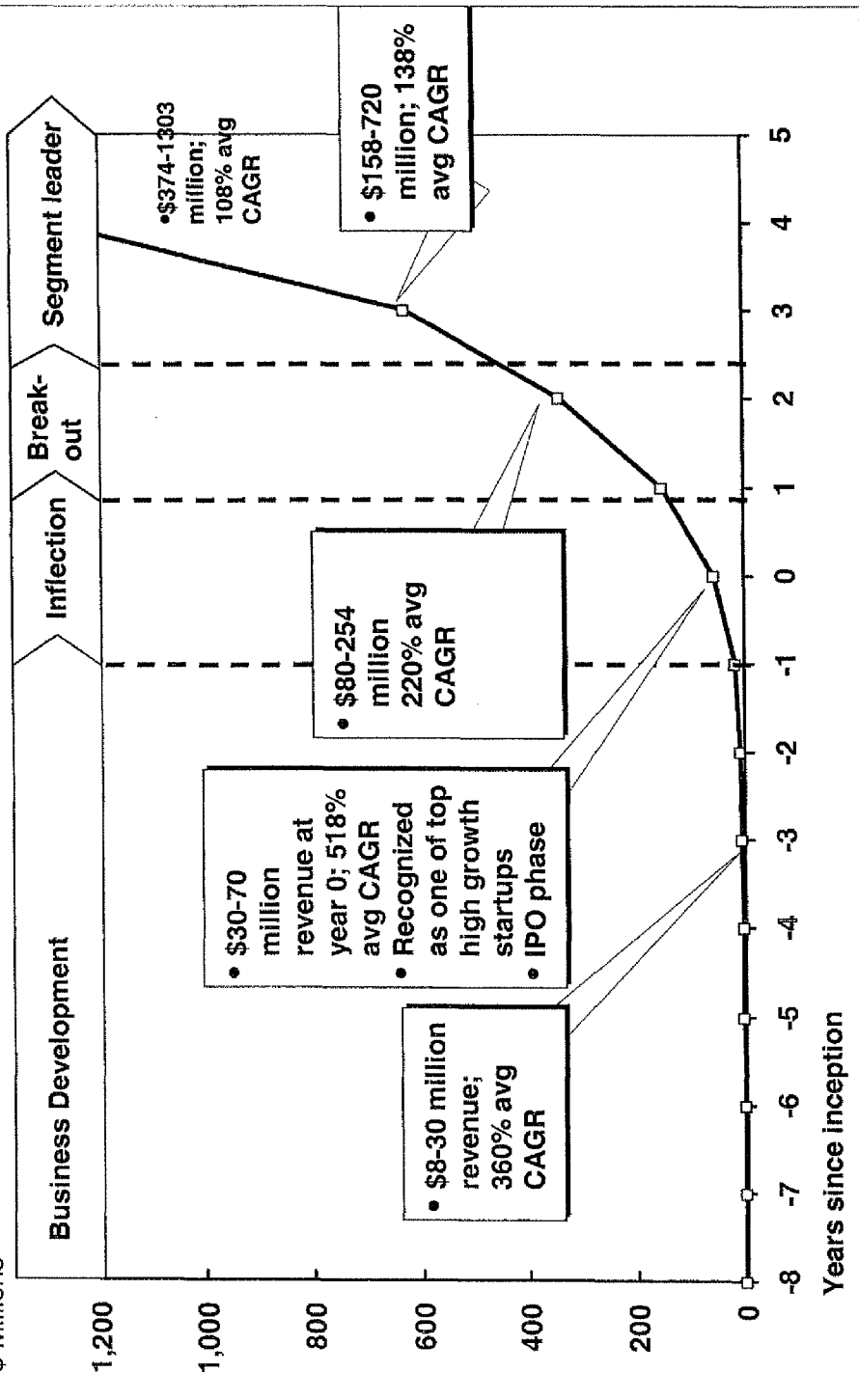

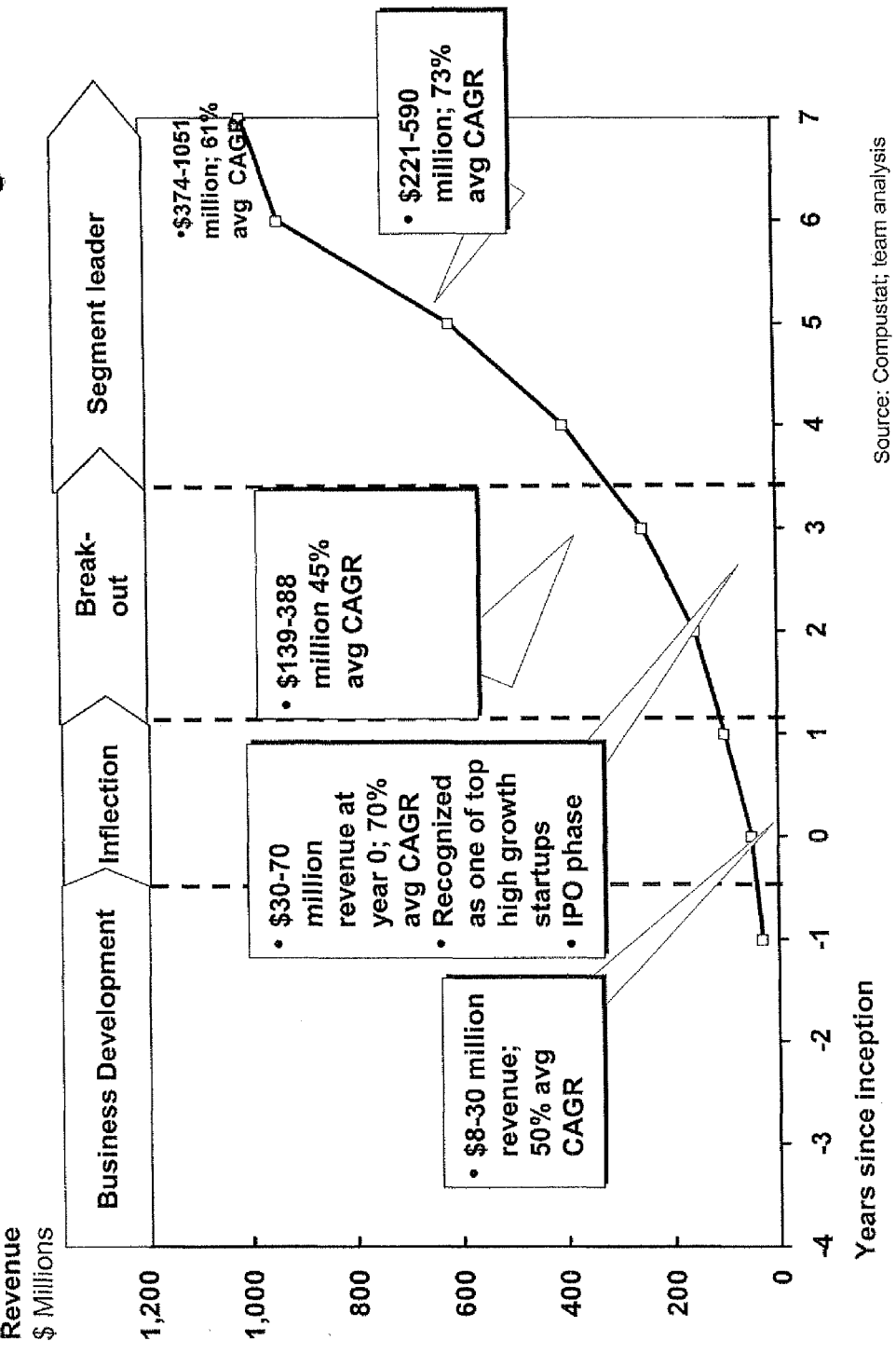

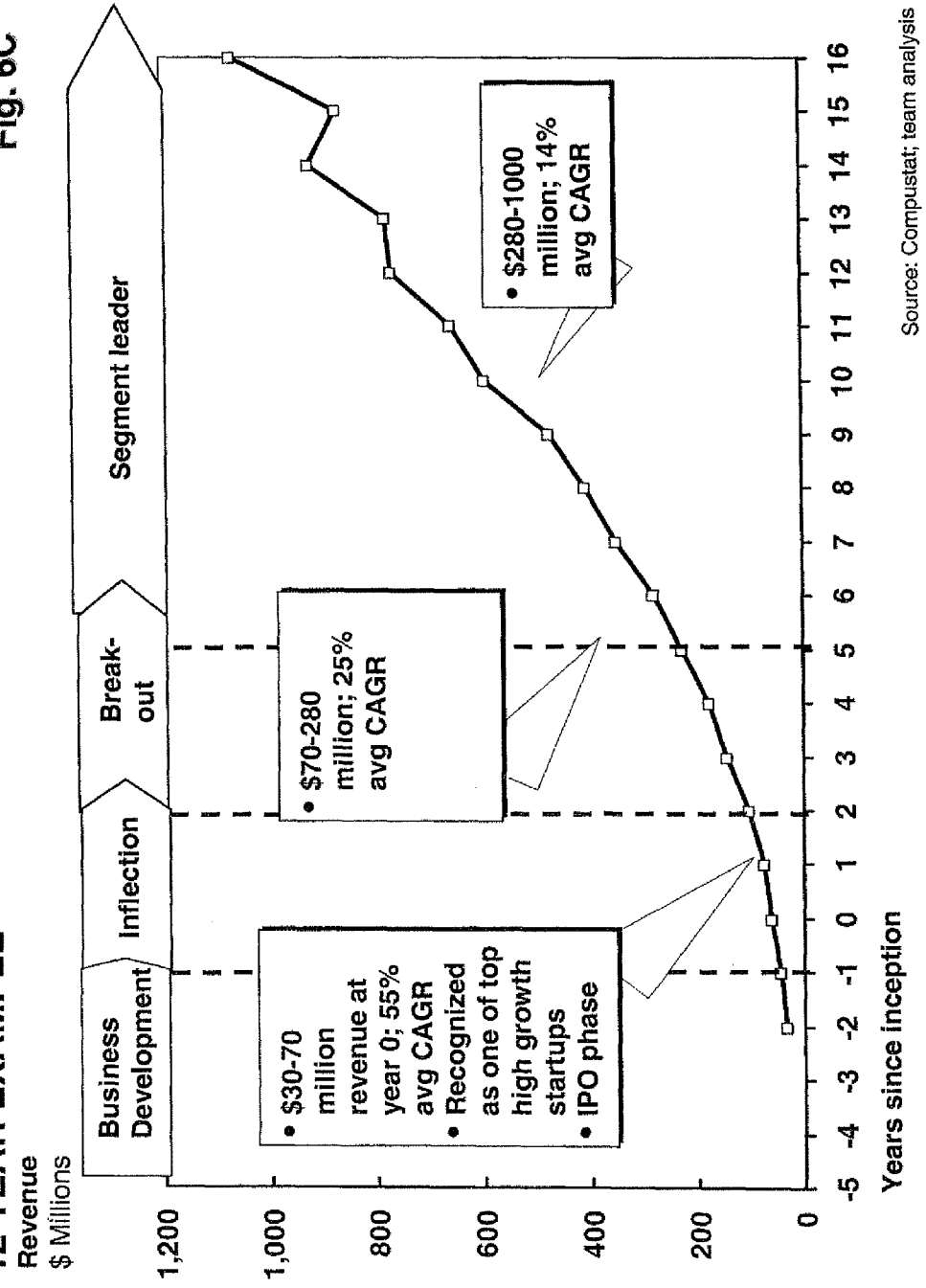

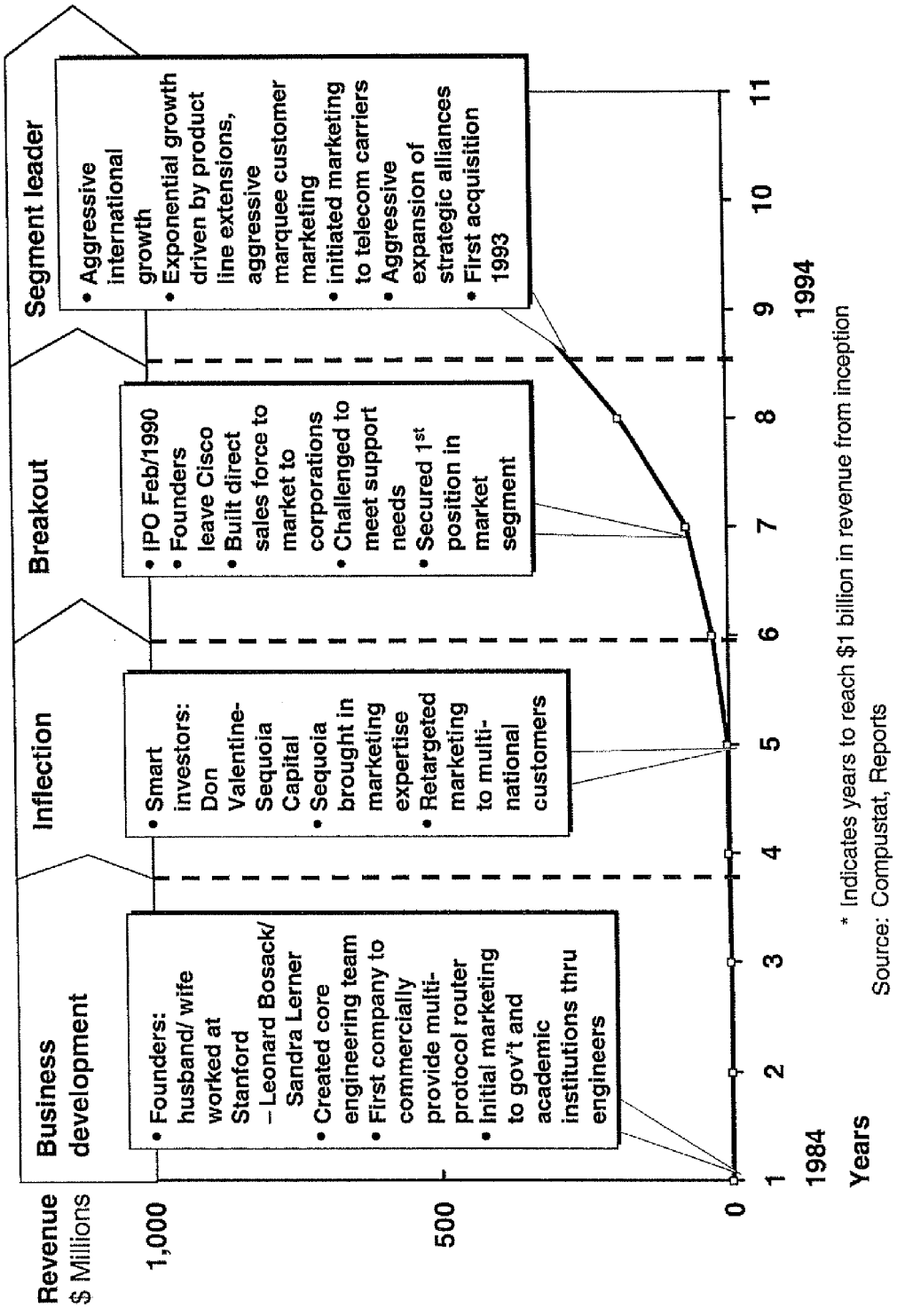

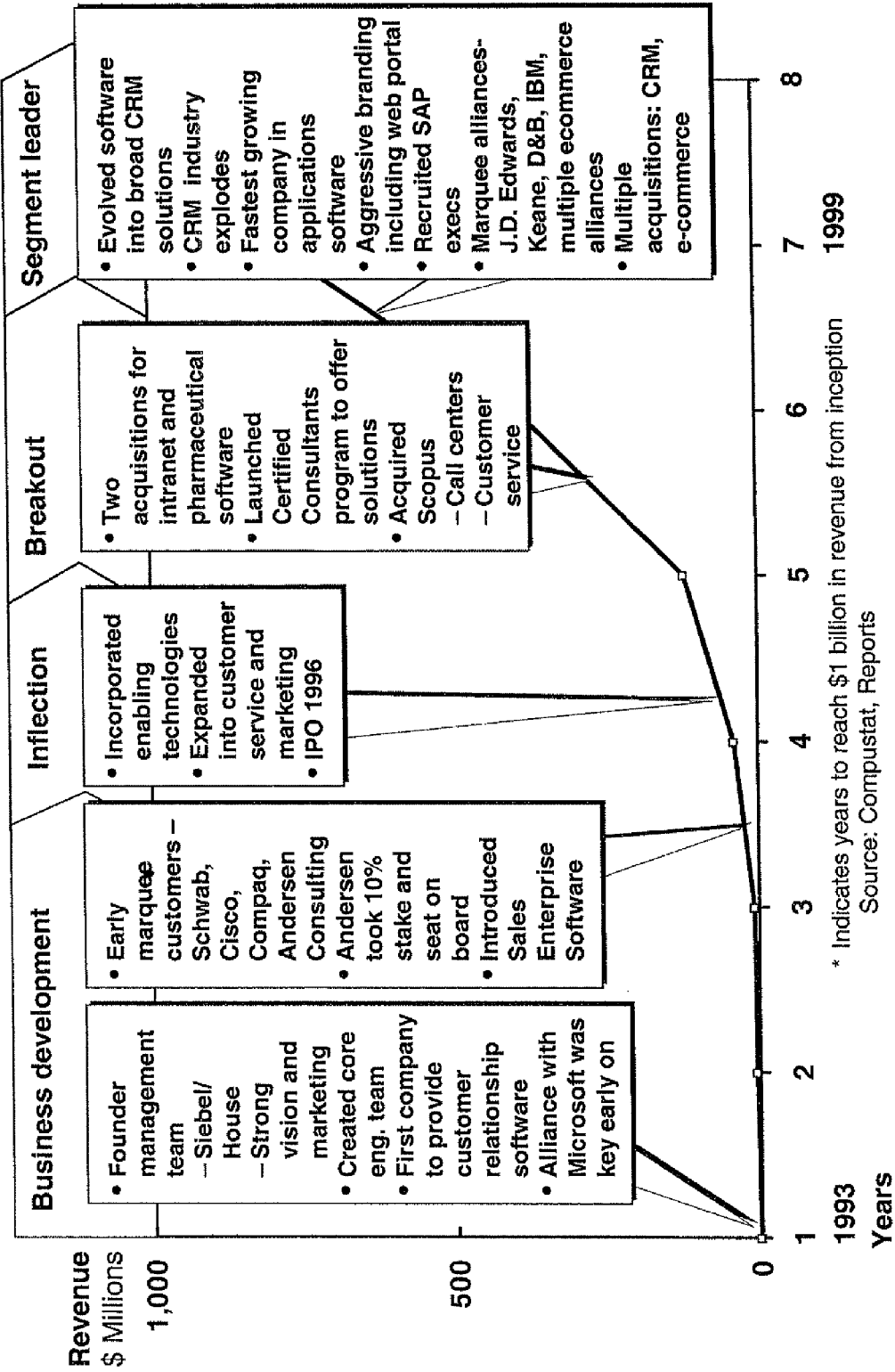

SCALABLE SALES ATTRIBUTES...

Fig. 11

Secure marquee customers
- Secure marquee customer agreements who "believe" and committed to quickly shape product/application and business
- Highly committed to success of company; reference account based on wide scale deployment, intellectual and managerial capital commitment, key investor, strategic alliance partner
- Agreements establish market credibility and attractive lifecycle revenue

Leverage strategic alliances
- Engage potential alliance partners early
- Secure "Big Brother" alliance to provide marquee customer credibility through joint sales and marketing or joint commercialization
- Create and leverage alliance network to capture full value

Target/shape high-growth market segment
- High growth(>80%) emerging market or opportunity for #2-3 position in large, high growth sustainable market
- Market segment has attractive adjacent segments for future growth
- Simple market entry strategy can create beachhead

MARQUEE CUSTOMERS SHAPE WINNING COMPANIES      Fig. 13B

| | Innovator - Shaper | Innovator - Fast follower | Confirmer | Utilitarian |
|---|---|---|---|---|
| Manage-ability | •Manageable thru regional deployment<br>•Passes test bed evaluation- field trials | Manage risk using Innovator Customer experiences combined with internal processes | •Proven risk management track record by marquee customers<br>•Internal capabilities | •Manageable by mortals<br>•Supplier has capability to manage risks |
| Business case | •Solves significant pain point with high ROI<br>•Higher level of payoff vs risk undertaken | •Solves significant pain point with high ROI<br>•Business case example from Innovator Customer | Business case framework and examples from initial marquee customers | Easy to prove business case |
| Customer reference | none | Innovator reference<br>-Respected innovator<br>-Connected relationships | Multiple, highly respected customer references | •No smoking craters at customers who bought/scaled<br>•Multiple customer references |
| Company position | •Outlook for being a viable company<br>•Winning engineering /mgmt. team | •Viable early stage company<br>•Demonstrated Winning engineering and mgmt team | •Emerging, scaling company | Stable, scaled company |
| Purchase criteria | Company understands architecture, bottleneck being solved, best option selected, best implementation | Company understands architecture, bottleneck being solved, best option selected, best implementation *with higher degree of inspection* | •Value proposition<br>•Business case<br>–Strategic vs financial drivers defined<br>–Demonstrable elements | Classic business case<br>-Demonstrable market impact<br>-Easy to approve or observe (e.g. others are doing it) |

Source: interviews, team analysis

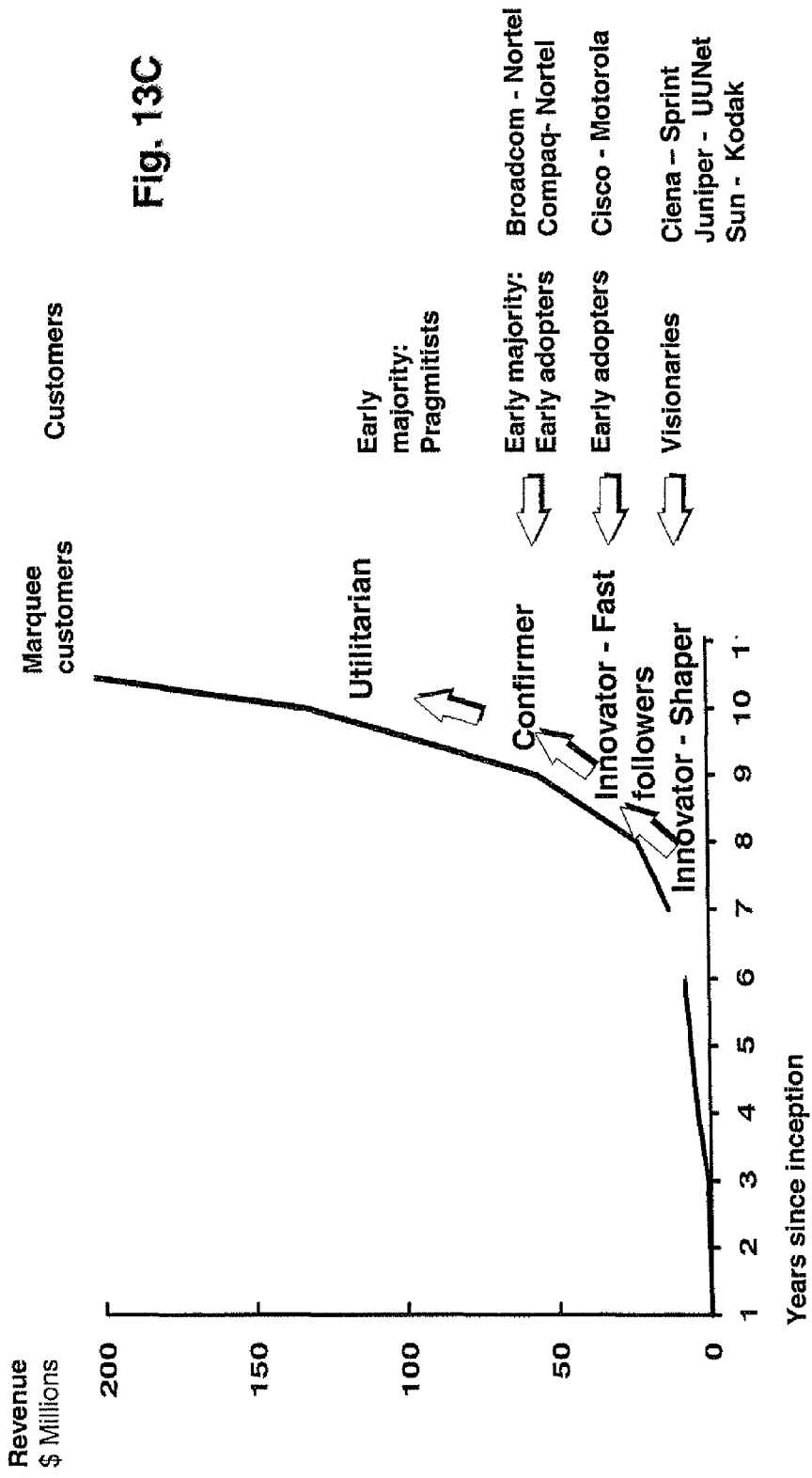

MARQUEE CUSTOMERS SET THE DIRECTION OF THE BUSINESS

Fig. 13D

| Small Customers | Marquee customers |

Marquee customers:
- Robust initial product
- Confident can serve marquee customer
- Capable of quickly iterating product design to meet customer requirements Small Customers:
- Product in development phase
- Unsure of ability to support product in live customer environment

Effect

- Drive product requirements
  - Test/harden product in large scale, operating environment
  - Interface to customer systems
- Determine customer centric value proposition to be used with other marquee customers
- Serve as industry reference
- Shape market

3. ASYMMETRIC ALLIANCES ESTABLISHED PRODUCT AND CUSTOMER CREDIBILITY

Fig. 13E

| "Winner" | "Big Brother" | Rationale | Alliance |
|---|---|---|---|
| Sun Microsystems | AT&T | AT&T's UNIX System V was then-dominant commercial application | Joint development |
| Microsoft | IBM | IBM PCs enjoyed market leadership | Microsoft licensed operating system |
| Veritas | Sun Microsystems | Dominant workstation system | Product bundling and distribution |
| Siebel | Microsoft | Microsoft gave Siebel additional market credibility | Co-marketing on industry platform |

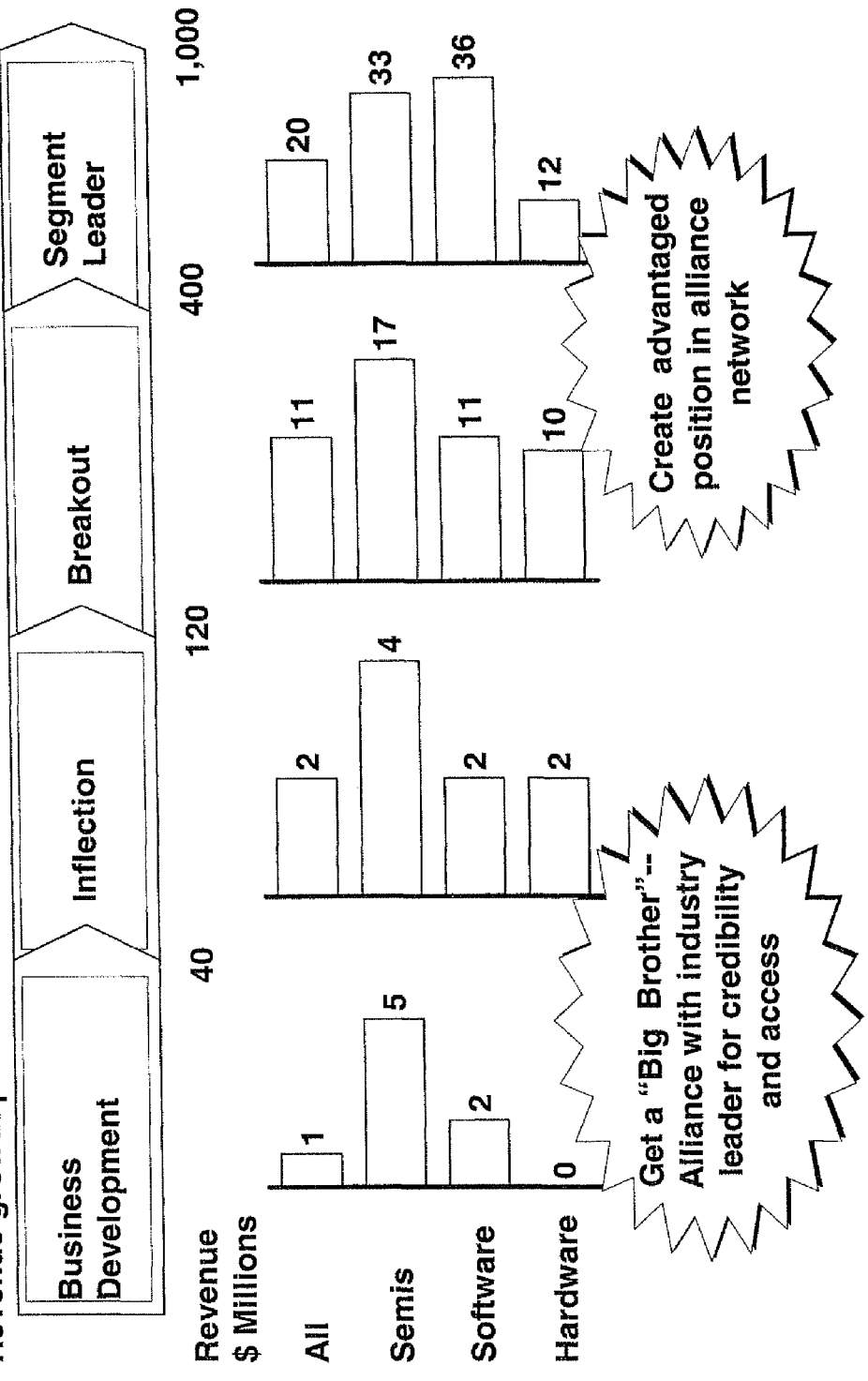

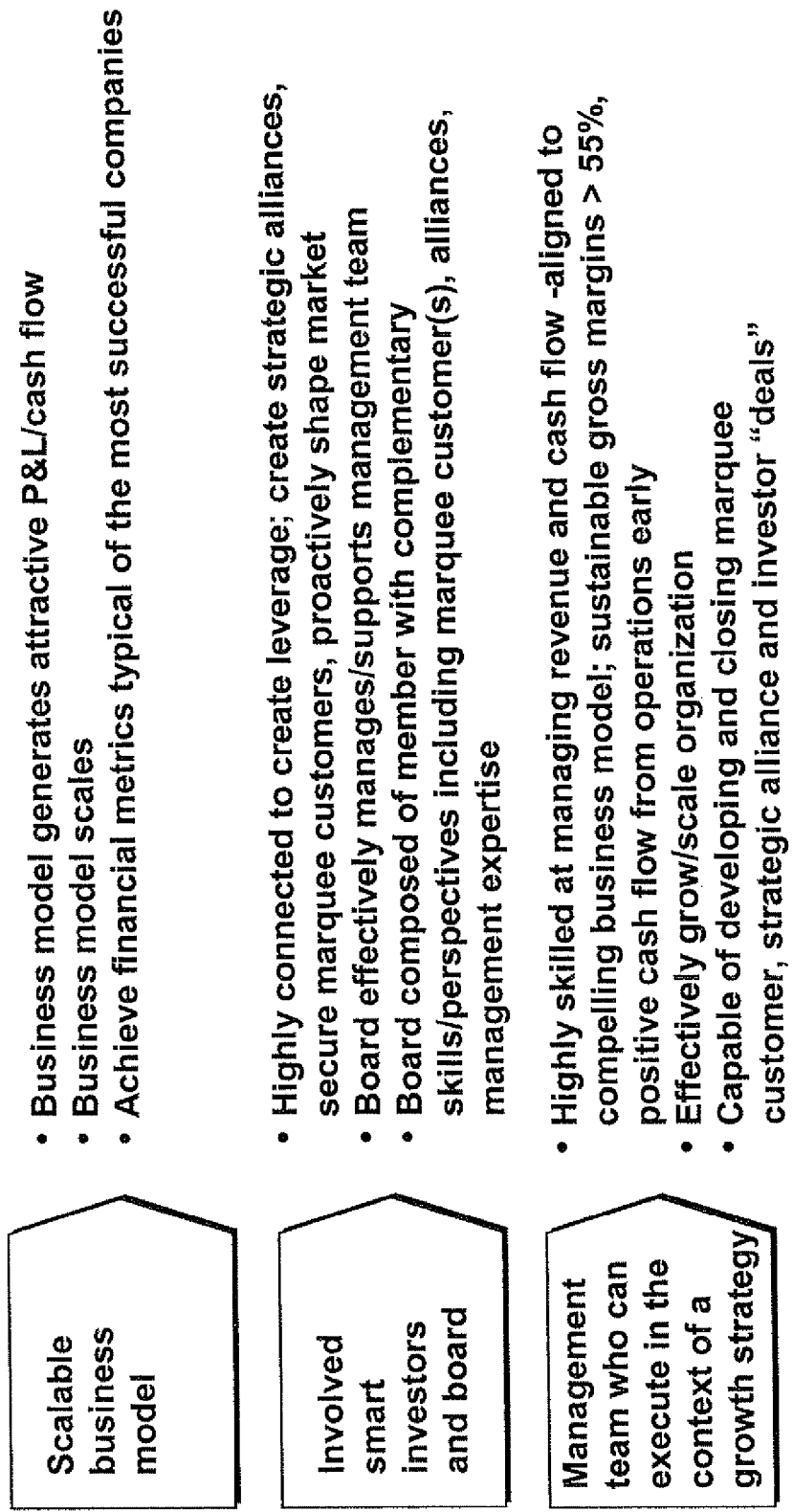

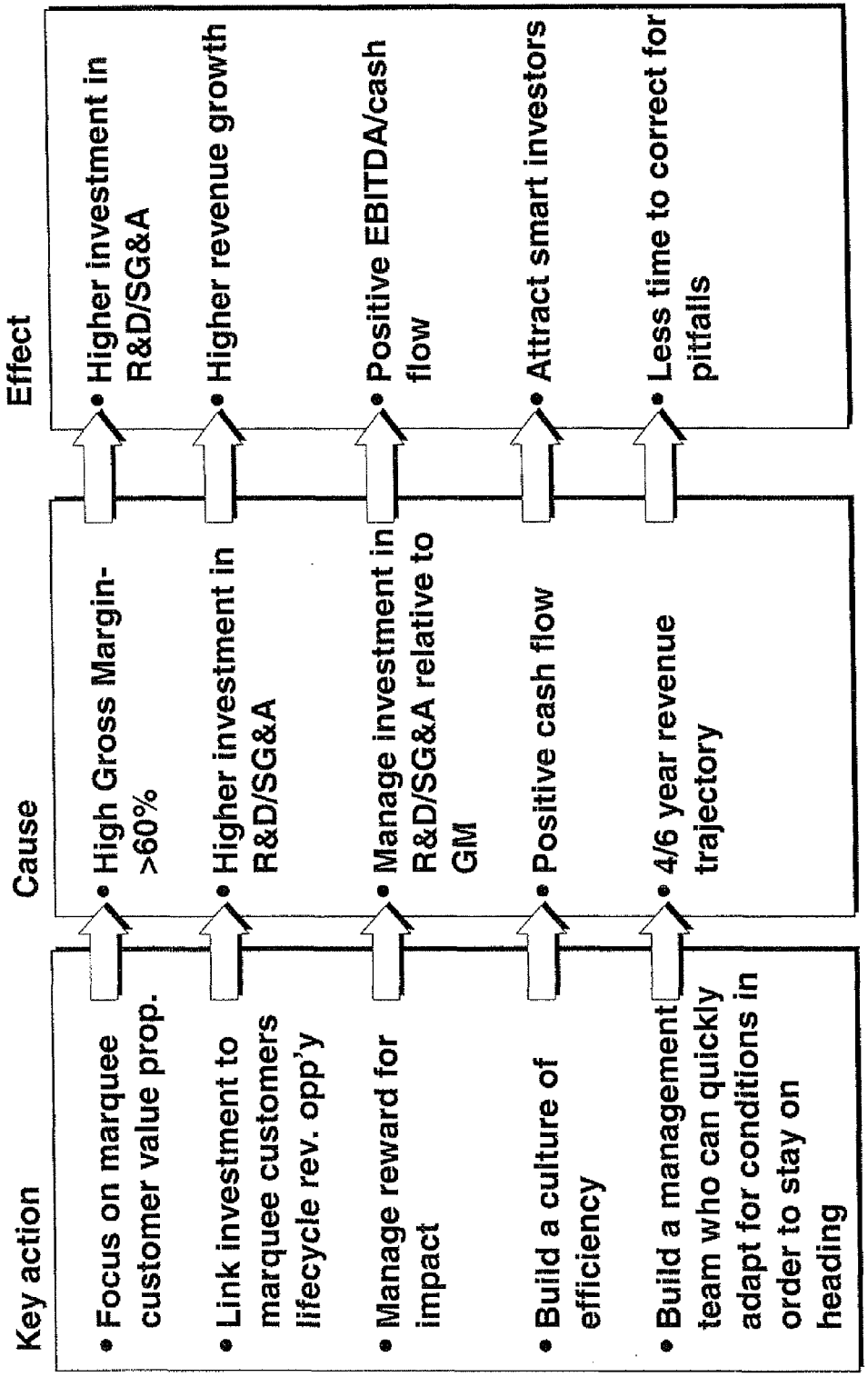

Fig. 18

GUIDING PRINCIPALS TO BUILD WINNING COMPANIES

- Scalable R&D
  - Target and invest in scalable initiatives
  - Pursue a scalable solution or architecture
  - Link product development with marquee customers

- Scalable Sales
  - Target and invest in scalable value propositions
  - Build deep relationships with marquee customers to achieve market credibility
  - Create asymmetric alliance relationships to gain market leverage
  - Link customers and alliances with the management team

- Scalable cash management
  - Shape a sustainable business model
  - Achieve 10-20% EBITDA to achieve positive FCF which scales proportionately with sales
  - Involve a highly connected board. Add customer, alliance, CEO

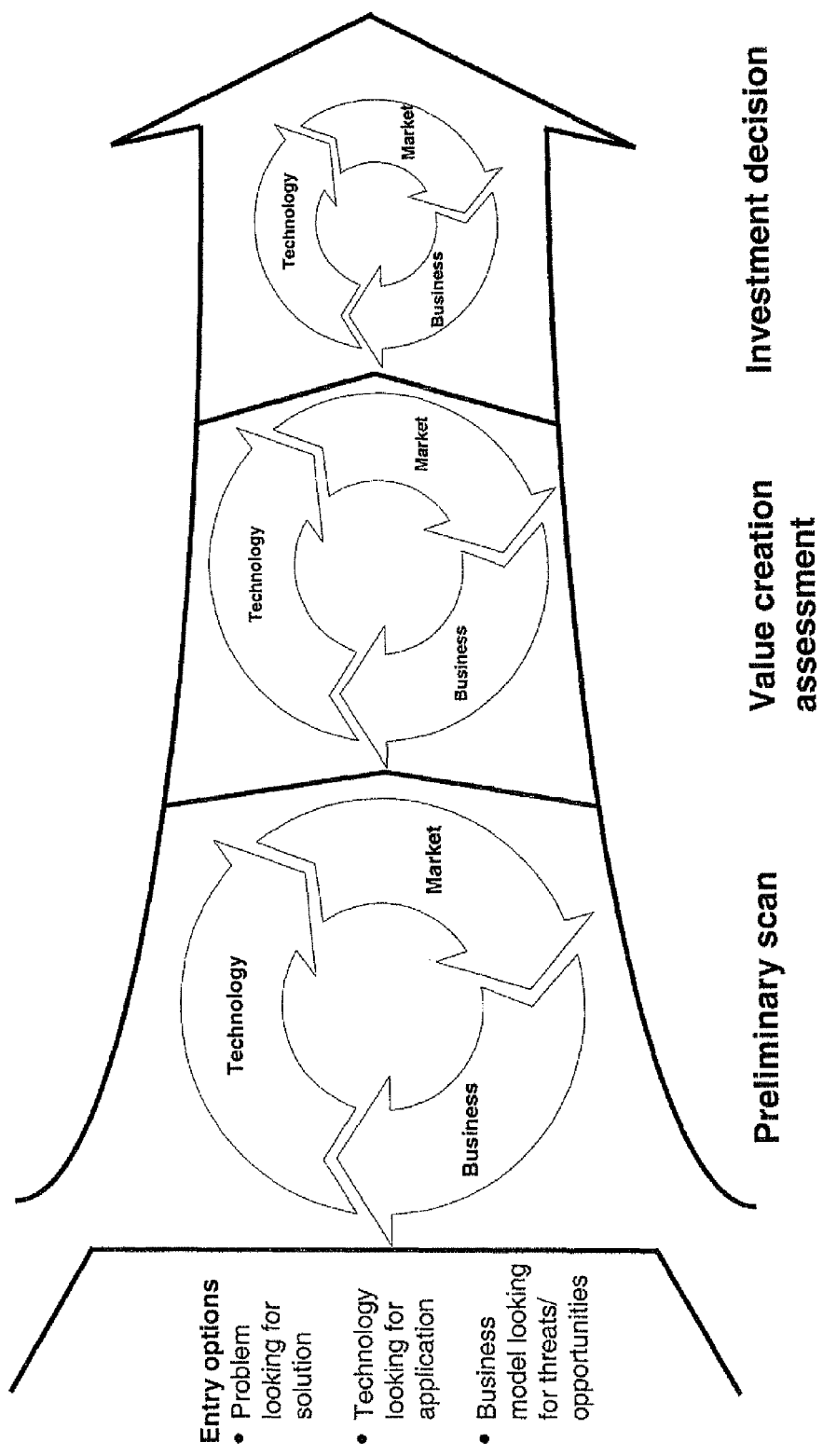

SCALABLE R&D SCORECARD

| | Scalability | | |
|---|---|---|---|
| | Non-existent | Incremental opportunity | Highly scalable |
| Architectural advantage | Availability of multiple substitutes | Enhances current platforms | Unrivaled advantage (10x) |
| Technological headroom | Nearing end of technology curve | Incremental performance improvement | Substantial white space |
| Extendable innovation | Not likey | Potential to expand in segment | Clear linkage to additional opportunities |
| Link to market need | "Solution looking for problem" | Real demand for increased capability | Potential to satisfy latent demand |
| Breadth/staying power of opportunity | Missed the window/few target customers | Finite window of opportunity within sector | Launches new market segment |
| Revenue potential | Insignificant | Solid growth opportunity | Access to billion $ market |
| Attractive business system | Status quo | Attractive margins relative to current | Scalable, >60% GM |
| Sustainable value proposition | Difficult to build competitive edge | Lead required, fast followers probable | Opportunity to gain significant advantage in time |
| R&D/business strategies aligned | Disparate strategies | Moderate synergy | Shared vision and objectives |

Groupings: R&D (Architectural advantage, Technological headroom, Extendable innovation); Sales (Link to market need, Breadth/staying power of opportunity, Revenue potential); Financial management (Attractive business system, Sustainable value proposition, R&D/business strategies aligned)

Fig. 20A

SCALABLE R&D SCORECARD

Fig. 20B

| | Strength of innovation platform | | | | |
|---|---|---|---|---|---|
| | Non-existent | Insignificant | Incremental innovation | Micro-discontinuity | Macro-discontinuity |
| Potential for IP capture | Little to no potential for IP | | Bounded IP Opportunity | | Extending ring of derivative IP |
| Technological headroom | Nearing end of technology curve | | Incremental performance improvement | | Substantial white space |
| Extendable innovation | Not likely | | Potential to expand in segment | | Clear linkage to additional opportunities |
| Breadth/staying power of opportunity | Missed the window / few target customers | | Finite window of opportunity | | Launches new market segment |
| Significance of addressed need | Buyer must be convinced | | Critical to current buyer | | Fundamental to sector |
| Favorable competitive environment | Highly competitive/ limited potential for advantage | | Existence of large incumbents and peers | | White space on headroom and landscape |
| Sustainable value proposition | Difficult to build competitive edge | | Lead required fast followers probable | | Opportunity to gain significant advantage in time |
| Attractive business system | Status quo | | Attractive margins relative to current | | Scalable 60% GM |

Technology: Potential for IP capture, Technological headroom, Extendable innovation Market: Breadth/staying power of opportunity, Significance of addressed need, Favorable competitive environment Business: Sustainable value proposition, Attractive business system

MEAN FINANCIAL METRICS – 4 YEARS

Fig. 21

| | -1 | 0 | 1 | 2 | 3 | 4 |
|---|---|---|---|---|---|---|
| Revenue $ Million | 17 | 46 | 139 | 321 | 663 | 1,182 |
| GM Percent | 81 | 83 | 72 | 68 | 66 | 63 |
| SG&A Percent | 35 | 39 | 31 | 32 | 31 | 33 |
| R&D Percent | 22 | 22 | 15 | 13 | 13 | 11 |
| EBITDA Percent | 23 | 21 | 25 | 23 | 21 | 20 |
| Cash flow Percent | 21 | 16 | 13 | 16 | 14 | 13 |
| Number of employees | 105 | 289 | 641 | 1,642 | 3,393 | 5,021 |

12 Technology

Note: Removed outliers from analysis, slight errors due to rounding
Source: Compustat; team analysis

MEAN FINANCIAL METRICS – 6 YEARS

Fig. 22

| | -1 | 0 | 1 | 2 | 3 | 4 | 5 | 6 |
|---|---|---|---|---|---|---|---|---|
| Revenue $ Millions | 28 | 50 | 108 | 174 | 265 | 429 | 668 | 1,013 |
| GM Percent | 57 | 60 | 65 | 64 | 63 | 62 | 62 | 63 |
| SG&A Percent | 40 | 28 | 31 | 30 | 29 | 29 | 28 | 28 |
| R&D Percent | 14 | 9 | 12 | 11 | 10 | 10 | 11 | 11 |
| EBITDA Percent | 3 | 23 | 22 | 23 | 24 | 23 | 23 | 24 |
| Cash flow Percent | 0 | 16 | 12 | 16 | 17 | 16 | 16 | 16 |
| Number of employees | 459 | 494 | 845 | 1,206 | 1,700 | 2,428 | 3,772 | 5,492 |

MEAN FINANCIAL METRICS – 12 YEARS

| | -1 | 0 | 1 | 2 | 3 | 4 | 5 | 6 | 7 | 8 | 9 | 10 | 11 | 12 |
|---|---|---|---|---|---|---|---|---|---|---|---|---|---|---|
| Revenue $ Million | 28 | 54 | 80 | 108 | 148 | 196 | 259 | 320 | 403 | 511 | 568 | 723 | 995 | 1,107 |
| GM Percent | 63 | 64 | 64 | 61 | 62 | 67 | 70 | 65 | 66 | 67 | 68 | 68 | 68 | 68 |
| SG&A Percent | 30 | 25 | 28 | 28 | 29 | 28 | 25 | 23 | 24 | 25 | 28 | 28 | 24 | 28 |
| R&D Percent | 12 | 11 | 11 | 11 | 13 | 12 | 15 | 15 | 14 | 13 | 15 | 16 | 17 | 16 |
| EBITDA Percent | 21 | 28 | 24 | 22 | 21 | 27 | 30 | 27 | 29 | 28 | 25 | 24 | 27 | 24 |
| Cash flow Percent | 12 | 20 | 19 | 15 | 15 | 21 | 21 | 19 | 20 | 21 | 19 | 19 | 20 | 16 |
| Number of employees | 324 | 554 | 703 | 1,008 | 1,259 | 1,474 | 1,433 | 2,446 | 2,745 | 3,077 | 3,704 | 4,191 | 5,470 | 6,094 |

BLUEPRINT SCORECARD

Fig. 24

| | Pitfall | Distinctive |
|---|---|---|
| Founder/founding team who can shape an opportunity | •High interest in area<br>•Little startup or development experience | •Experience with core technology platform<br>•Limited product/market expertise<br>•Ability to recruit good team | •Distinctive technology expertise<br>•CEO level business skills; operational and strategic |
| Innovative core engineering team | •High research skills<br>•Inability to develop products with sophisticated technology | •Excellent core technology skills<br>•Stretched to compete with best in class teams | •Designs best in class architecture and functionality<br>•Ability to iterate product rapidly |
| Technology discontinuity/ value proposition | •Commodity,<br>•Weak value proposition<br>•Technology looking for market<br>•Failure to integrate/add value from acquisitions | •Integrated/broad platform with few capability spikes<br>•Marginal competitive advantages | •Solves significant customer problem<br>•Unique technology enables significant customer value prop. |
| Management team who can execute | •Business plans not operational/realistic<br>•Consistently generates losses with marginal rev growth | •Develops basic strategy<br>•Executes basic growth business | •Track record and successfully demonstrates balanced operations and strategic execution |
| Involved smart investors and board | •Passive investor | •Knowledge of industry/technology<br>•Not distinctive network<br>•Actively coaches management team | •Actively shapes management team, strategy<br>•distinctive marquee customers/alliance network |
| Leverage strategic alliances | •Lacks understanding role alliances should play<br>•Few conversations that do not lead to concrete deals | •Multiple "barney", low impact alliances<br>•Desire to secure market shaping alliances but few skills | •Portfolio of alliances well designed and executed; revenue, product platform, tech development |
| Target/shape high-growth market segment | •Passive, looking for market<br>•Targeting wrong segment | •Targeting broad market<br>•Lacks appropriate focus<br>•Targeting small segment | •Targeting significant market opportunity driven by defined marquee customers |
| Secure marquee customers | •Targeting small or undefined customers through indirect channels | •Secure marquee customers but lack significant commitment<br>•Targeting 2nd tier customers | •Committed, deep marquee customer relationships<br>•Top share of marquee customers |

Fig. 25A

- Comparative companies founded in same year but achieved significantly lower revenue and EBITDA
- Siebel
- I2 Technologies
- JD Edwards
- Cadence Design
- Xilinx
- Juniper Competitors founded same year targeting similar market

WINNING COMPANIES EXECUTED ESSENTIALS

| | Needs Improvement | Distinctive |
|---|---|---|
| Founder/founding team who can shape an opportunity | Marginal technology lead Poor execution | Distinctive technology / Market skills CEO capabilities |
| Innovative core engineering team | Excellent core skills Stretched to compete with best in class | Distinctive tech. Iterates product quickly |
| Technology discontinuity / value proposition aligned | Few capability spikes iterate platform - late to market | Solves significant Problem distinctively |
| Management team who can execute | Develops basic growth business. Consistently generate losses | Achieves revenue/CF Executes deals Scales organization |
| Involved smart investors and board | Somewhat passive | Highly connected board |
| Leverage strategic alliances | Multiple low impact alliances | Marquee alliances |
| Target/shape high-growth market segment | Targeting too broad a market. Targeting too small a segment | Shaped thru Marquee customers |
| Secure marquee customers | Small / med businesses | Significant marquee customers |

Internal / External

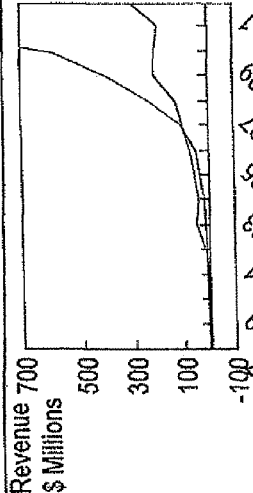

Fig. 26A

SCORECARD OVERVIEW - EXAMPLE

Internal Essentials
Score: 18
External Essentials
Score: 16
Total Score: 32

Scorecard legend:
<22 - reject
22 - 24 - monitor
24 - 26 - monitor, improve critical essentials
26 - 32 - recommend investing, develop potential
32 - 40 - recommend investing quickly, Blueprint potential, actively shape company

| | Pitfalls 1 | | | | Distinctive 5 |
|---|---|---|---|---|---|
| Internal Founder/founding team who can shape an opportunity | | | | | Extensive Bench Strength Proven H-x |
| Innovative core engineering team | | | | | Strong technical background with customer understanding |
| Technology discontinuity/ value proposition aligned | | | | | |
| Management team who can execute | | | | Solution Technically Advanced | |
| | | | | Small Mgmt team in place, biggest challenge will be managing globally | |
| Involved smart investors and board | | | At Board member are investors, no independent market expert | | |
| External Leverage strategic alliances | | | | Effectively selecting and leveraging | |
| Target/shape high-growth market segment | | | | | Targeting large market gaining key customer traction now |
| Secure marquee customers | | | | Significant customer acceptance & demand | |

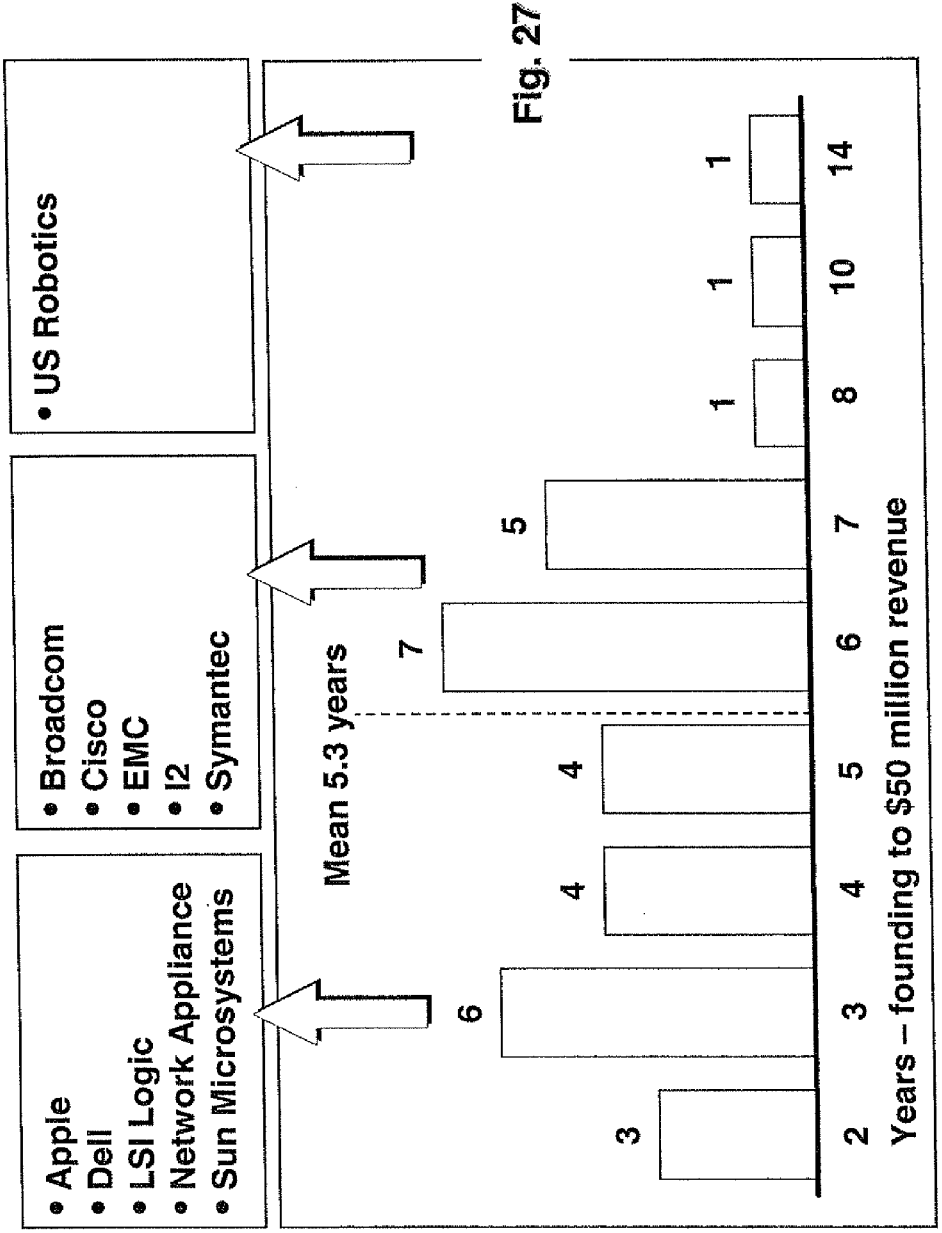

INTERNAL ESSENTIALS EVALUATION

| | |
|---|---|
| Founder/founding team who can shape an opportunity | - Does the founding team have deep relevant industry and business experience?<br>- Are the founders are well connected both with key customer and OEM decision makers<br>- Is the team shaping relationships with a marquee customer and big brother alliances?<br>- Is the culture capital/operations efficient (burn rate is low)?<br>- Does the team have a deep understanding of architectures; competition, customer? |
| Innovative core engineering team | - Is the team the best team assembled in the world? Does the team have a world class technical background and is highly talented at delivering innovation to market?<br>- Is the team efficient; offshore based resulting in very low overhead cost small or highly talented in US?<br>- Has the team captured critical patents? Lead competition?<br>- Does the CTO have a track record of delivering innovation with small teams in this area<br>- Has this core engineering team delivered product and it is quickly iterating to marquee customer requirements? |
| Technology discontinuity/ value proposition | - What innovation wave is being targeted? Are they a leader?<br>- What customer problem is being solved? Is it relevant, significant, and timely?<br>- Is the value proposition highly differentiated over competitors and alternatives?<br>- Is the estimated market lead over 15-18months?<br>- Is there a significant lifecycle revenue/customer? Does the pricing strategy leverage multiple variables (initial sale, capacity, upgrade, maintenance, services, training)?<br>- Is the product line or architecture scalable? |
| Management team who can execute in the context of a growth strategy | - Has the team developed a Blueprint like growth strategy?<br>- Are products are shipping and team is about to close several key customer/alliance deals?<br>- Are the team's financial priorities high growth rate(100%) and making positive cash flow?<br>- As a compelling business model in place; targeting to sustain Gross Margins with positive CF?<br>- Is the team strategically attacking best and most lucrative markets now?<br>- Is there a highly skilled and balanced team relative to company stage?<br>- Is the culture highly competitive, intense, fun loving, bottom line focused?<br>- Is the team scaling efficiently? |

Fig. 29A

EXTERNAL ESSENTIALS EVALUATION

Involved smart investors and board
- Are current investors and the possible next round investors engaged and highly connected to help secure marquee customers and strategic alliances?
- Are board members providing both strong technical and strategic direction?
- What is the board size? 5 max. Are there any independent industry expert/thought leaders, customers, alliance partners?
- Is the advisory board and observer board highly credible and involved?

Leverage Big Brother strategic alliances
- Are they shaping big brother alliances early?
- Are there marquee customers who will help shape a Big Brother alliance?
- Is the management team currently working very closely with industry players who are in the deal/shaping flow?
- Are partners providing customer introductions and linkages to commercialization?

Target/shape high-growth market segment
- Are they a leader in their wave and space?
- Are customers ready for this innovation? Are leading customers doing more than pilots? How broad is the customer base?
- Who are the identified competitors? How well are the competitors doing?
- What is the largest competitive threat? How will the company negate it?
- Does the market segment targeted have attractive adjacent segments for future growth?
- Is the company well position to be the single provider to many of the OEMs?
- Is the company currently creating a great beachhead for the products being sold today

Secure marquee customers
- Who are the largest paying customers? What is the revenue/customer? Are they marquee customers?
- Is there a customer pipeline that will meet future revenue targets with reasonable assumptions for account development cycle, close rate, and revenue/order?
- Is there a customer that is committed to shaping the company? What role are they playing (product requirements, value proposition, industry reference, alliance partner, joint marketing and advisory role, or investor)
- Does the company have a diversified list of current and a pipeline of marquee customers?
- Is the company diversifying across attractive geographic markets with marquee customers?

Fig. 29B

BUILD A PROFITABLE BUSINESS EARLY AND SCALE

| | 4 year | | | 6 year | | | 12 year | | |
|---|---|---|---|---|---|---|---|---|---|
| | -1 | 0 | 1 | -1 | 0 | 1 | -1 | 0 | 1 |
| Revenue $ Million | 17 | 46 | 139 | 28 | 50 | 108 | 28 | 54 | 80 |
| GM Percent | 81 | 83 | 72 | 57 | 60 | 65 | 63 | 64 | 64 |
| SG&A Percent | 35 | 39 | 31 | 40 | 28 | 31 | 30 | 25 | 28 |
| R&D Percent | 22 | 22 | 15 | 14 | 9 | 12 | 12 | 11 | 11 |
| EBITDA Percent | 23 | 21 | 25 | 3 | 23 | 22 | 21 | 28 | 24 |
| Cash flow Percent | 21 | 16 | 13 | 0 | 16 | 12 | 12 | 20 | 19 |
| Number of employees | 105 | 290 | 640 | 459 | 494 | 845 | 324 | 554 | 703 |

Fig. 31

EARLY BLUEPRINT FINANCIALS

Fig. 32

|  | Blueprint trajectory | | | Company plan | | |
|---|---|---|---|---|---|---|
|  | -1 | 0 | 1 | -1 | 0 | 1 |
| Revenue $ Million | 17-28 | 46-54 | 80-139 | 17 | 42 | 99 |
| GM Percent | 63-81 | 60-83 | 64-72 | 57 | 60 | 65 |
| SG&A Percent | 35-40 | 25-39 | 28-31 | 40 | 28 | 31 |
| R&D Percent | 12-22 | 9-22 | 11-15 | 14 | 9 | 12 |
| EBITDA Percent | 20-23 | 21-28 | 22-25 | 3 | 23 | 22 |
| Cash flow Percent | 12-21 | 16-20 | 12-19 | 0 | 16 | 12 |
| Number of employees | 100-400 | 290-550 | 600-850 | 459 | 494 | 845 |

Assessment

6-YEAR TRAJECTORY VS IP PLAN

| | 6 year trajectory | | | IP plan | | |
|---|---|---|---|---|---|---|
| | -1 | 0 | 3 | 1 | 2 | 3 |
| Revenue $ Million | 108 | 174 | 265 | 102 | 195 | 354 |
| GM Percent | 65 | 64 | 63 | 51 | 52 | 51 |
| SG&A Percent | 31 | 30 | 29 | 24 | 21 | 21 |
| R&D Percent | 12 | 11 | 10 | 22 | 15 | 13 |
| EBITDA Percent | 22 | 23 | 24 | 3 | 11 | 10 |
| Cash flow Percent | 12 | 16 | 17 | | | |
| Number of employees | 845 | 1,206 | 1,700 | | | |

DISGUISED EXAMPLE

Assessment?

- Tracking to the 6 year mean?
- Why is the revenue above the mean in year 3?

- Why is EBITDA below the mean?

Fig. 34A

SCORECARD – DIVISION IP (Total Score 23)

*DISGUISED EXAMPLE*

Pitfall (1) — Distinctive (5)

| | Pitfall (1) | 2 | 3 | 4 | Distinctive (5) |
|---|---|---|---|---|---|
| Founder/founding team who can shape an opportunity | | •Deep technical expertise<br>•Modest market connections<br>•No CEO-level skills | | | |
| Innovative core engineering team | | | •Strong core technology skills<br>•Mature team<br>•Mixed track record in delivering product | | |
| Technology discontinuity/value proposition | | | | •Standards-based system<br>•Best in class reliability<br>•Features at par | |
| Management team who can execute | | •Restructured team<br>•Performance has plateaued<br>•No clear plan in place | | | |
| Involved smart investors and board | •No Board expertise in this business<br>•No Advisory Board in place<br>•No exec. sponsorship | | | | |
| Leverage strategic alliances | | •Broad targeting<br>•Scaling proposition is powerful<br>•Fortified direct touch | •Aspect partnership well positioned<br>•Need additional access to installed base | | |
| Target/shape high-growth market segment | | | | | |
| Secure marquee customers | | •Some reference accounts, but no "lighthouse"<br>•No plan directed at marquee customers | | | |

SUCCESS BASED METHODOLOGY (Pyramid diagram, top to bottom layers:)
- P&L scorecard / Essentials scorecard
- P&L models / Managerial essentials
- P&L analysis/database / Key facts aligned to essentials
- Fact based analysis of successful companies
- Company financials / Synthesis of company history / Interviews Refer to Fig. 37, 41

- Quantitative tools based on companies who performed to the success pattern

- Descriptions and models to convert quantitative and qualitative measures to scorecard
- Detailed descriptions of success based pattern

- Underlying facts and analysis aligned to essentials and P&L models of successful companies
- Comparative analysis of companies founded in the same year going after the same product market

- Analysis of successful companies who made it from startup to over $400M revenue (typically over the past 20 years)
- Analysis of comparative companies who failed/struggled going after the same market of the most successful companies

FINANCIAL NORMALIZATION PROCESS

Fig. 37

| | Trajectory year | -2 | -1 | 0 | 1 | 2 | 3 | 4 |
|---|---|---|---|---|---|---|---|---|
| | | Dec-96 | Dec-97 | Dec-98 | Dec-99 | Dec-00 | 1-Dec | 2-Dec |
| EBAY INC | % NASDAQ CHANGE | 22.70515 | 21.63544 | 39.63066 | 85.58529 | -39.289 | -21.0531 | -31.5264 |
| EBAY INC | Sales-Net | 0.372 | 5.744 | 47.352 | 224.724 | 431.424 | 748.821 | 1214.1 |
| EBAY INC | Sales % Change-1 Yr | @NA | 1444.086 | 724.373 | 374.582 | 91.98 | 73.57 | 62.135 |
| EBAY INC | Gross Profit Margin | 96.774 | 88.301 | 87.696 | 83.053 | 86.362 | 88.68 | 87.378 |
| EBAY INC | R&D Expense | 0.028 | 0.831 | 4.606 | 23.785 | 55.863 | 75.288 | 104.636 |
| EBAY INC | SG&A Expense | 0.105 | 3.511 | 33.527 | 162.796 | 297.994 | 436.988 | 630.086 |
| EBAY INC | Earnings Before Int & Taxes | 0.253 | 1.487 | 6.311 | 3.195 | 36.544 | 140.426 | 354.197 |
| EBAY INC | Net Income (Loss) | 0.148 | 0.874 | 2.398 | 10.828 | 48.294 | 90.448 | 249.891 |
| EBAY INC | 1 Year Total Return | @NA | @NA | @NA | 55.674 | -47.279 | 102.727 | 1.375 |
| EBAY INC | Market Value Fiscal Yr End | @NA | @NA | 9713.69 | 16191.5 | 8840.601 | 18405.6 | 20938.21 |
| EBAY INC | Com Shares Issued | @NA | @NA | 483.036 | 519.128 | 538.5 | 554.518 | 622.554 |
| EBAY INC | Price-Close Calendar Year | @NA | @NA | 20.104 | 31.297 | 16.5 | 33.45 | 33.91 |
| EBAY INC | EPS Basic Exc Extra Items | 0.006 | 0.009 | 0.012 | 0.025 | 0.095 | 0.17 | 0.435 |
| EBAY INC | Price/Earnings | @NA | @NA | 652.027 | 1788.393 | 275 | 202.727 | 101.224 |
| EBAY INC | Beta | @NA | @NA | @NA | @NA | 3.814 | 3.551 | 2.821 |
| EBAY INC | Return on Investment | 91.358 | 19.087 | 2.785 | 1.248 | 4.651 | 6.116 | 6.935 |
| EBAY INC | ROI % Change- 1 Year | @NA | -79.107 | -85.408 | -55.185 | 272.595 | 31.504 | 13.387 |
| EBAY INC | Return on Equity | 93.671 | 81.899 | 2.785 | 1.27 | 4.764 | 6.329 | 7.026 |
| EBAY INC | ROE % Change- 1 Yr | @NA | -12.567 | -96.599 | -54.396 | 275.048 | 32.852 | 11.021 |
| EBAY INC | Debt - Total | 0.001 | 0.563 | 0 | 27.303 | 26.676 | 28.119 | 16.768 |
| EBAY INC | Free Cash Flow | 0.088 | 0.109 | @CF | -23.76 | 50.238 | 194.373 | 341.233 |
| EBAY INC | Invested Capital-Total | 0.162 | 4.338 | 84.445 | 867.485 | 1038.412 | 1478.897 | 3603.503 |
| EBAY INC | PGI Index | @NA | 0.167 | 0.018 | 0.01 | 0.036 | 0.029 | 0.044 |
| EBAY INC | Employees | 0.006 | 0.041 | 0.138 | 1.212 | 1.927 | 2.56 | 4 |

1. Steps
   For each company, identify the trajectory year 0 when revenue is between $30-70m
   Align companies to year 0
   Normalize market caps based on Nasdaq index
   Create P&L comparative metrics based on trajectory year – not calendar year

IDENTIFICATION OF BUSINESSES WITH POTENTIAL TO ACHIEVE SUPERIOR REVENUE GROWTH AND FINANCIAL PERFORMANCE

CROSS REFERENCE TO RELATED APPLICATION

This application is a continuation-in-part application of application Ser. No. 10/994,212, filed Nov. 19, 2004, the disclosure of which is incorporated herein by reference, and which claims the benefit of U.S. Provisional Application No. 60/524,414, filed on Nov. 21, 2003.

BACKGROUND OF THE INVENTION

This invention relates to methods of identifying businesses with potential to achieve superior financial performance, and to the use of such methods in the selection of investments, the management of investment portfolios, the allocation of resources between business units, and the management of businesses.

From about 1980 to the present, of the 21,581 publically listed U.S. companies, there were 8,626 IPOs across all sectors. Of these companies 4,425 are active today, with the difference having been acquired or merged, or having gone out of business. Of these 4,425 companies, 548 achieved over $1 billion revenue since 1980. Of these 548 companies, 451 went public with revenues less than $1 billion. The ability to identify factors that enabled the growth of these top businesses would be useful both in selecting companies for investment, ranking businesses, allocation of resources between businesses; and in managing a business to achieve financial goals. This set defines America's highest growth companies; those companies who went from founding to $1 billion in annual revenue. The set is defined as publically listed companies, active as of November 2004, with the headquarters location and ownership in the United States.

SUMMARY OF THE INVENTION

Generally, this invention relates to methods of identifying businesses with potential to achieve superior growth and financial performance, and to the use of such methods in the selection of investments, the management of investment portfolios, the allocation of resources between business units, and the management of businesses. Various aspects have been identified as important to the success of businesses, including financial modeling, revenue modeling aligned to marquee customers, number and role of alliances, number and profile of board members and value proposition waves and the number of essentials required to build a scalable business. As a result, quantitative processes can be derived from this pattern to give key indications as to future potential. A focus of the methods of this invention was on the growth lifecycle of the top 548 companies that reached $1 billion in annual revenue.

One preferred embodiment of this invention provides a method of identifying businesses with above-average revenue growth potential by selecting from a plurality of companies with annual revenues of at least $30 million, those companies with revenue growth rates that are within the growth rates of the three trajectories identified.

Another preferred embodiment of this invention provides a method of evaluating at least one target business by identifying a plurality of model businesses that have achieved a desired financial performance; identifying at least one financial statistic common to the model businesses; comparing the at least one financial statistic common to the model businesses with at least one financial statistic of the at least one target business; and evaluating the at least one target business based upon its comparison with the model businesses.

Another preferred embodiment of this invention provides a method of investing in businesses comprising preferentially investing in target businesses selected by identifying a plurality of model businesses that have achieved a desired financial performance; identifying at least one financial statistic common to the model businesses; comparing the at least one financial statistic common to the model businesses with at least one financial statistic of the at least one target business; and evaluating the at least one target business based its comparison with the model businesses.

Another preferred embodiment of this invention provides a method of allocating resources among several target businesses within an enterprise by preferentially allocating resources to target businesses in the enterprise selected by identifying a plurality of model businesses that have achieved a desired financial performance; identifying at least one financial statistic common to the model businesses; comparing the at least one financial statistic common to the model businesses with at least one financial statistic of the at least one target business; and evaluating the at least one target business based its comparison with the model businesses.

Another preferred embodiment of this invention provides a method of ranking at least two target businesses based upon outlook for financial performance by identifying a plurality of model businesses that have achieved a desired financial performance; identifying at least one financial statistic common to the model businesses; and ranking each of the target businesses based upon the at least one financial statistic Another preferred embodiment of this invention provides a method of managing a target business to achieve a desired financial performance, the method comprising: identifying a plurality of model businesses that have achieved a desired financial performance; identifying at least one financial statistic common to the model businesses; managing the operation of the target business to match the at least one financial statistic common to the model businesses.

Another preferred embodiment of this invention provides a method of investing by preferentially investing in businesses with above-average growth potential by selecting from a plurality of companies with annual revenues of at least $30 million, those companies whose gross margins exceed 55%, whose EBITDA exceed 20%, and who had a positive case flow since annual revenues exceeded 50 million.

Another preferred embodiment of this invention provides method of allocating resources between businesses by preferentially allocating resources in businesses with above-average growth potential by selecting from a plurality of companies with annual revenues of at least $30 million, those companies whose gross margins exceed 55%, whose EBITDA exceed 20%, and who had a positive case flow since annual revenues exceeded 50 million.

Another preferred embodiment of this invention provides a method of identifying target businesses with above-average potential to achieve a selected financial performance target by identifying a plurality of model businesses which have already achieved the selected financial performance target; identifying financial statistics common to the identified model businesses; screening target businesses for the financial statistics common to the identified businesses.

Another preferred embodiment of this invention provides a method of identifying a business with above average growth potential by one or more of filtering out businesses that have less than a threshold revenues; filtering out businesses that did not reach a threshold revenue within a specified window of time; filtering out businesses that did have a minimum growth rate as specified times; filtering out businesses that did not maintain gross margins of at a specified rate; filtering out businesses that did not maintain EBITA at a specified rate; filtering out businesses that did not maintain specified positive cash flow; filtering out businesses whose market capitalization to annual revenue ratio is not greater than 3 after annual revenues first exceeded $50,000,000; filtering out businesses whose market capitalization to annual revenue ratio is greater than 4 after annual revenues first exceeded $50,000,000; filtering out businesses that did not have an employee of a customer on its board of directors; filtering out businesses that did not have a customer as a investor; filtering out businesses that did not recruit at least one officer from a competitor; filtering out businesses that do not have the fastest growing sales in at least one category; filtering out businesses that do not have as a customer a publicly traded company that allows its name to be used in connection in connection with promotion of the businesses' products or services; filtering out businesses that do not have as a customer a publicly traded company that allows its name to be used in connection with promotion of the businesses' products or services; and has an officer, director or employee that sits on the board of the business; filtering out businesses that do not have a co-selling agreement with a publicly traded entity; filtering out businesses that do not have a joint selling or joint marketing arrangement with a publicly traded entity that has an officer, director, or employee that sits on the board of the business; filtering out businesses that do not have as a director an officer, director, or employee from a company that purchases the businesses' products or services, or an officer, director or employee from a company that jointly sells a product or service with the business' product or service; filtering out businesses that do not have as a director an officer, director, or employee from a company that purchases the businesses' products or services, and an officer, director or employee from a company that jointly sells a product or service with the business' product or service.

Another preferred embodiment of this invention provides a method of comparing two or more businesses to determine the business with the greatest potential for growth by evaluating each of the companies under consideration and scoring them based upon: scoring the founding team based on a plurality of specified factors; scoring the engineering team based upon a plurality of specified factors; scoring the technology discontinuity/value proposition based upon a plurality of specified factors; scoring the management team based upon a plurality of specified factors; scoring the investors based upon a plurality of specified factors; scoring the strategic alliances based upon a plurality of specified factors; scoring the market segment based upon a plurality of specified factors; scoring the marquee customers based upon a plurality of specified factors; and selecting the company with the greatest cumulative score.

Another preferred embodiment of this invention provides a method of comparing two or more businesses to determine the business with the greatest potential for growth by evaluating each of the companies under consideration and scoring them based upon: scoring the founding team based on a plurality of specified factors; scoring the engineering team based upon a plurality of specified factors; scoring the technology discontinuity/value proposition based upon a plurality of specified factors; scoring the management team based upon a plurality of specified factors; scoring the investors based upon a plurality of specified factors; scoring the strategic alliances based upon a plurality of specified factors; scoring the market segment based upon a plurality of specified factors; scoring the marquee customers based upon a plurality of specified factors; and selecting companies with scores in excess of a predetermined threshold.

Another preferred embodiment of this invention provides a method of investing by preferentially investing in companies with above-average prospects for growth, identified by the methods of the evaluation methods of this invention.

Another preferred embodiment of this invention provides a method of managing an investment portfolio by preferentially investing in businesses with above-average growth potential selected in accordance with the evaluation methods of this invention.

Another preferred embodiment of this invention provides a method of managing a business for above-average growth potential, by one or more of the following active management steps: achieving threshold revenues; achieving threshold revenues within a specified window of time; achieving minimum growth rates at specified times; maintaining gross margins at a specified rate; maintaining EBITA at a specified rate; maintaining specified positive cash flow; maintaining market capitalization to annual revenue ratios above specified minimums; attracting customers as investors; recruiting officers from competitors; leading sales growth in at least one category; attracting as customers publicly traded that allows their name to be used in connection in connection with promotion of the businesses' products or services; attracting as board members employees of customers who are publicly traded companies that allows their name to be used in connection with promotion of the businesses' products or services; entering into co-selling agreement with a publicly traded entities; entering into joint selling or joint marketing arrangements with a publicly traded entity that have an officer, director, or employee who is a board member; having an officer, director, or employee from a customer and/or a joint selling partner, on the board.

Another preferred embodiment of this invention is the success based methodology that is the basis for this patent. The methodology is based on a pyramid problem solving structure that synthesizes financial models and the essentials required to achieve this performance into a set of quantitative measures. The methodology is success based on identifying the pattern across the companies who went from founding to $1 B revenue. The process of normalizing the financials and histories enables the patterns identified in this patent.

BRIEF DESCRIPTION OF THE DRAWINGS

FIG. 1 is a graph showing the disposition of businesses after initial public offering between 1980 and 2000;

FIG. 2A is a graph showing the annual revenue since inception for business not achieving $1 billion revenue vs. businesses exhibiting superior revenue growth (those who achieved $1 billion revenue), each of which has exponential revenue growth;

FIG. 2B is a graph showing three components of the pattern of exponential growth;

FIG. 2C is a graph showing the exponential revenue curves for the 451 companies that went public since 1980 with annual revenues of less than $1 billion, generated by overlaying the revenue curves at the inflection point;

FIG. 3A is a graph showing the three revenue trajectories of selected businesses that achieved $1 billion in annual revenues;

FIG. 3B is a graph of companies who bypassed the inflection point to breakout to $1 billion (i.e., did not follow the 3 trajectories);

FIG. 3C is a graph showing the revenue min-max for the 3 trajectories;

FIG. 3D is a graph showing the revenue min-max for the 3 trajectories followed by three graphs showing equations for the min-max for Four-Year Trajectory;

FIG. 3E is a graph showing the revenue min-max for the 3 trajectories followed by three graphs showing the equations for the min-max for Six-Year Trajectory;

FIG. 3F is a graph showing the revenue min-max for the 3 trajectories followed by three graphs showing the equations for the min-max for Twelve-Year Trajectory;

FIG. 3H shows the process for forecasting revenue growth rates and to screen that companies identified to be on a trajectory, are screened for performance to stay on trajectory;

FIG. 4A is a chart showing the distribution of the 451 companies that went public since 1980 with less than $1 billion in annual revenue by sector;

FIG. 4B is a graph of gross margins for information technology businesses in each of the three annual revenue trajectories shown in FIG. 3;

FIG. 4C is a graph of EBIDTA for businesses in each of the three annual revenue trajectories shown in FIG. 3;

FIG. 4D is a graph of cash flow for businesses in each of the three annual revenue trajectories shown in FIG. 3;

FIG. 4E is a graph of gross margins and EBITDA at year 1 for Four-Year, Six-Year, and Twelve-Year Trajectory businesses in different industries;

FIG. 6A is a graph of the Four-Year Trajectory for reaching $1 billion in annual revenue;

FIG. 6B is a graph of the Six-Year Trajectory for reaching $1 billion in annual revenue;

FIG. 6C is a graph of the Twelve-Year Trajectory for reaching $1 billion in annual revenue;

FIG. 6D is an graph of a first exemplary business on the Twelve-Year Trajectory;

FIG. 6E is an graph of a first exemplary business on the Twelve-Year Trajectory;

FIG. 11 is a diagram of sales attributes of businesses that reached $1 billion in annual revenue;

FIG. 13B is a table of the role and types of marquee customers;

FIG. 13C is a graph illustrating the role of marquee customers;

FIG. 13D is a table comparing small customers with marquee customers;

FIG. 13E is a table illustrating examples of asymmetrical alliances;

FIG. 13F is a table illustrating the role of asymmetrical alliances;

FIG. 14 is a schematic diagram of cash management attributes of businesses that reached $1 billion in annual revenue;

FIG. 15 is a diagram of some of the drivers of scalable cash management of businesses that reached $1 billion in annual revenue;

FIG. 18 is a diagram of R&D, sales, and cash management attributes for managing a business in accordance with the principles various embodiments of this invention;

FIG. 19 is a schematic diagram of a screening process in accordance with the principles of the various embodiments of this invention;

FIG. 20 is a diagram of a scorecard for comparing two businesses;

FIG. 21 is a chart of financial statistics (the mean P&L for the information technology sector) of exemplary actual companies that followed the Four-Year Trajectory to $1 billion in annual revenue;

FIG. 22 is a chart of financial statistics (the mean P&L for the information technology sector) of exemplary actual companies that followed the Six-Year Trajectory to $1 billion in annual revenue;

FIG. 24 is a diagram of a sample scorecard for evaluating businesses in accordance with some embodiments of the present invention;

FIGS. 25A-25C are diagrams relating to score cards for comparing businesses;

FIG. 25A is a diagram of a possible application of a scorecard in comparing businesses in accordance with some embodiments of this invention;

FIG. 25B is a first example of an actual comparison between two companies using score cards in accordance with the principles of some embodiments of this invention;

FIG. 25C is a second example of an actual comparison between two companies using score cards in accordance with the principles of some embodiments of this invention;

FIG. 26A is a diagram of a possible application of a scorecard in evaluating a business in accordance with some embodiments of this invention;

FIG. 27 is a schematic diagram illustrating the time from inception to the Inflection Point for a sample of the companies from the information technology sector;

FIG. 29A is a table for evaluating a business in accordance with embodiments of the present invention;

FIG. 29B is a table for evaluating a business in accordance with embodiments of the present invention;

FIG. 31 is a table of financial statistics for Four-Year; Six-Year, and Twelve-Year Trajectory businesses;

FIG. 32 is a table showing a comparison between a target business with the Four-Year Trajectory;

FIG. 34A is a an example of a comparison between the six year trajectory with planned performance of a business, as might be done for management purposes;

FIG. 34B is an example of a report card on the same business in the comparison in FIG. 34A, as might be done for management purposes;

FIG. 35 is a schematic diagram of a success-based methodology in accordance with the principles of some embodiments of this invention;

FIG. 37 is a chart illustrating the normalization process for a exemplary business in accordance with the principles of some embodiments of this invention;

DETAILED DESCRIPTION OF THE INVENTION

Various embodiments of this invention relate to evaluating and/or comparing businesses. As used herein the term "business" can mean a standalone company, such as a corporation or limited liability company, but it can also mean a division or business unit of a larger entity. The methods of evaluating and comparing businesses can be applied to investment decisions (e.g., whether or not to invest); portfolio management (e.g. whether or not to add, retain, or remove a particular business from an investment portfolio); and due diligence in business acquisitions and divestitures. The methods of evaluating and comparing business can also be used in the management of businesses.

As illustrated in FIG. 1, from about 1980 to the present, of the 21,581 publicly listed U.S. companies, there were 8,626 IPOs across all sectors since 1980. Of these companies 4,425 are active today, with the difference having been acquired, merged or gone out of business. Of these 4,425, active companies, 548 achieved over $1 billion revenue since 1980. Of these 548 companies, 451 IPO with revenue less than $1 billion. As illustrated in FIG. 2, of the businesses that achieve above-average growth, and particular, those which achieve $1 billion revenues, these businesses demonstrate highly variable incubation periods, and different growth rates, but each demonstrated exponential revenue growth.

FIG. 2A demonstrates the revenue growth pattern identified broke into three parts. The first graph, a traditional view, highlights that growth had a basic pattern; variable time from founding to an inflection point (knee of the curve), followed by a variable exponential growth rate. FIG. 2B shows that growth of the most successful high growth companies had two parts, time to $30-$70 million revenue was highly variable with the mean of 5.3 years at $50 million+/−20 million FIG. 27, and a definitive range of exponential growth rates to $1 billion annual revenue.

Figure 3G:
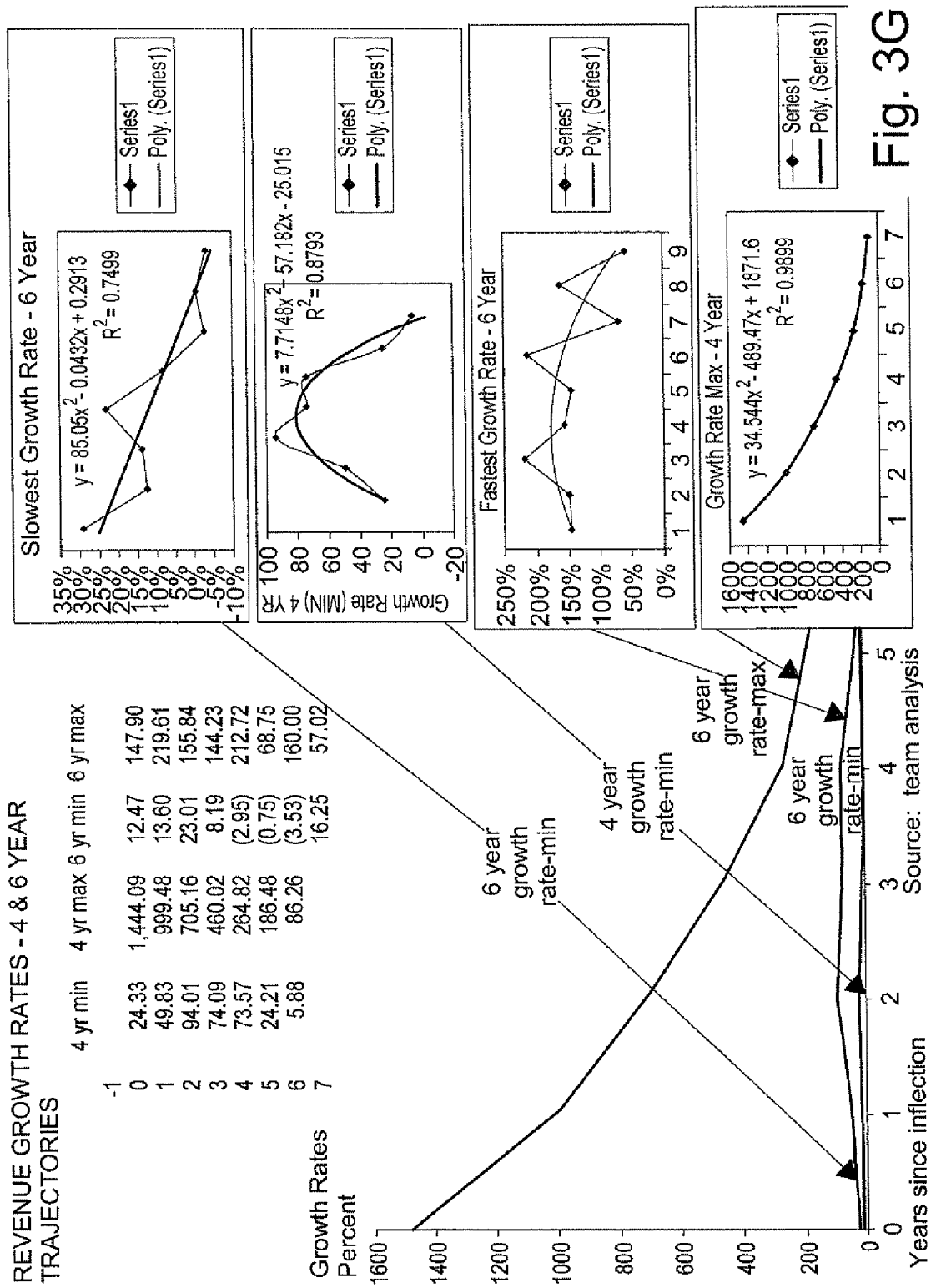
FIG. 3G is a graph showing the revenue growth rates for businesses following the min-max of the Four-Year, Six-Year Trajectories.

More specifically, the inventor has discovered that, as shown in FIG. 3A, revenue growth for above-average growth companies, i.e., those that reach $1 billion in annual revenue, is characterized by two things: First, the time to reach approximately $50 million in annual revenue (the "Inflection Point"), which for these companies has a mean of 5.3 years from inception (year that the company was founded). (See FIG. 27). Second, from the Inflection Point, the time to reach $1 billion in annual revenue (for those companies that will reach $1 billion in annual revenue) typically takes one of three trajectories. A first group reaches $1 billion in annual revenue in 3.5±0.5 years (the "Four-Year Trajectory"); a second group reaches $1 billion in 6±1 years (the "Six-Year Trajectory"); and a third group reaches $1 billion in 12±2 years (the "Twelve-Year Trajectory"). Companies in each of these trajectories are defined by distinctly different revenue growth rates, as shown in FIG. 3A. There was a group of a few companies who were exceptions; those companies who bypassed the inflection point (FIG. 3B) with no common pattern to $1 billion. These companies broke out by growing from <$20m to >$80m in one year.

The revenue trajectories are characterized by minimum and maximum curves which are the ranges for fastest and slowest companies in each of the trajectories. Bach trajectory minimum-maximum curve is characterized by definitive data points and an exponential equation with high R squared. FIGS. 3C, 3D, 3E and 3F are the specific data and equations for each of the 4, 6 and 12 year trajectories. The growth rates for each of the min-max curves are included in FIG. 3C. Within each of the growth trajectories, company growth can vary as long as they grow within the min-max limits. The inventor identified the growth rates ranges, for the 4 and 6 year trajectories, on a per year basis as indicated in FIG. 4G. The growth rates for the 12 year trajectory are too highly variable; therefore the companies must grow between the min-max trajectory bounds of the 12 year trajectory to any growth rate range.

Figure 23:
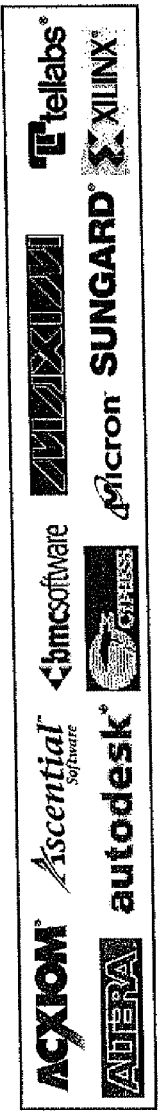
FIG. 23 is a chart of financial statistics (the mean P&L for the information technology sector) of exemplary actual companies that followed the Twelve-Year Trajectory to $1 billion in annual revenue.

FIGS. 21, 22, and 23 show the mean P&Ls for information technology companies in each of the three trajectories. The P&Ls highlight that companies were cash flow positive early and scaled. This performance was driven by achieving exponential revenue growth, achieving attractive and sustainable gross margins, R&D/SG&A spending limited to achieve over 10% EBITDA. Free Cash Flow from operations was therefore best in class. This is in contrast to the tech bubble of the early 2000's when prevailing wisdom was to be cash flow negative in order to scale.

A first indicator of businesses with above-average growth potential is consistent revenue growth rates aligned to one of the 3 trajectories. The inventor determined that the companies being screened have growth rates that align to each of the 3 trajectories. The process in FIG. 3H indicates that companies can be screened to be identified to be on one of the 3 trajectories based on revenue level and growth rate. The growth rate determines which trajectory the company is on. Based upon the company's position between the min-max curves of each trajectory, the net weighted average growth rate forecasts the expected position. If the company growth rate causes the company's revenue to drop below the minimum revenue curve, the company is screened out of the sample.

For each sector, companies can be screened for building quality financial performance. For the information technology sector, as a sector example, these companies had positive cash flow. In each of the Four-Year, Six-Year or Twelve-Year Trajectories, the above-average growth businesses (e.g., those that eventually reached $1 billion in annual revenue) consistently achieved at least 55% gross margins. See FIG. 4B. In each of the Four-Year, Six-Year, or Twelve-Year Trajectories, the above-average companies managed selling, general and administrative (SG&A) costs, and research and development (R&D) costs to maintain earnings before interest, taxes, depreciation and amortization of (EBITDA) of at least 20%. See FIG. 4C. Finally, in each of the Four-Year, Six-Year, or Twelve-Year Trajectories, the companies managed to maintain positive cash flow from operations as early as $25 million in annual revenues. See FIG. 4D.

Figure 5:
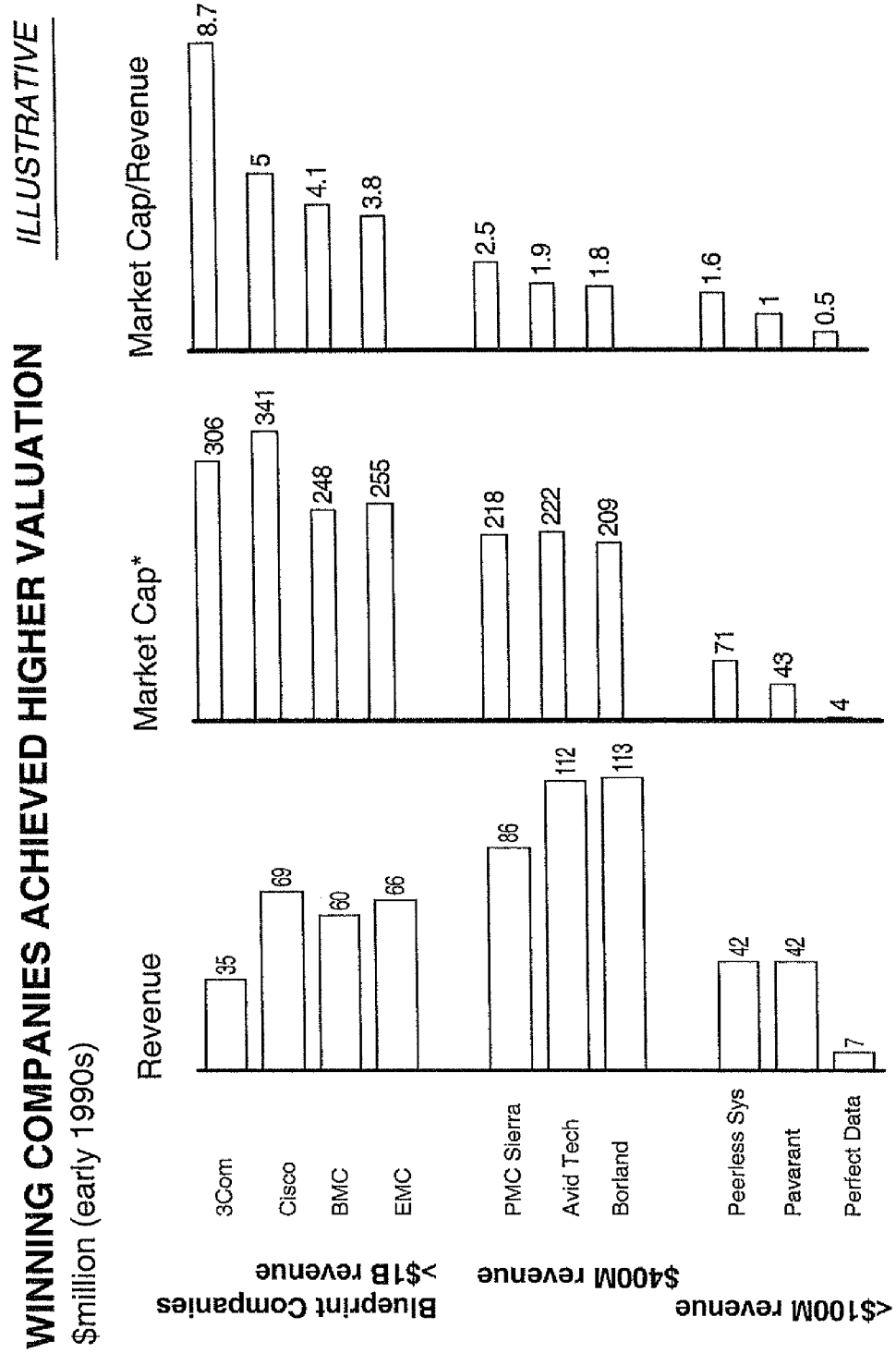
FIG. 5 is a graph illustrating revenue, market capitalization, and market capitalization to revenue for businesses with less than $100 million in annual revenue, with about $400 million in annual revenue, and more than $1 billion in annual revenue.

Another indicator of companies with higher than average growth potential can be the ratio of market capitalization to revenue. As shown in FIG. 5, businesses with higher than average growth potential (e.g., those that eventually reached $1 billion in annual revenue) had market capitalization to revenue ratios greater than 3, and more preferably at least about 4 or more. In comparison, businesses with $400 million in annual revenues had market capitalization to revenue ratios of less than about 3 and companies with less than $100 million in annual revenue had market capitalization to revenue rations of less than about 2. This chart demonstrates that around $60-100 million revenue, companies on the right trajectory are recognized by the investment community for their potential. The above P&L models, of the companies who made it to $1 billion are more highly rewarded. The data was a select group of companies from the early 1990s (equivalent to where the NASDAQ is today). The valuation of these companies was roughly proportional to the NASDAQ index. These winning companies had distinctively higher growth rates and consistent EBITDA performance that was superior to other companies. This superior financial performance drove the higher valuations.

The four growth phases that characterize a company with above-average growth potential are illustrated in FIG. 6A for a 4 year trajectory company. As shown in FIG. 6A, these phases can be characterized as "Business Development", "Inflection", "Break Out", and "Segment Leader". (FIGS. 6B and 6C show the curves exist for the 6 and 12 year trajectories, in which they remain the same). The Business Development phase is the founding year to the inflection phase. The growth in the 4 year example is about 3×. During the inflection phase, the growth is about 5×. This phase is where the business system is formed and the company determines which trajectory it has the option for. The Breakout phase is the phase to $400 million in annual revenue. At this point companies can fail to break through to become a market Segment Leader as their product line does not diversify or scale.

For the mean 4 year trajectory business shown in FIG. 6A, during the Business Development Phase, annual revenues ranged from $8 to $30 million, with a 360% CAGR. During the Inflection Phase, annual revenues ranged from $30 to $70 million, with a 518% CAGR. This particular business was additionally recognized as one of the top high growth start-ups. In the Breakout Phase, annual revenue grew from $ $254, average CGAR is 220%. Finally, in the Segment Leader Phase, annual revenue grew from $254-$720 million to $1 billion, with about 138% CAGR. The mean revenue curves with growth rates aligned by phase for the six and twelve year trajectories are in FIGS. 6B and 6C respectively. The application of these phases to two real world examples is shown in FIGS. 6D and 6E.

Figure 7:
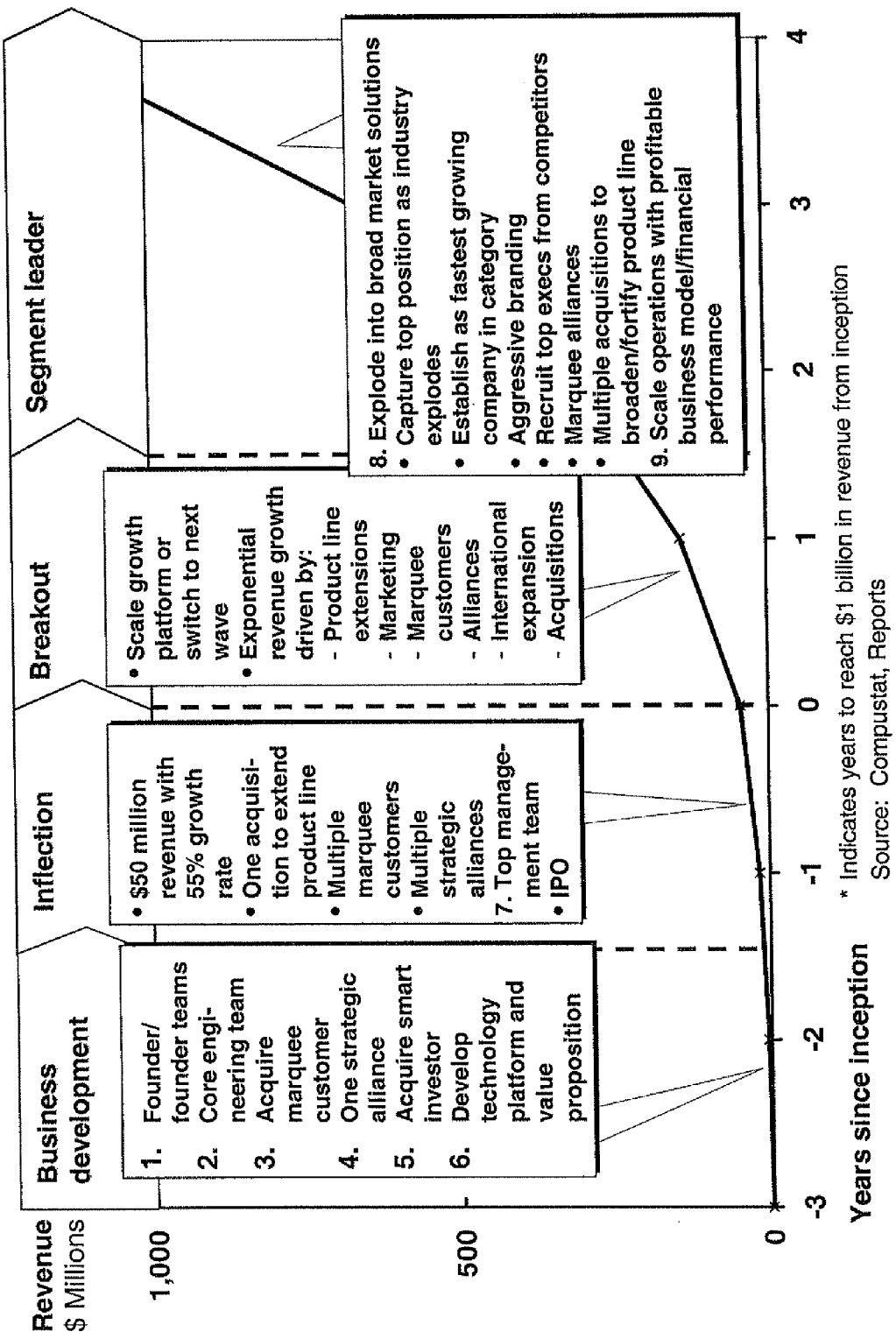
FIG. 7 is a graph of 8 attributes (excluding financials which is a ninth attribute) for reaching $1 billion in annual revenue, illustrating the phases of revenue growth.

FIG. 7 shows important attributes for growth at each phase. In the Business Development Phase, a founder or founder team is in place, a core engineering team is in place, the business acquires a marquee customer, the business acquires a strategic alliance, the business acquires a smart investor, and the business develops a technology platform and value proposition. In the Inflection Phase, the business has $50 million revenue with at least about 55% growth rate; an acquisition to extend product line; multiple strategic alliances; a top management team; and makes an IPO.

As shown in FIG. 7, in the third Breakout Phase, the business has either a scalable growth platform or it switches to the next market wave. The business also has exponential revenue growth. The revenue growth is driven by product line extensions, marketing, marquee customers, alliances, international expansion, and acquisitions.

The common features of businesses in the final Segment Leader phase are one or more of the following: an explosion into broad market solutions; capturing top position as industry explodes; establishment as the fastest growing company in category; aggressive branding; recruiting top executives from competitors; marquee customers and alliances; multiple acquisitions to broaden/fortify product line; and scaling international, distribution, service/support operations.

Across the four phases of company development, at least nine attributes can be identified. These indicators are in place by the inflection phase and scale across the remaining phases. FIGS. 6C and 6D illustrate two case studies followed by the typical profile of the most successful companies.

Figure 8:
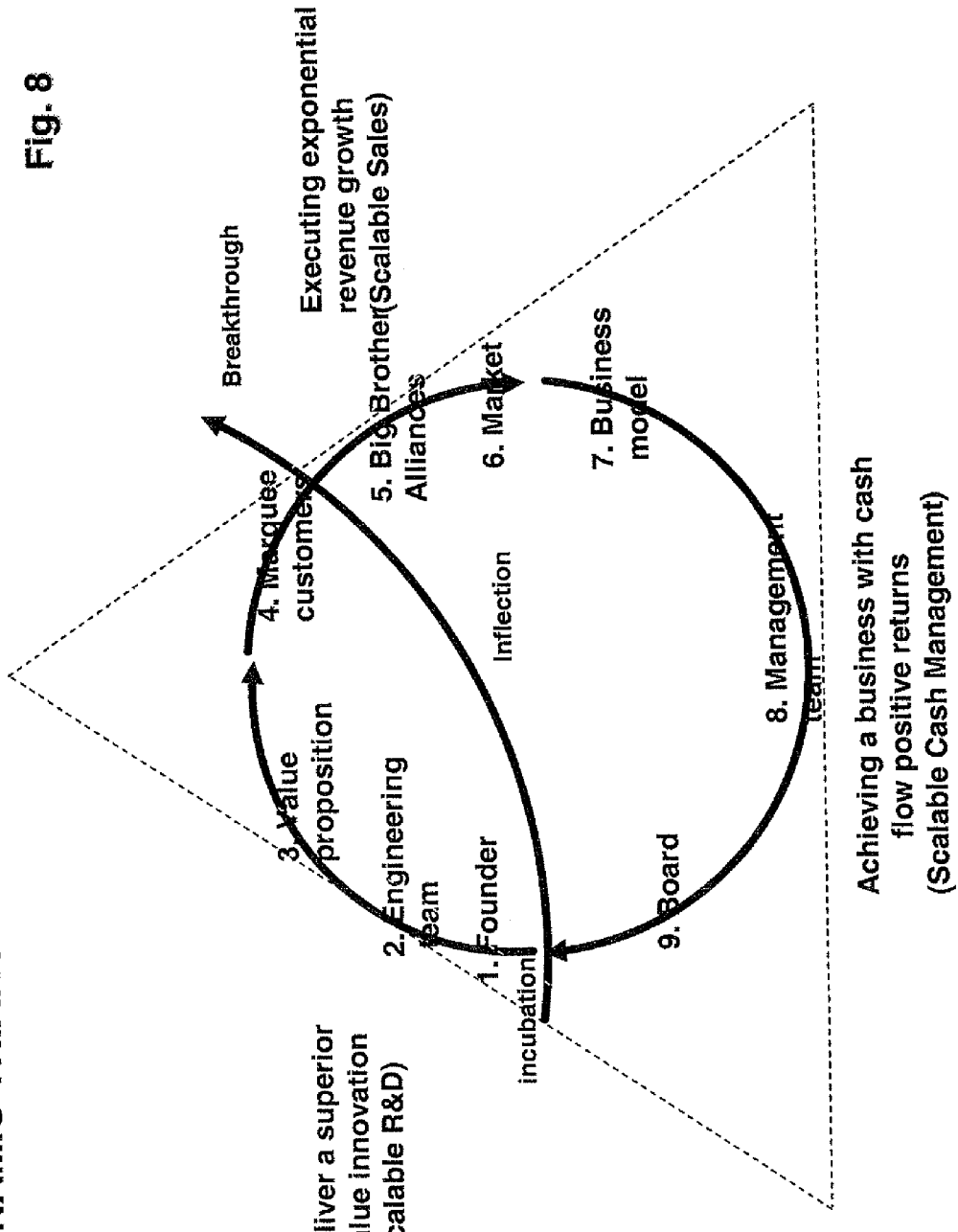
FIG. 8 is a schematic diagram of 9 attributes of businesses that reached $1 billion in annual revenues.

As shown in FIG. 8, three scaling essentials, which can be visualized as the sides of triangle, are: scalable R&D, scalable sales, and scalable cash management. The attributes of scalable R&D include a founder or founding team that can shape an opportunity; an innovative core engineering team, and a technology discontinuity aligned with value proposition discontinuity. The attributes of scalable sales include a marquee customer, asymmetric alliances, and targeting or shaping a high-growth market segment. Finally, the attributes of scalable cash management include a high net margin business model, involved smart investors and directors; and a management team that can execute in the context of a growth strategy.

Scalable Research and Development

Figure 9:
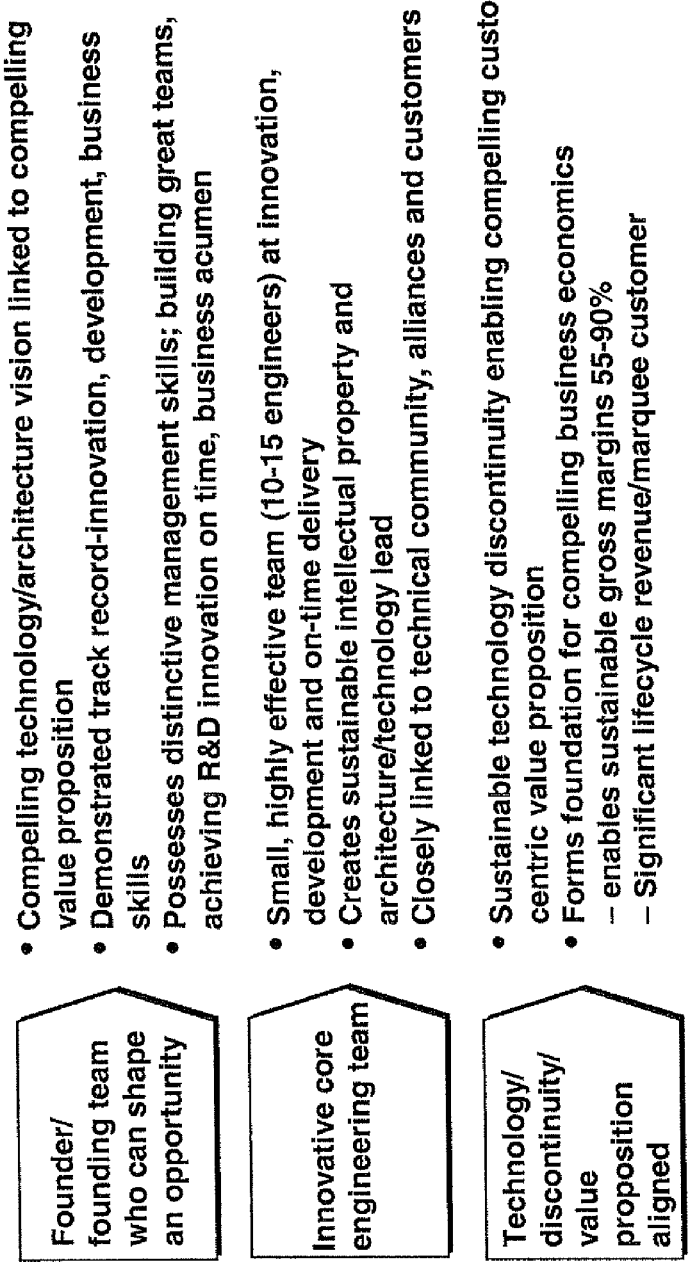
FIG. 9 is a schematic diagram of R&D attributes of businesses that reached $1 billion in annual revenue.
Figure 10A:
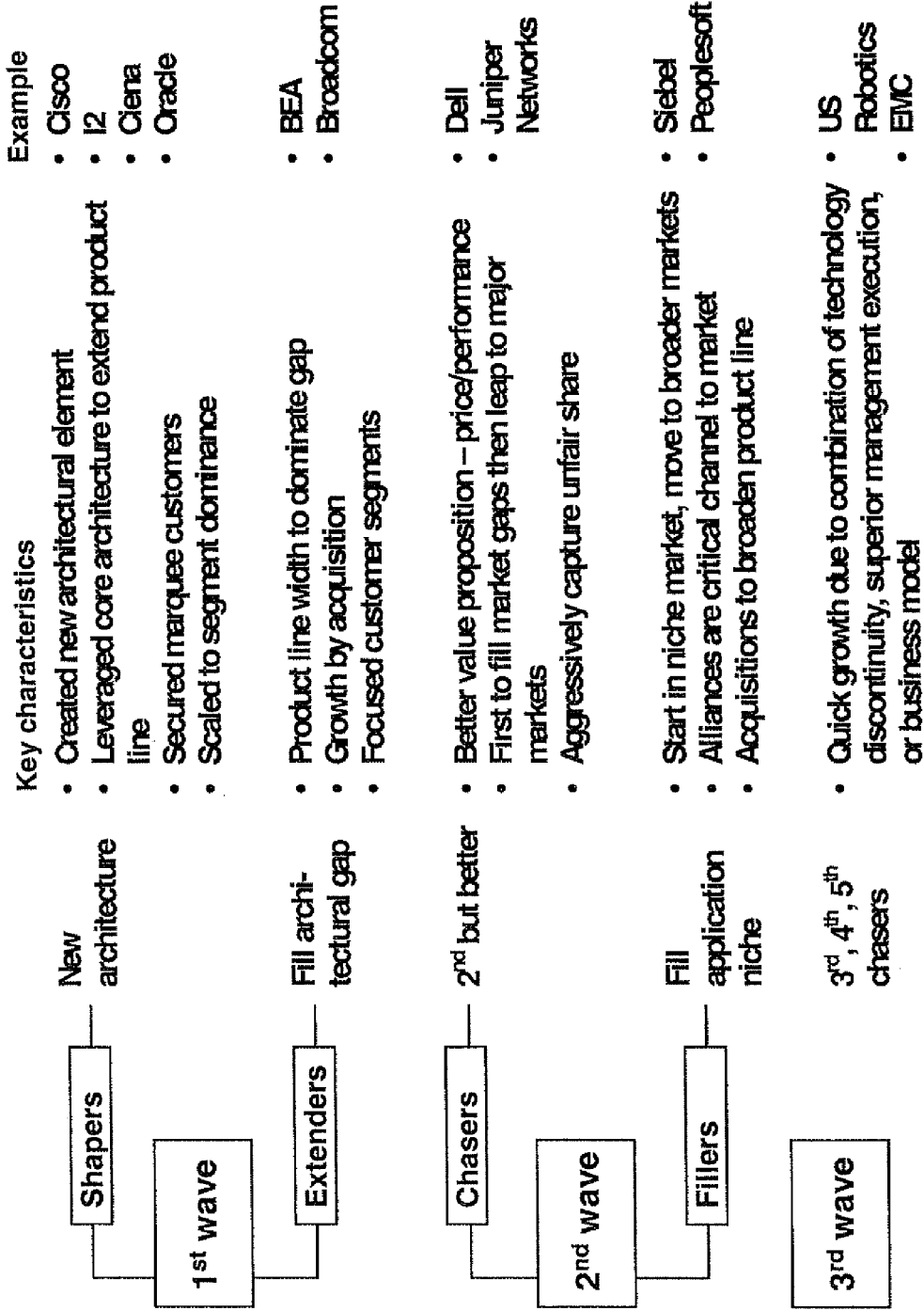
FIG. 10A is a diagram of value proposition platforms relating to one of the R&D attributes of businesses that reached $1 billion in annual revenue.

As shown in FIG. 9, the attributes of scalable research and development include (i) a founder or founding team who can shape an opportunity; (ii) an innovative core engineering team; and (iii) a technology discontinuity aligned with a value proposition discontinuity. Indicators of a founder/founding team that can shape an opportunity include: a compelling technology/architecture vision liked to a compelling value proposition; a demonstrated track record for innovation, development, and business skills; distinctive management skills; team building skills, achieving R&D innovation on time, and business acumen. Indicators of an innovative core engineering team include: a small, highly effective team (e.g., 10 to 15 engineers) at innovation, development, and on time delivery; creation of sustainable intellectual property and architecture/technology lead; close links to technical community, alliances, and customers. Indicators of a technology discontinuity value proposition discontinuity alignment include a sustainable technology discontinuity enabling compelling customer centric value proposition; a foundation for compelling business economics, e.g. sustainable gross margins of 55-90%, and significant lifecycle revenue, and marquee customer. Various types of value proposition platforms are illustrated in FIG. 10A.

While the focus of innovation varies dramatically across industries, all innovation sectors share a common need for applied R&D scalability enabling exponential business growth. Scalable applied R&D is applied R&D that is highly linked to business functions, linked to the customer, remains flexible in its problem solving approach and solutions, and enables a sustainable business model with an expansive value proposition.

Scalable R&D links product development with true customer needs and are willing to iterate in collaboration with the customer. Scalable applied R&D principles require the pursuit of a business model that is attractive, potentially expansive, and can become a primary driver of scalable growth. Scalable applied R&D is therefore composed of 5 key elements: targeting a scalable opportunity, pursuing a scalable solution or architecture, implementing a flexible R&D process, linking product development with marquee customers, and enabling an attractive business model with sustainable margins typically over 50%.

Unscalable research and development occurs when the research and development function fails to leverage other business functions during concept screening and development, or the core engineering team believes its own hype and is not linked to customers. Unscalable research and development also occurs when the team encounters difficulty making the leap from bench to production and has no clear path to scale production at low risk. The time to first meaningful revenue is too long funding drying up. The pursued innovation does not offer access to market adjacencies. Unscalable research and development also occurs when management fails to screen opportunities to identify business models that solve immediate problems and have the potential to transform into broader, categorical, solutions. Business tactics do not effectively accommodate a range of time horizons. Challenges are encountered balancing investment between short and long term in order to scale. Unscalable research and development occurs when development efforts focus on the wrong market and/or fail to reap immediate potential due to pursuit of blue-sky opportunities. The team is unwilling or unable to solicit and react to feedback from key customers. Unscalable research and development occurs when the product offering does not enable attractive and sustainable gross margins.

The common approach to applied R&D development typically involves a generally inflexible R&D process characterized by long laboratory and prototyping efforts before product launch, development schedules based more on time gating than problem resolution, and little linkage to other business functions that would enable a business model that meets true market needs. There are many situations that illustrate that this approach often leads to performance that does not capture the full potential.

In contrast, companies that maintained a scalable R&D approach, was markedly more successful. By adopting the scalable R&D approach, a company can dramatically boost its revenues, and achieve best-in-class ratios. Achieving this best-in-class level of performance requires several fundamental changes; namely redefining the process for targeting opportunities, broadening the scope or scale of a conceivable solution and breaking down the barriers between R&D and customers. The scalable R&D philosophy emphasizes continuous problem solving and iteration based on market feedback instead of simple internal focus. By taking a scalable approach companies realize growth faster.

The decisions made during the scalable R&D process focuses the value proposition into one of 3 waves. (1) First wave shapers create a new architecture or fill an architectural gap. Delivering new architectures requires competing with competitors with outdated technology. (2) Second to market who deliver a better value proposition or fill an application niche. (3) Third, fourth, fifth to market, winning companies out execute the first and second wave players.

Figure 10B:
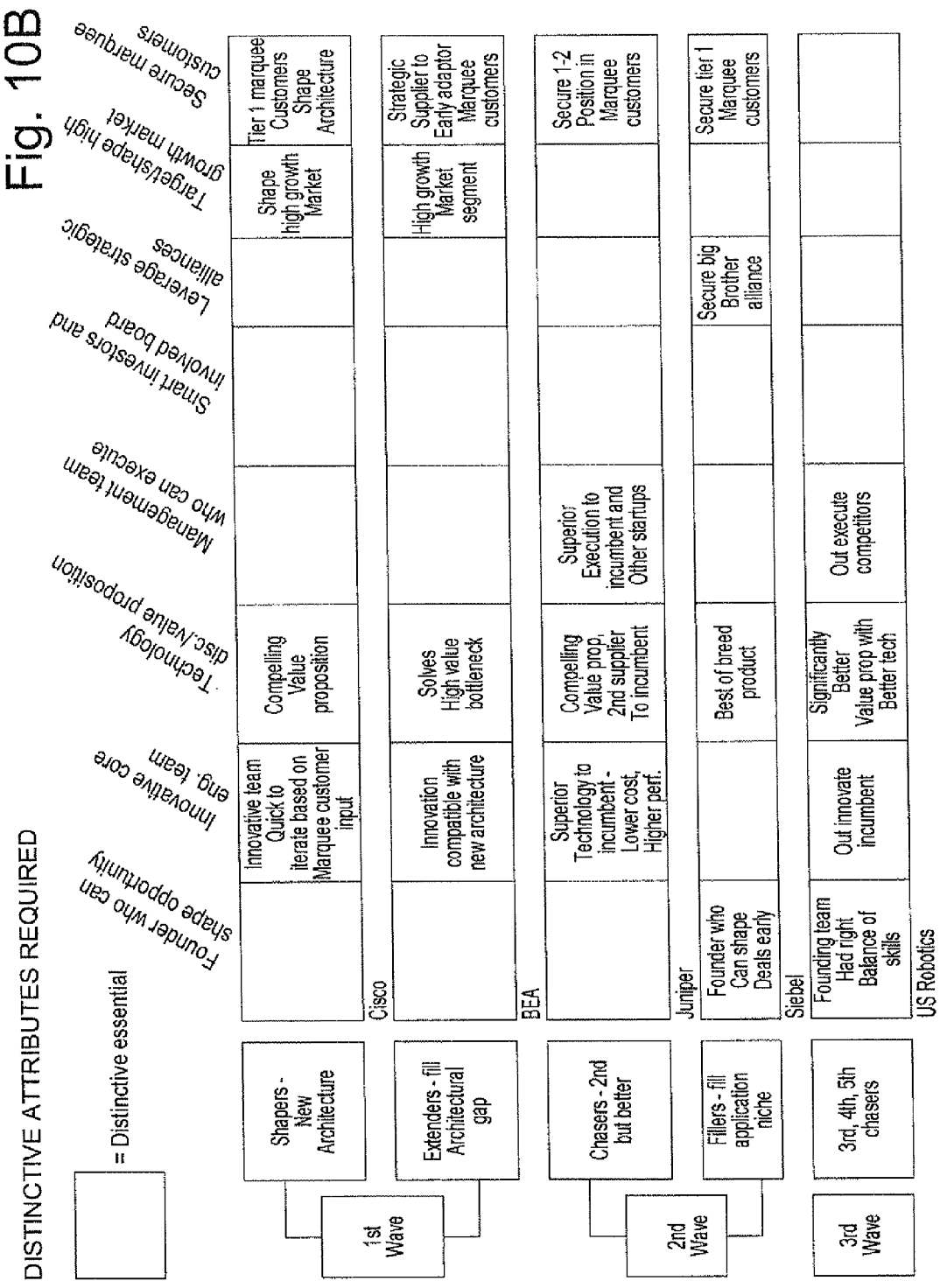
FIG. 10B is a diagram showing how the value proposition platforms apply to exemplary business.

FIG. 10B illustrates the application of these attributes to several real world businesses.

Scalable Sales

Figure 12A:
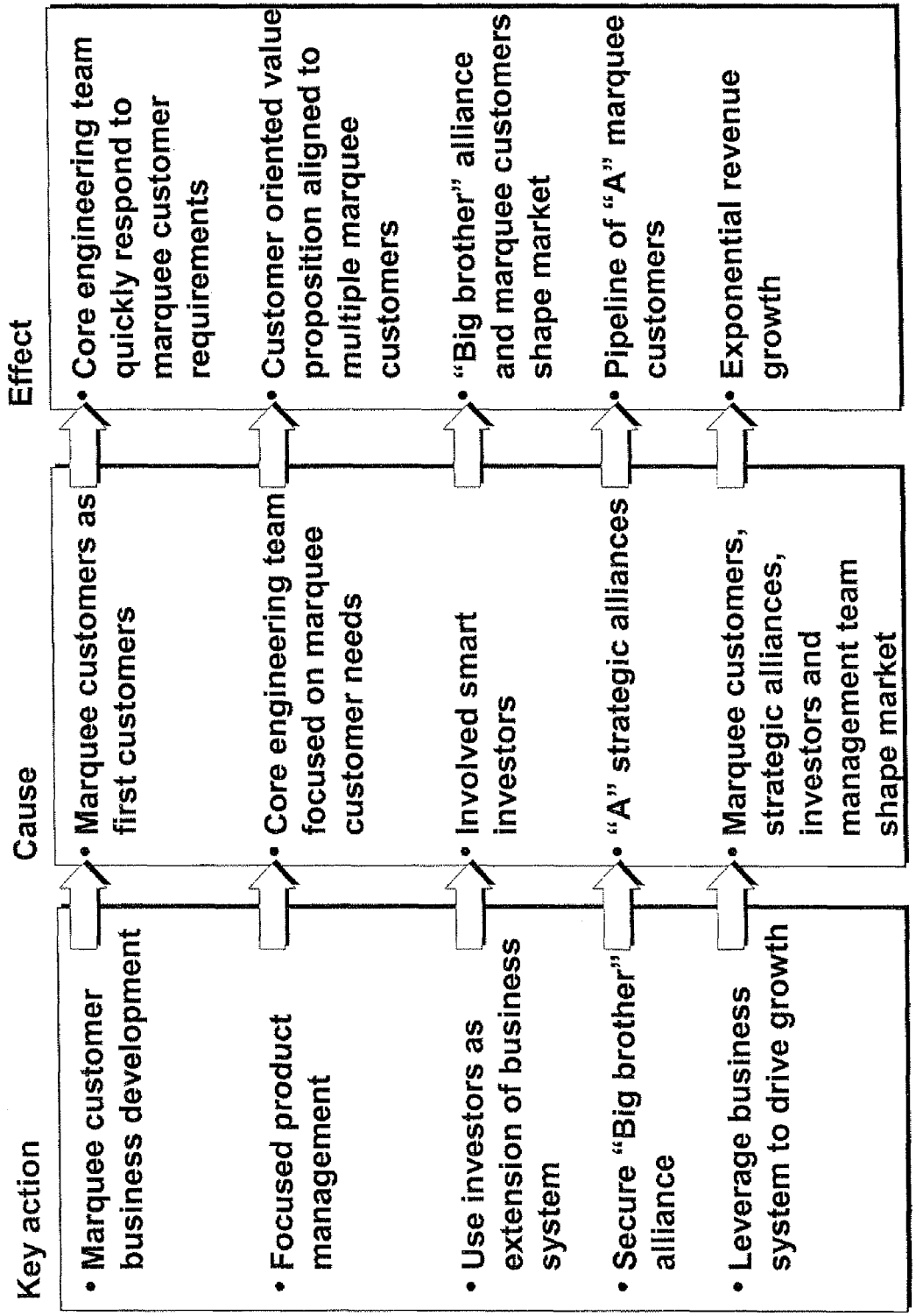
FIG. 12A is a diagram of sales growth drivers of businesses that reached $1 billion in annual revenue.
Figure 12B:
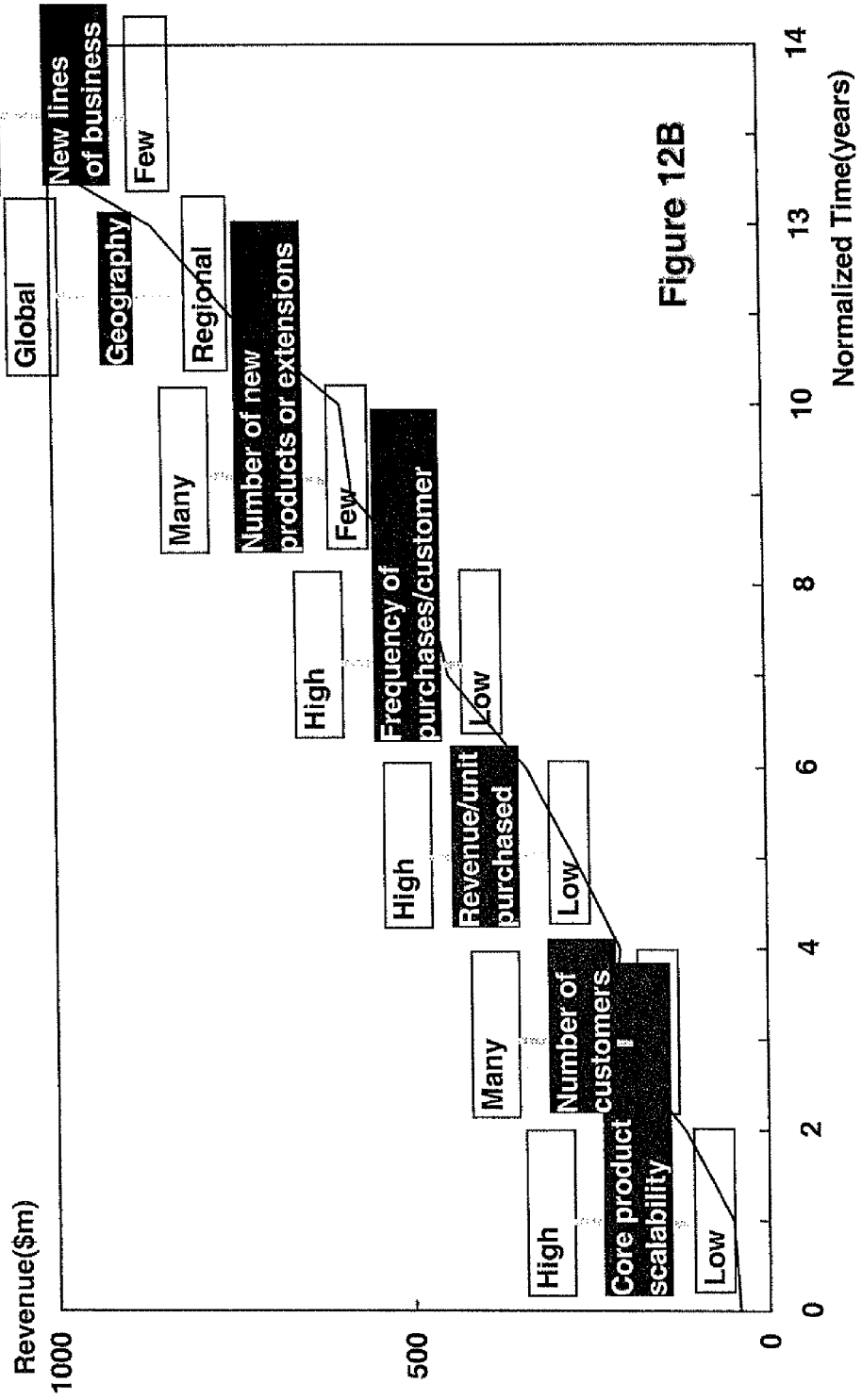
FIG. 12B is a graph illustrating the mathematical formulas which identify the key metrics which determine revenue growth rate.
Figure 13A:
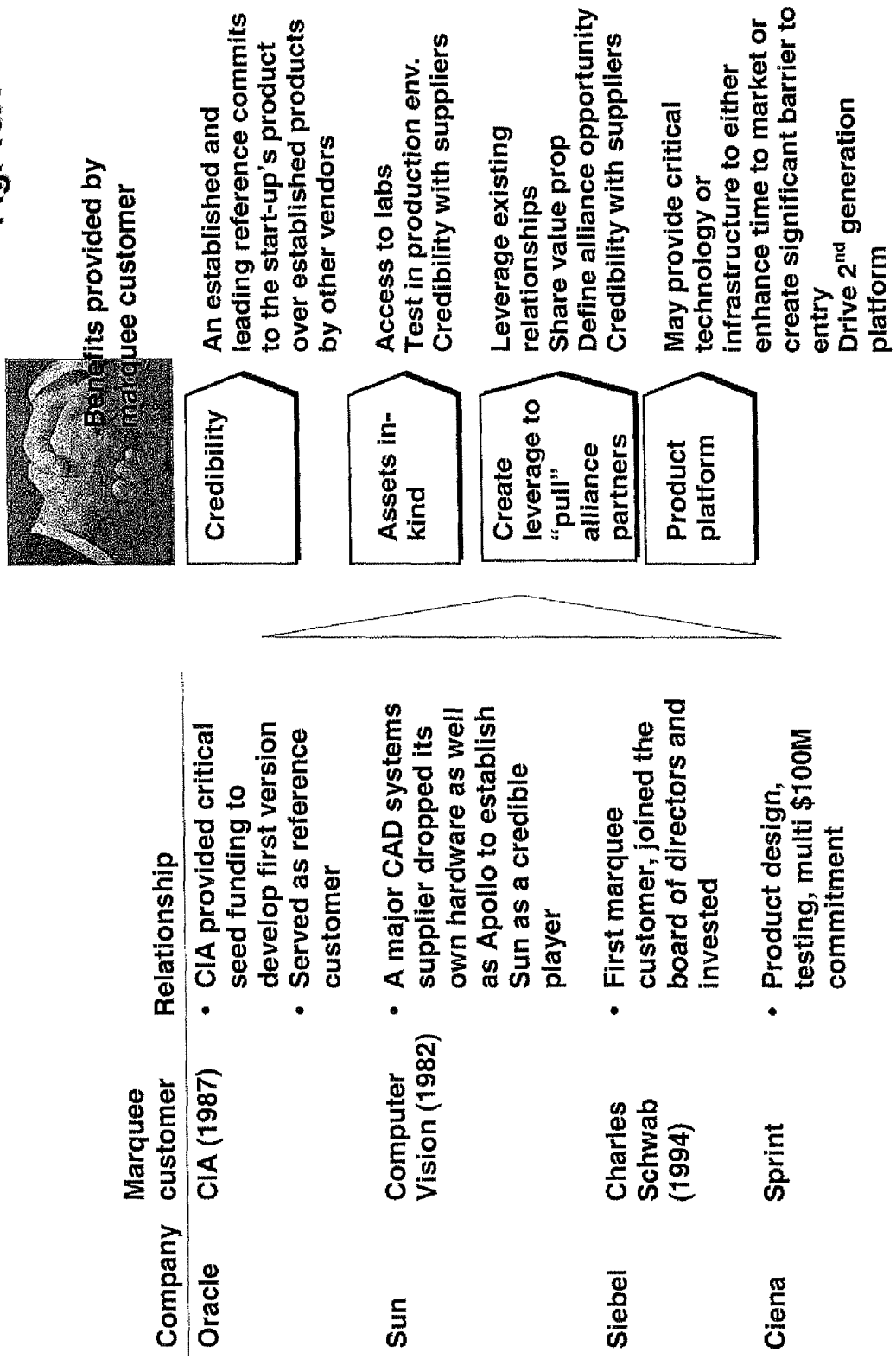
FIG. 13A is a diagram of marquee customers, relating to one of the sales attributes of businesses that reached $1 billion in annual revenue.

FIG. 11 illustrates the attributes of scalable sales to execute exponential revenue growth. These attributes include a marquee customer, asymmetric alliances, and targeting or shaping a high-growth market segment. Indicators of scalable sales am secure marquee customers, the ability to leverage asymmetric alliances, and targeting/shaping high growth market segments. Indicators of marquee customers include agreements with marquee customers who "believe" and are committed to quickly shape product/application and business; marquee customers who are highly committed to success of the company, and who serve as a reference account based on wide scale deployment, intellectual and managerial capital commitment, key investor, and strategic alliance partner; customer agreements that establish market credibility and attractive lifecycle revenue. In general a marquee customer is a well known and respected customer, usually established and publicly traded, that either recommends the businesses products to others, serves as a reference for the business, or allows its name to be used in and advertising or marketing of the business. Indicators of marquee customers are shown in FIG. 13A. The indicators of the leveraging of asymmetric alliances include engaging potential alliance partners early; securing a "big brother" alliance to provide marquee customer credibility through joint sales and marketing or joint commercialization; and creating and leveraging alliance network to capture full value. The indicators of targeting/shaping high growth market segments include high growth (greater than 80%) or emerging market or opportunity for the number 2 or number 3 positions in a large, high growth sustainable market; the existence of attractive adjacent segments for future growth; and a simple market entry strategy that can create a beachhead. Key sales growth drivers are indicated in FIG. 12. The mathematical formulas to identify the key metrics which determine revenue growth rate are identified in FIG. 12B. These attributes are the 7 degrees of freedom. For example, for eBay, the number of transactions, commission/transaction, number of auction areas and countries covered are the key degrees of freedom which align to eBay's revenue growth.

In order to gain market credibility, establishing deep relationships with marquee customers is critical. A marquee customer is a customer who is committed to the business success. They demonstrate this commitment through 4 initiatives: (1) Drive product requirements by testing product in large scale, operating environment and defining the required interfaces for customer systems. (2) Wide scale deployment. (3) Determine customer centric value proposition to be used with other marquee customers. (4) Serve as customer and market reference, often termed a "lighthouse" customer A marquee customer can provide credibility. An established and leading reference commits to the start-up's product over established products by other vendors. A marquee customer can also provide investment. A marquee customer may provide either funding or a significant revenue stream. A marquee customer can be a distribution/integration partner. A marquee customer may serve as a strategic distribution channel or an integration partner. Finally, a marquee customer can provide a product platform. A marquee customer may provide critical technology or infrastructure to either enhance time to market or crate significant barrier to entry.

Marquee customers can be identified by their track record and by particular leaders. A select set of companies have a history and culture of sponsoring the adoption of new technology. Having board members or management team members with a broad network to target the right subset of customers creates quick insight to narrow the options. On the flipside, sponsors in marquee customers have a broad network to qualify and screen for opportunities. An introduction through one of these advisors is a differentiated approach to gain mindshare. It is not always necessary to give the product away to secure a marquee customer. Finding a set of sponsors with passion to solve a key problem and linking the value proposition creates a value equation. Three levels of sponsors are often required: (1) Technology decision makers must endorse the approach. They can serve as blockers or enablers. (2) The business decision maker serves as the project sponsor. (3) CEO/COO/CIOs serve as the approver and endorser. As mentioned above, value propositions that fill critical architectural, capability or services bottlenecks and therefore can demonstrate high value to marquee customers, do not need to be commoditized. Yes, marquee customers want a pricing advantage for the value they bring, but quality relationships are built on win-win equations. The right customers for the right solution want companies to succeed and in order to evolve their solution and provide ongoing support.

Asymmetric alliance include joint development, licenses, product bundling and distribution, and co-marketing on industry platform.

Technology giants increasingly must rely on significantly smaller partners to speed time to market for their innovative products and services. As one executive at a global technology company explained, "If I'm not in the game of partnering with leading edge technology start-ups, then I'm out of the game in leading edge technology. I'll be reading about innovation from Gartner and then I'm behind the curve." Indeed, 70% of alliances announced by the 10 largest global technology companies in the second quarter of 2002 were with partners less than one-tenth their size. Established technology companies tie up with company's fractions of their size to increase revenues in their current business by solving mission-critical challenges or to place bets on the future and shape emerging competitive spaces.

For their part, alliances are attractive to the smaller company primarily for scale. Smaller companies gain access to much needed scale across functions by partnering with technology giants. Smaller, often-niche companies access scale benefits in innovation and product development through access to their partner's platform and range of products and services. In marketing and sales, scale benefits typically result in lower cost access to high impact, "marquee" customers.

While more often than not these partnerships fail to deliver against in-going expectations of the companies, Over 80% of the technology companies who scaled to over $1 billion in revenue were successful at one or more asymmetric alliances. The asymmetric alliance relationship typically provided a win-win relationship. For the larger partner, the majority of alliances had a platform of innovation integration; a level of integration between the two products/architectures so that the customer was offered a more compelling value proposition than if he bought the products separately. In the software industry, this often takes the form of porting software or operating systems to a de facto industry platform. Filling a critical capability gap provides the large partner with a broader solution set for customers, speeds up account development time or creates product line leverage for additional sales.

For the smaller partner, the alliance partnership provides: (1) Drive product requirements by testing product in large scale, operating environment and defining the required interfaces for customer systems. (2) Market credibility and access to a pipeline of quality and marquee customers. (3) Refinement of customer centric value proposition to be used with other marquee customers. (4) Serve as a market reference, often termed a "Big Brother" alliance partner.

Once partners have agreed to an alliance, remaining high enough on the agenda of the Big Brother to capture value from execution is difficult. For starters, by their nature, smaller companies have limited resources and lots of distractions (management, engineering, etc). Managing these alliances requires significant time and attention. As a senior executive of a successful smaller company explained, "I'm in contact with the senior executives of our alliance partner no less than once a month. At the same time, I'm in contact at least 2-3 times per week with the operational people." Moreover, senior executives at the larger company need to be kept abreast of the impact of the partnership in order to maintain their commitment and run interference vis a vis potential "blocking executives" within their organization. One smaller company CEO explained their successful approach to gaining traction as, "We make sure that we have an intense focus on what value we deliver to the business owner in our alliance partner. We ensure that we serve him so well that other parts of his own company aren't as responsive." His "Big Brother" counterpart explained his approach like this, "Bring us value and we'll darken the skies with our fabulous customers and assets."

Large company executives, both marquee customer and alliance partners, must be constantly vigilant to identify and attract the most promising companies both to solve critical bottlenecks in their current pipeline and to ensure they are well positioned vis a vis their competitors. On the other hand, scaling companies that are forced to "bootstrap" more than ever, must overcome significant hurdles to attracting, developing and executing relationships that deliver sustainable value. Relatively few CEOs of high growth companies have succeeded using alliances. As a result, many executives and leading investors are skeptical of the prospects of succeeding in partnerships between small-high growth companies and industry giants. One of the tricky counterintuitive elements here is to plan for failure and mediocrity . . . even the smartest will discover that despite best efforts not all of these will work and in some cases the combined DNA of the two companies will in some cases turns out to be toxic. It takes real skill and focus to navigate a growth relationship. Board governance is a critical differentiator of scaling companies. A board analysis of 50 successful companies versus failures highlighted that alliance partners and customers representatives on boards are a critical ingredient to success. Of America's fastest growing tech companies, 60% of boards had alliance partners versus less than 20% for failures. Failing companies were investor dominated.

While the initial customer development process incorporated in Elements 2 and 3 ensures that marquee customers and asymmetric alliances help shape the business, the potential to grow exponential revenue growth with attractive margins is primarily based on the lifecycle revenue of marquee customers. Gross margins, while ultimately bounded by market structure, can be strongly influenced by sound operational performance focused on marquee customers, and a sales force that stresses the full corporate value proposition. From the onset, the entire organization must focus on achieving three financial goals to replicate the behavior exhibited by companies that have been able to historically achieve scalable growth: (1) must be able to execute to consistent gross margins and sustain those margins as the business scales from $100M to $1B. Margins are typically in the 40s for hardware, 50s for semiconductors, 80s for software businesses (FIG. 4E). Must create a cash flow positive business model with marquee customers. (2) Must grow marquee customer revenues to over $50M over 8 years. Revenue growth must be exponential. This can be achieved through deeper relationships, more sophisticated selling and a broader product line offering. The company, as it broadens its offering, must drive its strategy to solve a portfolio of problems based on its core value proposition. (3) Top performing management teams must manage effectiveness of SG&A and R&D to the gross margin achieved in order to achieve the required EBITDA and cash flow from operations. Many teams find it easy to overspend based on a rationale that it is required for revenue growth.

Scalable sales relies upon performance-based leadership across four key areas: execution in the context of a scalable business strategy, iterative problem solving, a sales culture to leverage marquee customers and asymmetric alliance brothers to gain market credibility and cross-functional performance metrics (such as on time delivery of new products). In a scalable sales approach the process is iteratively linked with marquee customers and asymmetric alliance partners as the foundation for a strategy to exponentially scale a cash flow positive business model.

Scalable Cash Management

Figure 16A:
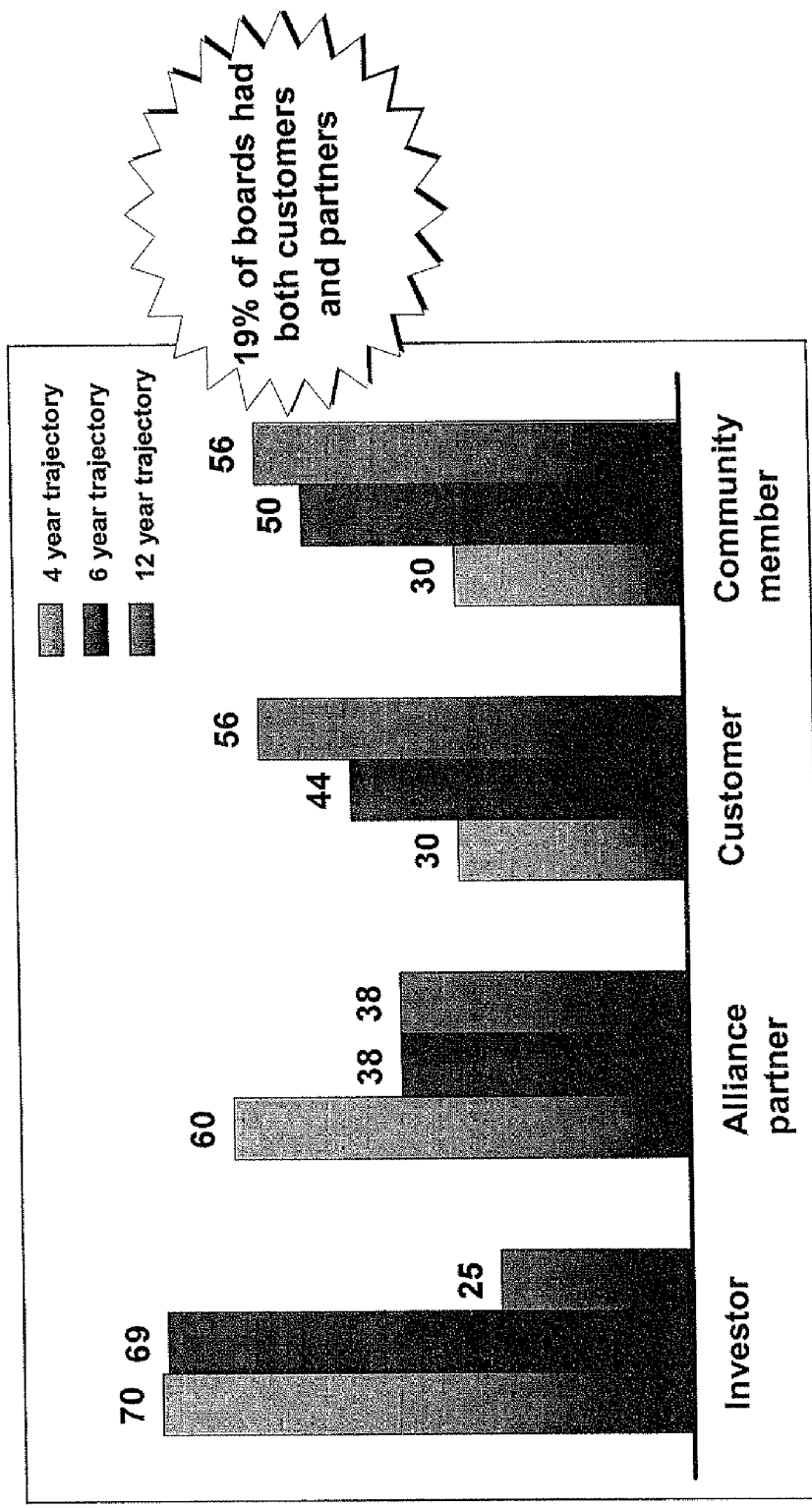
FIG. 16A is a diagram of the compositions of boards of directors of businesses that reached $1 billion on each of 4 year, 6 year, and 12 year trajectories.
Figure 16B:
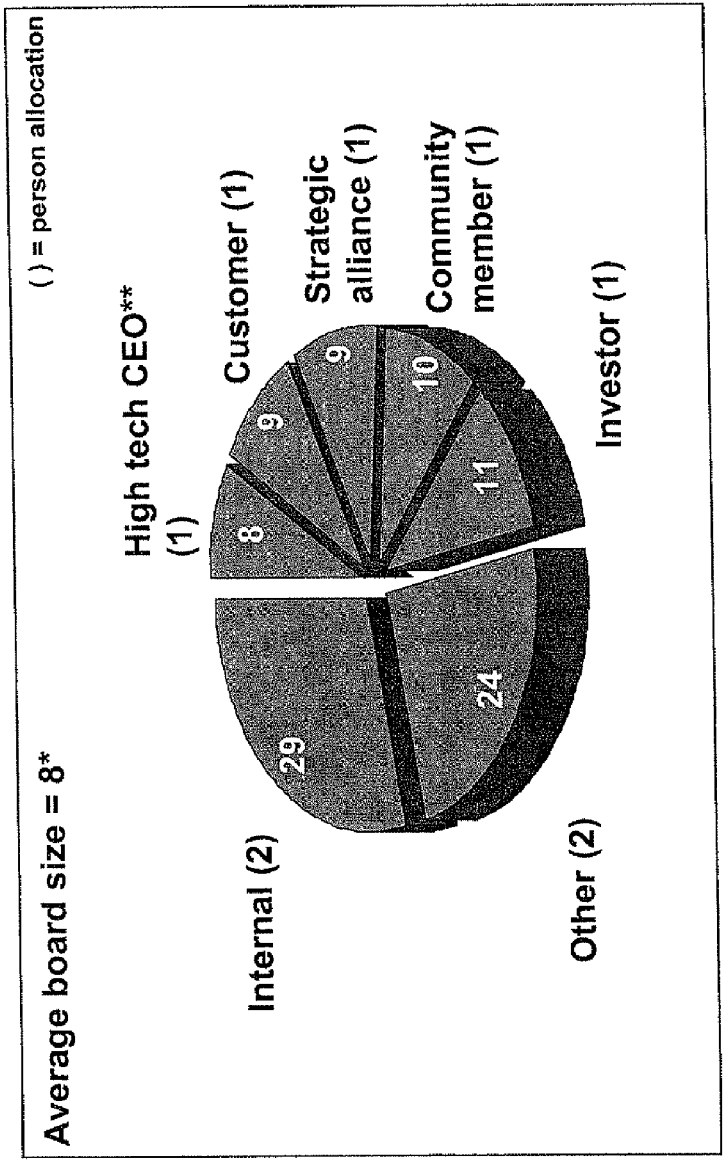
FIG. 16B is a diagram of the typical composition of boards of directors of businesses that reached $1 billion in annual revenue.
Figure 17:
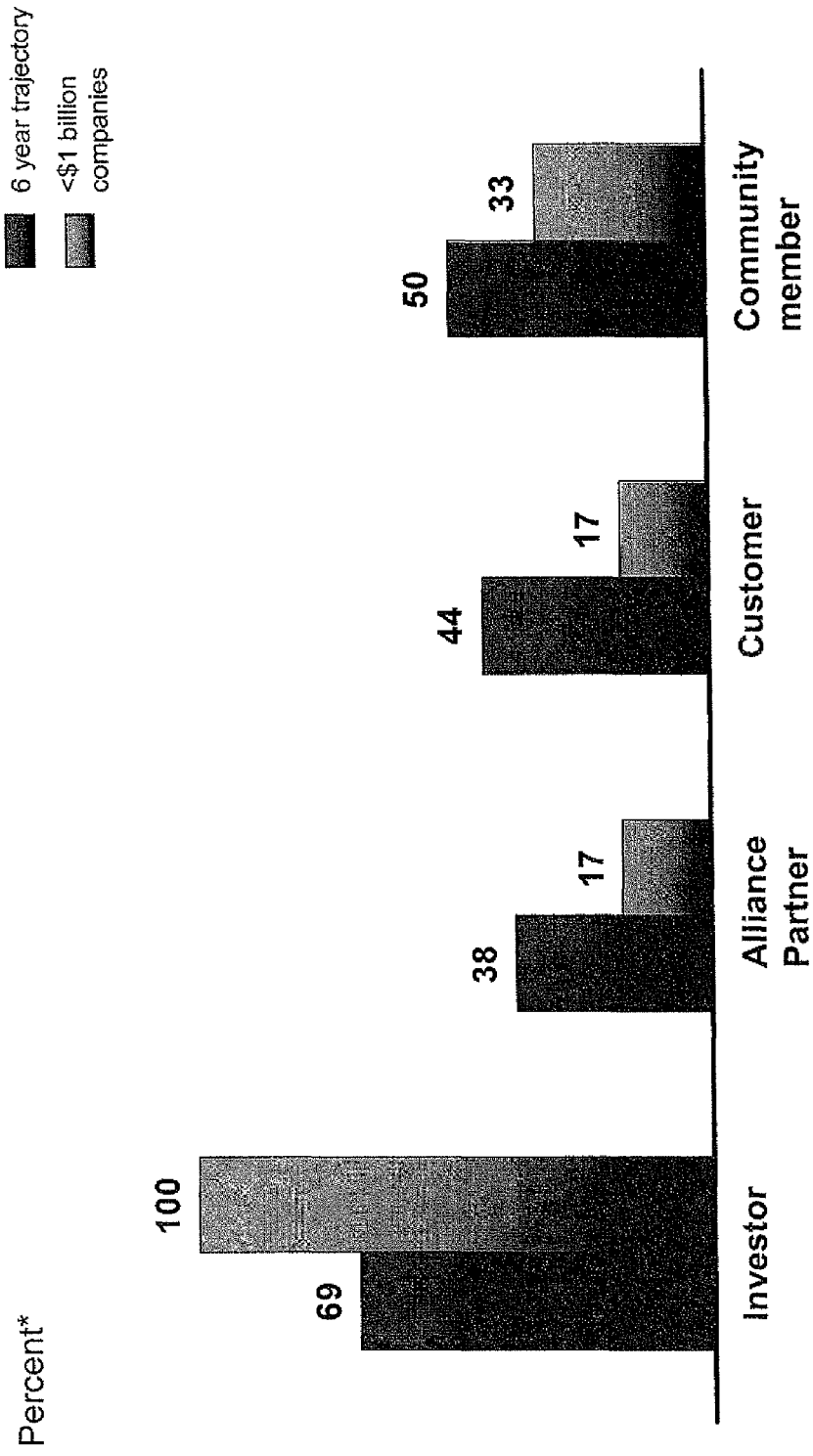
FIG. 17 is a diagram of the composition of the boards of directors of businesses that did not reach $1 billion in annual revenue versus 6 year trajectory companies.

As illustrated in FIG. 14, the attributes of scalable cash management are a scalable business model and high net margin business model; involved smart investors and board management team who can execute in the context of a growth strategy. The indicators of a scalable business model include a business model that generates a profit and loss cash flow and a business model that scales. Some drivers of scalable cash management as shown in FIG. 15. The indicators of involved and smart investors and board include high degree of connections to create leverage, create strategic alliances, secure marquee customers, and proactively shape the market; a board that effectively manages/supports management team; and a board that is composed of members with complementary skills/perspectives including marquee customers, alliances, and management expertise. The boards of companies that did not reach $1 billion in sales were dominated by investors. In contrast, 19% of 4 year trajectory companies had both customers and alliance partners on their boards. FIG. 16A compares the board compositions of Four-Year, Six-Year, and Twelve-year businesses. FIG. 16B identifies the average size and composition of boards for companies who made it to $1B revenue. FIG. 17 compares board compositions for Six-Year Trajectory businesses with businesses that failed to reach $1 billion in annual revenue. Indicators of a management team who can execute in the context of a growth strategy include a team highly skilled at managing revenue and cash flow aligned to compelling business model; sustainable gross margins in excess of 55%; early positive cash flow from operations; and successful growth/scaling the organization; and, finally a management team that is capable of developing and closing marquee customer, strategic alliance and investor deals.

Identifying Scalable Opportunities

Identifying scalable opportunities requires due diligence in three key areas: R&D, sales, and financial management. Within each of these areas, specific criteria should be examined to assess the scalability potential of any given opportunity.

R & D Due Diligence

Due diligence in the R&D area focuses on understanding the viability, potential and defensibility of the technology and solution form that is being investigated. To provide a truly scalable opportunity, a technology and/or solution must offer a distinct architectural advantage relative to existing alternatives. Further, it must represent an innovation that has considerable foreseeable potential to drive performance improvement in a given area of application and provide inroads to a variety of other potential applications.

Sales Due Diligence

Due diligence in the sales area focuses on the scalability of the opportunity associated with any given innovation must be examined by assessing the level of demand for that innovation in the marketplace, the likely duration of the need, and the overall scope of the accessible market. Truly scalable opportunities satisfy latent demand, create completely new market segments and provide access to significant revenue pools (in excess of $1 billion).

Financial Due Diligence

Due diligence in the financial area focuses on three additional criteria to be satisfied for an opportunity to be considered scalable. Scalable opportunities must provide gross margins, at the outset, in excess of 50% to facilitate sales efforts and continued investment in R&D. The value proposition of the business must be increasingly distinctive over time, effectively raising barriers to competitive entry rather than enabling fast followers. Finally, the business model pursued to bring a given opportunity to market must be consistent with the overall strategy of the organization, not just a plan put forward by R&D in isolation.

Evaluating opportunities against these criteria can be made more efficient by pursuing the process in an iterative fashion involving three major screening phases—a preliminary scan, a value creation assessment, and a final investment decision, each getting progressively more rigorous (FIG. 19). By asking questions of increasing specificity only after an opportunity has passed more fundamental criteria, the effort required to achieve analytical rigor in the evaluation can be focused only on worthy opportunities. However, it is important to note that even after the initial decision to invest; the potential of each opportunity should be continuously revisited as progress is made toward the creation of scalable business model.

The definition of a scalable solution or architecture is linked directly to the innovation strategy which can take on any one of three forms depending on the evolving market structure. (1) First wave innovators create a new architecture or fill an architectural gap. (2) Second-But-Better companies either deliver a better value proposition, or fill an application niche. (3) Third Wave third, fourth, fifth to market, winning companies who out execute the first and second wave players.

A top tier core engineering team is essential to pursuing a scalable solution or architecture. The team is typically a small, highly effective team (10-15 engineers) at innovation, development and on-time delivery. They create sustainable intellectual property and architecture/technology lead. A differentiating factor how closely they are linked to the technical community, alliances and customers. The ability of the core engineering team to conceptualize algorithms and designs was their core technical strength.

Getting the scalable solution may require skills/capabilities a company doesn't have. These can be obtained thru acquisition or developed in house.

Successful pursuit of scalable opportunities requires a flexible R&D organization and product development process. Achieving R&D flexibility requires focus on information flows within a cross-functional development team and careful coordination of the efforts of all sub-teams. To do this, companies must focus on improving the quality, timing, and synthesis of information throughout the development cycle. Rather than rigidly following a sequence of tasks on a pre-scheduled timeline, they must engage in continuous problem solving, synthesizing results and adapting the workflow as needed. This process keeps product options open longer and enables the organization to act on new customer and market information later in the process. Decisions are then made only when all the options are fully understood, not at fixed gate meetings. As a result, companies that create a flexible R&D environment make better decisions at each step along the way and are better able to assess the potential of opportunities and achieve scalable growth.

Another critical step in the development of a scalable business opportunity is iterating the product/solution in collaboration with marquee customers early in the development process. A marquee customer is an industry respected corporation who is committed to the success of the product and the company. Companies will work with marquee customers if they have a robust initial product, are confident they can serve and service marquee customer and are capable of quickly iterating product design to meet customer requirements. Trial deployments with smaller customers can be an interim step if the product is premature and still in the in development phase or companies are unsure of their ability to support product in live customer environment. Coupling marquee customers to the product development process provides three major benefits: (1) Marquee customers are coupled into the product development process. As such they provide product requirements. Tactically, this feedback can be as simple as marquee customers requiring key capabilities in order to make a major commitment. Marquee customers can test and validate the scaling of the product. Finally, required interfaces to become compatible with installed systems can be required. (2) Determine customer centric value proposition to be used with other marquee customers. Highly committed marquee customers will share their value proposition in terms of benefits and economic terms so that the value proposition transforms from a technology-based to a business-based value proposition. (3) Serve as industry reference to fill the pipeline with other marquee customers and to shape the market.

Building a relationship with a marquee customer initiates a virtuous cycle that leads to the development of asymmetric alliances that create broader solutions and in turn attract more marquee customers.

While the initial financial screening process ensures that a given opportunity has the potential to provide attractive margins, the pursued business model must be sustainable. Gross margins, while ultimately bounded by market structure, can be strongly influenced by sound operational performance, and a sales force that stresses the full corporate value proposition. From the onset, the entire organization must focus on achieving three financial goals to replicate the behavior exhibited by companies that have been able to historically achieve scalable growth: (1) there must be able to execute to consistent gross margins and sustain those margins as the business scales from $100M to $1B. Margins are typically in the 40s for hardware, 50s for semiconductors, 80s for software businesses. (2) Beyond $50M revenue, companies must achieve an EBITDA of 20% (of revenue). If the gross margin is higher, management teams can afford to self-invest in R&D and incremental SG&A. As a result, the business must create a cash flow positive business model around $25 million revenue which scales proportionately to sales.

Top performing management teams must manage effectiveness of SG&A and R&D to the gross margin achieved in order to achieve the required EBITDA and cash flow from operations. Many teams find it easy to overspend based on a rationale that it is required for revenue growth.

Today most companies manage the R&D process as a functional silo with a serial gating process—project cost, time to development, and project sales are typically the leadership performance indicators. In contrast, scalable R&D relies upon performance-based leadership across four key areas: execution in the context of a scalable business strategy, iterative problem solving, a culture of efficiency and functional integration, and cross-functional performance metrics. In a scalable R&D approach the R&D process is iteratively linked with marquee customers and a strategy to exponentially scale a cash flow positive business model.

Scalability is not just a process; it is a philosophy that must be embraced by an organization to succeed. Companies that have successfully adapted to this environment have successfully embraced fundamental changes; redefining the process for targeting opportunities, broadening the scope or scale of a conceivable solution and breaking down the barriers between R&D and customers. The scalable R&D philosophy emphasizes continuous problem solving and iteration based on market feedback instead of simple internal focus. Companies who succeed will have an undeniable edge, as they respond to customer and market changes more effectively and rapidly than their competitors.

Innovation, as a critical enabler of growth, occurs in different elements of the value chain in different industry sectors. While all industries innovate to various degrees, the true focus of innovation tends to vary considerably by sector. Analysis of select innovation sectors, indicates that there are 3 fundamental innovation types; product R&D, process innovation and innovative customer access. Indicators of unscalable sales include a siloed sales function. A transactional sales force, looking for the next deal often demonstrates a "dine and dash" approach. The sales team fails to understand critical customer requirements required to secure a major commitment. This customer feedback often requires the teamwork and support of management and the engineering team. A management team that believes its own hype or is inwardly focused on the technology can be a major reason why team is unwilling or unable to solicit and react to feedback from key customers. The sales approach may be unscalable, such as where the sales team finds an initial customer who is not a surrogate for a larger community of needs of other customers and who cannot evangelize and is respected by the broader market. Picking the wrong customer drives the business into a "rathole" as the business focuses on meeting unique customer requirements. As a result, the time to first meaningful revenues is too long.

Another indicator of unscalable sales is an inflexible sales model. It is not always clear what the sales process or account development cycle will look like. The sales model rarely is obvious from the start. Employing a large sales force before figuring out the sales model leads is often the approach used to meet high expectations. Management fails to screen opportunities to identify sales models that solve immediate problems and have the potential to transform into broader, categorical, solutions, Still another indicator of unscalable sales is failing to solve a real problem in a distinctive way. Decision makers, at every level, really only make a few key decisions each quarter. Forming a relationship with a new company with a new product is a big deal. One board member expressed it this way, "we are looking for a CEO who can form executive relationships. Our engineers get the RFP but we do not understand the customer requirements and what is driving these requirements. We lose when other vendors help the customer develop the RFP!". Selling into customers with tight budgets requires a real focus to understand what the customer priorities are and how they prioritize investment decisions. The CIO of a leading Fortune 100 enterprise "With our tight budgets, we are only investing in the most critical priorities. We always have to more with less, so if vendors can help us solve critical problems with a resourceful approach, it influences our prioritization.".

Avoiding these pitfalls requires focused targeting and screening for scalable revenue opportunities and the pursuit of scalable solutions in a flexible manner. In addition, successful companies link product development with true customer needs and are willing to iterate in collaboration with the customer. Scalable sales principles require the pursuit of a business model that is attractive, potentially expansive, and can become a primary driver of scalable growth. Scalable sales is therefore composed of 5 key elements: (1) targeting a scalable opportunity; (2) pursuing marquee customers; (3) implementing an asymmetric alliance; (4) linking product development, marquee customers and alliance partners, and (5) enabling an attractive business model with sustainable margins typically over 50%.

The common approach to sales development typically involves a generally inflexible R&D and serial process characterized by substantial R&D and prototyping efforts before product launch followed by sales scanning to qualify initial customers. Much to management's surprise, the sales cycle can often exceed the time required to develop the product. There are many situations that illustrate that this approach often leads to performance that does not capture the full potential. Achieving a best-in-class level of performance requires several fundamental changes; namely redefining the process for targeting opportunities, broadening the scope or scale of a conceivable solution and breaking down the barriers between R&D and customers. The scalable sales philosophy emphasizes continuous problem solving and iteration based on market feedback instead of simple internal focus. By taking a scalable approach companies realize growth faster.

Due Diligence Process

A benchmark-based process that gives clear indicators against which one can judge/evaluate the growth progress of a company. The process is based on two tools; financial benchmarks and essentials report card. The tools are based on the success pattern of winning companies. The due diligence process can be applied to a single company (standalone or business unit) being investigated or the sum of the report cards can create a process for a "dashboard" for an investment portfolio. The end result is the ability to identify companies who have a higher probability of success based upon the essentials scorecard. End products that can be generated are: (1) a financial assessment compared to the trajectory of winning companies; (2) a definitive score based on an essentials assessment as compared to winning companies; and (3) identification of areas where companies are deficient or have core strengths. The benefits are a standard evaluation tool based on quantifiable metrics against winning companies. This is in contrast to the qualitative process, based on a high degree of intuitive skills, presently in widespread use.

The steps used to apply this method can include: (1) Financial modeling of the most successful synthesized successful company histories into an essential report card. Compared with low growth equivalent companies founded in the same year, going after the same space. (2) Identifying scalable opportunities requires due diligence in three key areas: R&D, sales, and financial management. Within each of these areas, specific criteria should be examined to assess the scalability potential of any given opportunity. See, e.g. FIG. 29. (3) Due diligence area focuses on understanding the viability, potential and defensibility of the technology and solution form that is being investigated. To provide a truly scalable opportunity, a technology and/or solution must offer a distinct architectural advantage relative to existing alternatives. Further, it must represent an innovation that has considerable foreseeable potential to drive performance improvement in a given area of application and provide in-roads to a variety of other potential applications.

For example, Due diligence in the sales area focuses on the scalability of the opportunity associated with any given innovation must be examined by assessing the level of demand for that innovation in the marketplace, the likely duration of the need, and the overall scope of the accessible market. Truly scalable opportunities satisfy latent demand, create completely new market segments and provide access to significant revenue pools (in excess of $1 billion).

The Due Diligence Process involves filling in a report card to determine a score. The score is determined from the success pattern of winning companies. Winning companies performed average or above in all 8 indicators (the ninth category of financials being considered separately). The score can be calculated on a scale of 1-5 based on a detailed report card. The score ranking determines the investment action/decision. Exemplary criteria are shown in FIG. 24, and an example of an application of these criteria is shown in FIG. 26A.

Figure 26B:
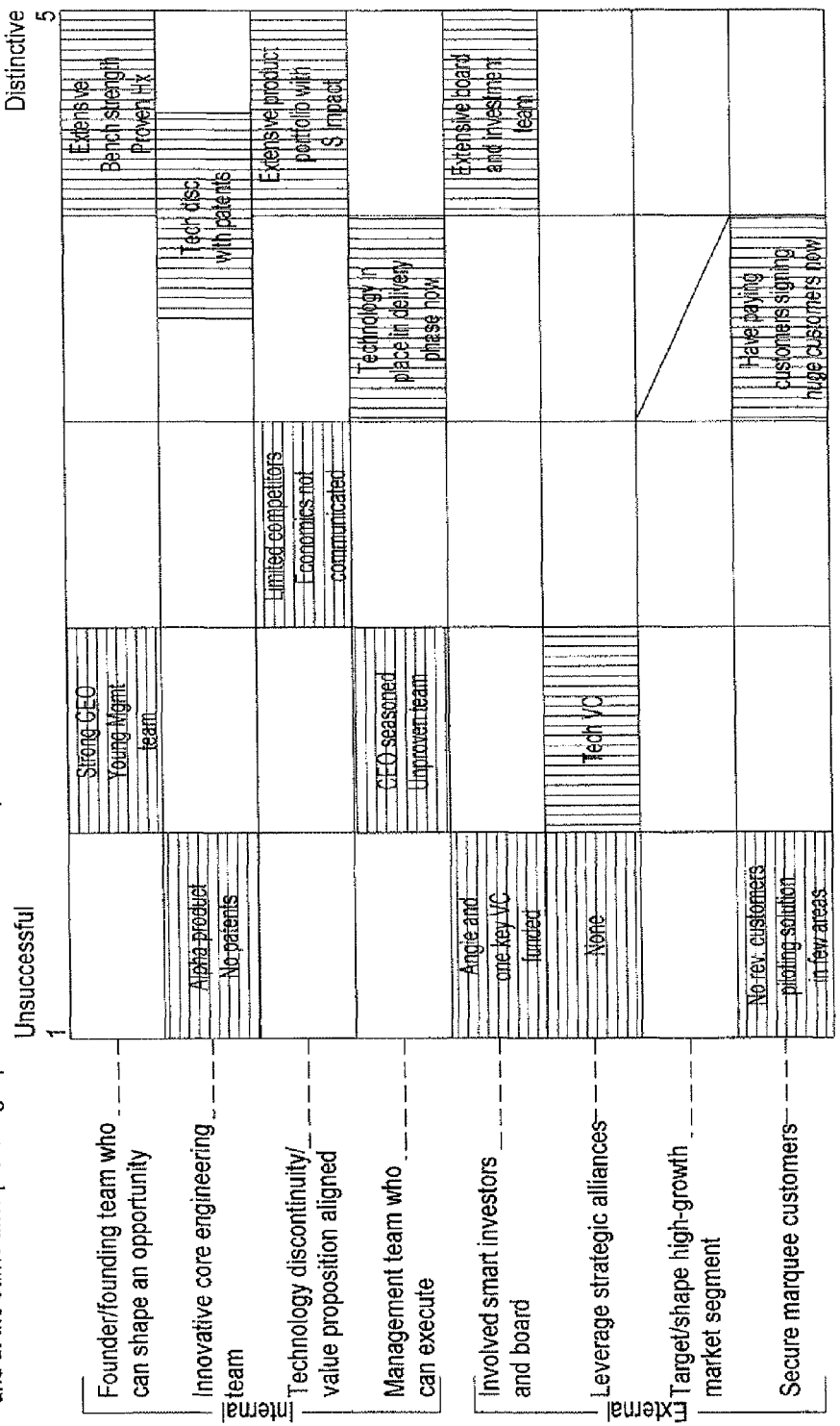
FIG. 26B is an example of a scorecard used in evaluating a business as part of a due diligence review process.
Figure 28:
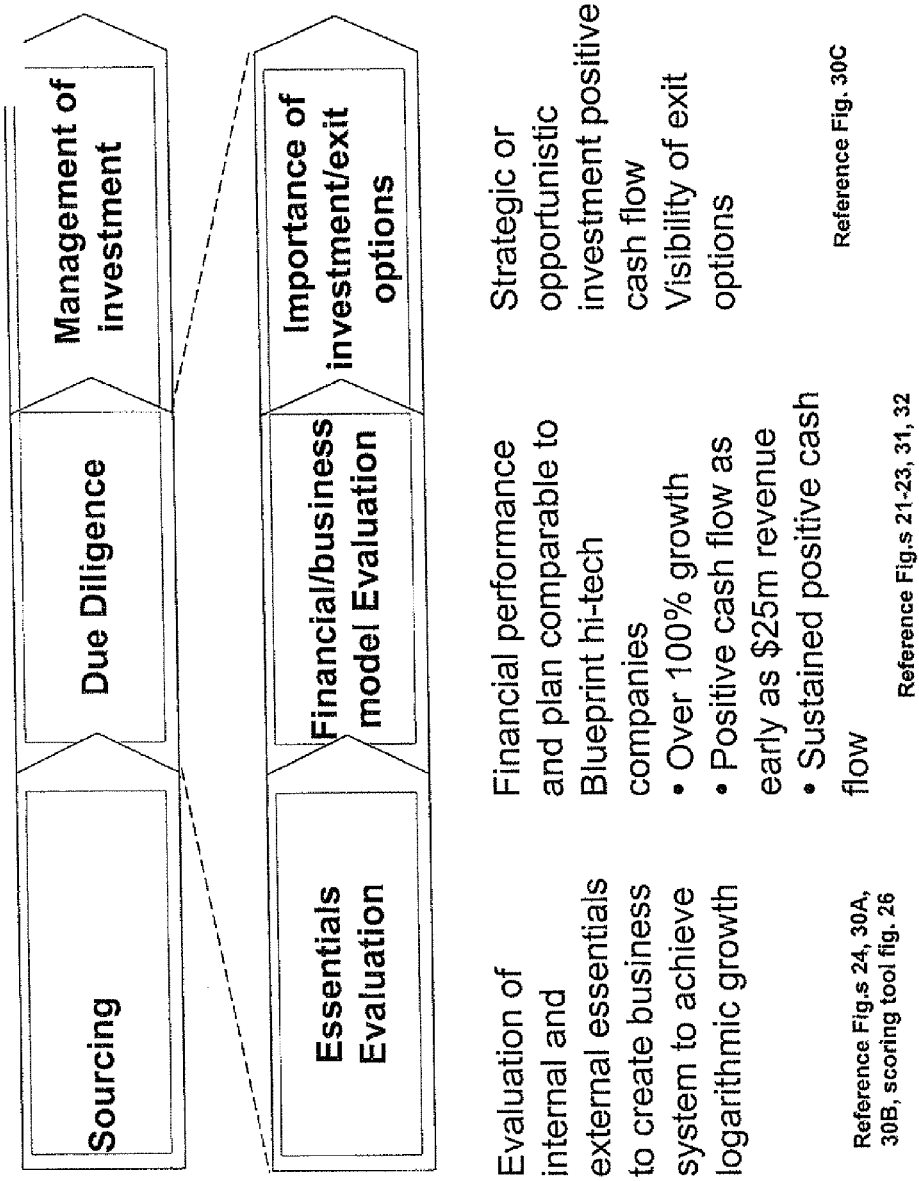
FIG. 28 is a schematic diagram of the due diligence process.

An example of a report card filled in for two comparative companies is shown in FIG. 26B. An investment team could use this actual card to score the investment, leading to the appropriate action.

Exemplary criteria to complete the FIG. 26B report card are shown in FIGS. 29A and 29B. Evaluating opportunities against these criteria can be made more efficient by pursuing the process in an iterative fashion involving three major screening phases—a preliminary scan, a value creation assessment, and a final investment decision, each getting progressively more rigorous. By asking questions of increasing specificity only after an opportunity has passed more fundamental criteria, the effort required to achieve analytical rigor in the evaluation can be focused only on worthy opportunities. However, it is important to note that even after the initial decision to invest; the potential of each opportunity should be continuously revisited as progress is made toward the creation of scalable business model.

Companies can be evaluated against the financial trajectory of winning companies. At the inflection point, the financial trajectory is broad, yet defined. For companies at this phase, the goal is to ensure they have the right revenue growth and EBITDA performance. The growth rate in following years will determine the 4, 6, or 12 year trajectory. Depending on the tech sector, while gross margins varied, the EBITDA performance averaged 23% for companies the $1^{st}$ year after the inflection point (revenue varied depending on the trajectory—see financial P&Ls). See, e.g. the data in FIG. 31 and the comparison in FIG. 32.

Due diligence in the financial area focuses on three additional criteria to be satisfied for an opportunity to be considered scalable. Scalable opportunities must provide gross margins, at the outset, in excess of 50% to facilitate sales efforts and continued investment in R&D. The value proposition of the business must be increasingly distinctive over time, effectively raising barriers to competitive entry rather than enabling fast followers. Finally, the business model pursued to bring a given opportunity to market must be consistent with the overall strategy of the organization, not just a plan put forward by R&D in isolation.

Figure 30:
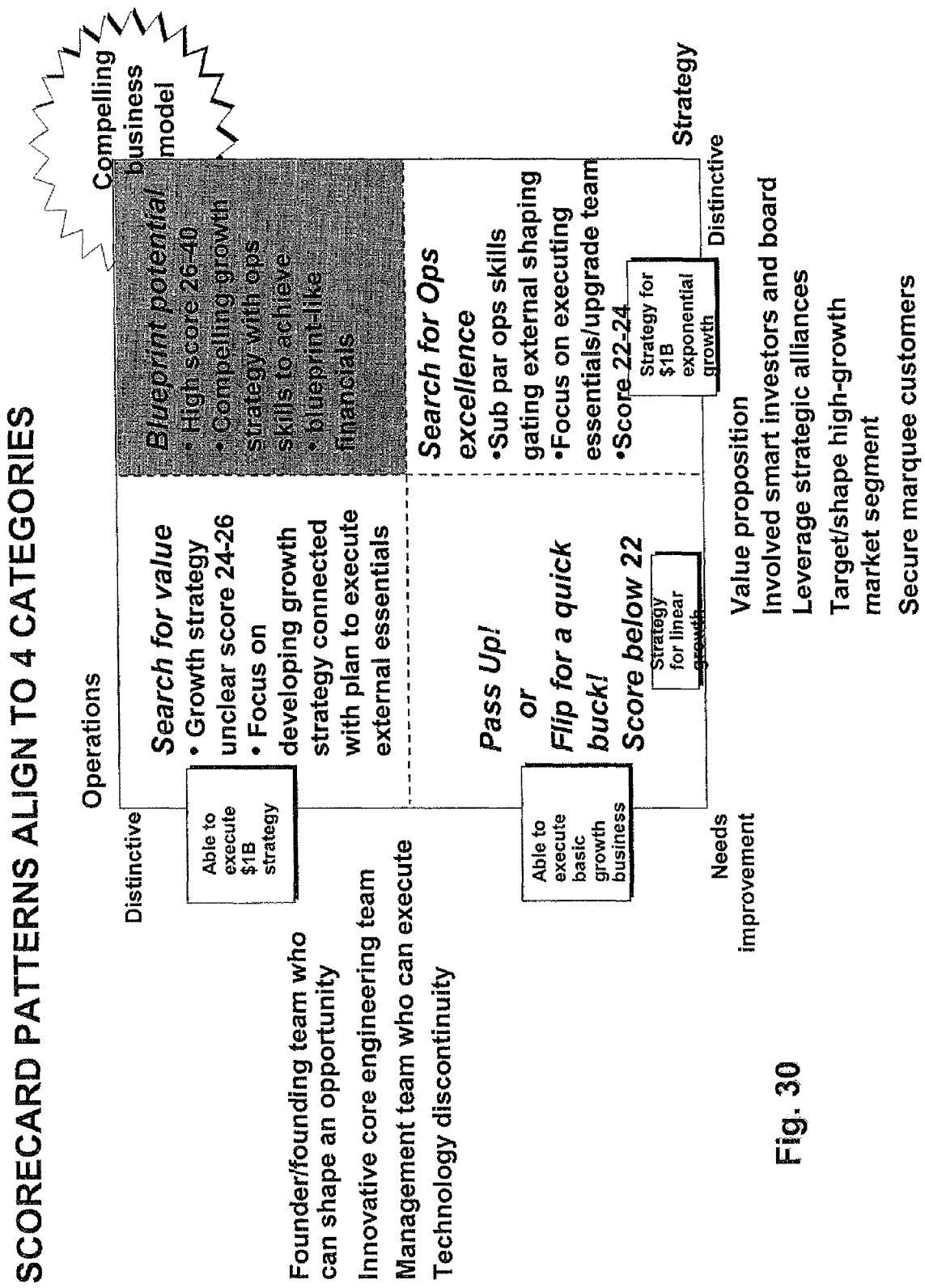
FIG. 30 is a example of using a score card in the evaluation of the of a business.

Depending on the score of specific essentials, a dashboard can be created for an investment portfolio. The companies can be grouped according to investment class. See, e.g. FIG. 30.

Investment Tools

Investors can screen for companies who are on trajectory to $1 billion in annual revenue. This screening process enables investors to spot companies early. The following steps of the process involves comparing these companies to the mean P&L models, comparing sub sector performance and comparing company valuations to the historical trends. Valuation models are calculated based on the value of winning companies normalized by the Russell 2000 index. When investors have the opportunity to interview management teams, prior to investment, the Due Diligence Process (described above) can be applied.

Management/Corporate Business Development Process

Figure 33:
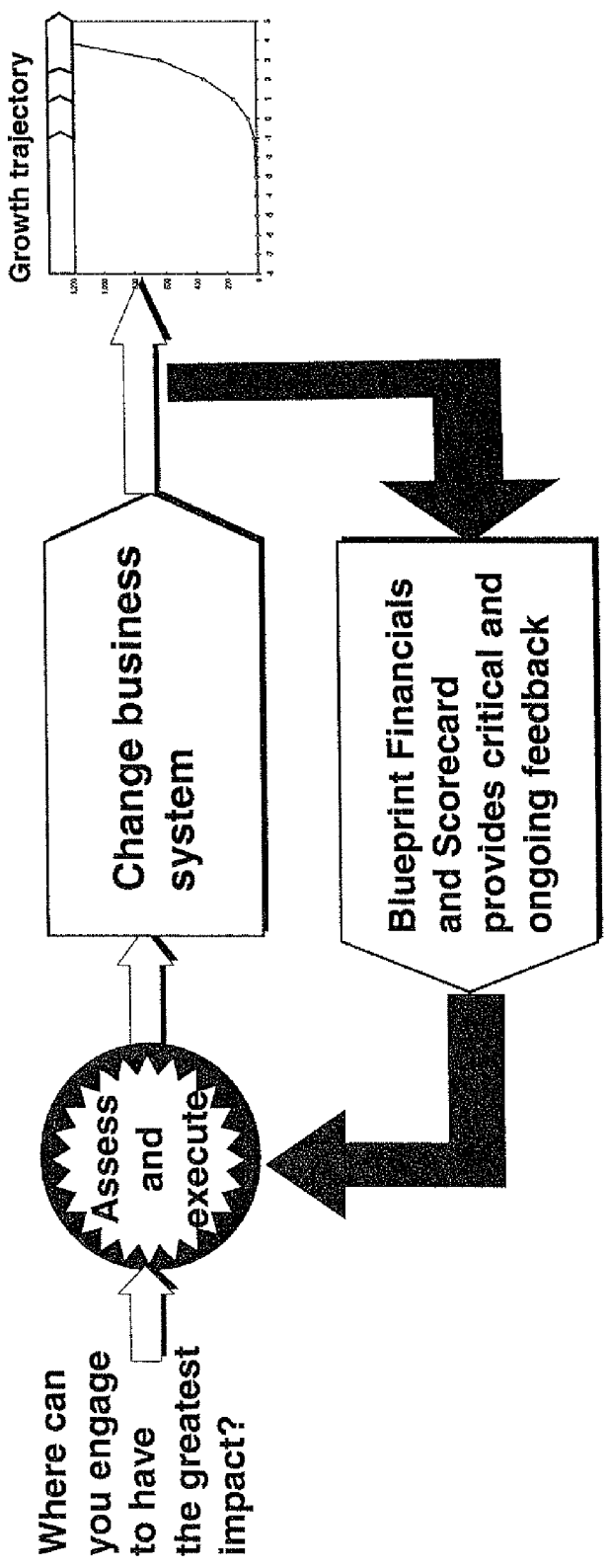
FIG. 33 is a schematic diagram of a management process in accordance with some embodiments of the present invention.
Figure 36:
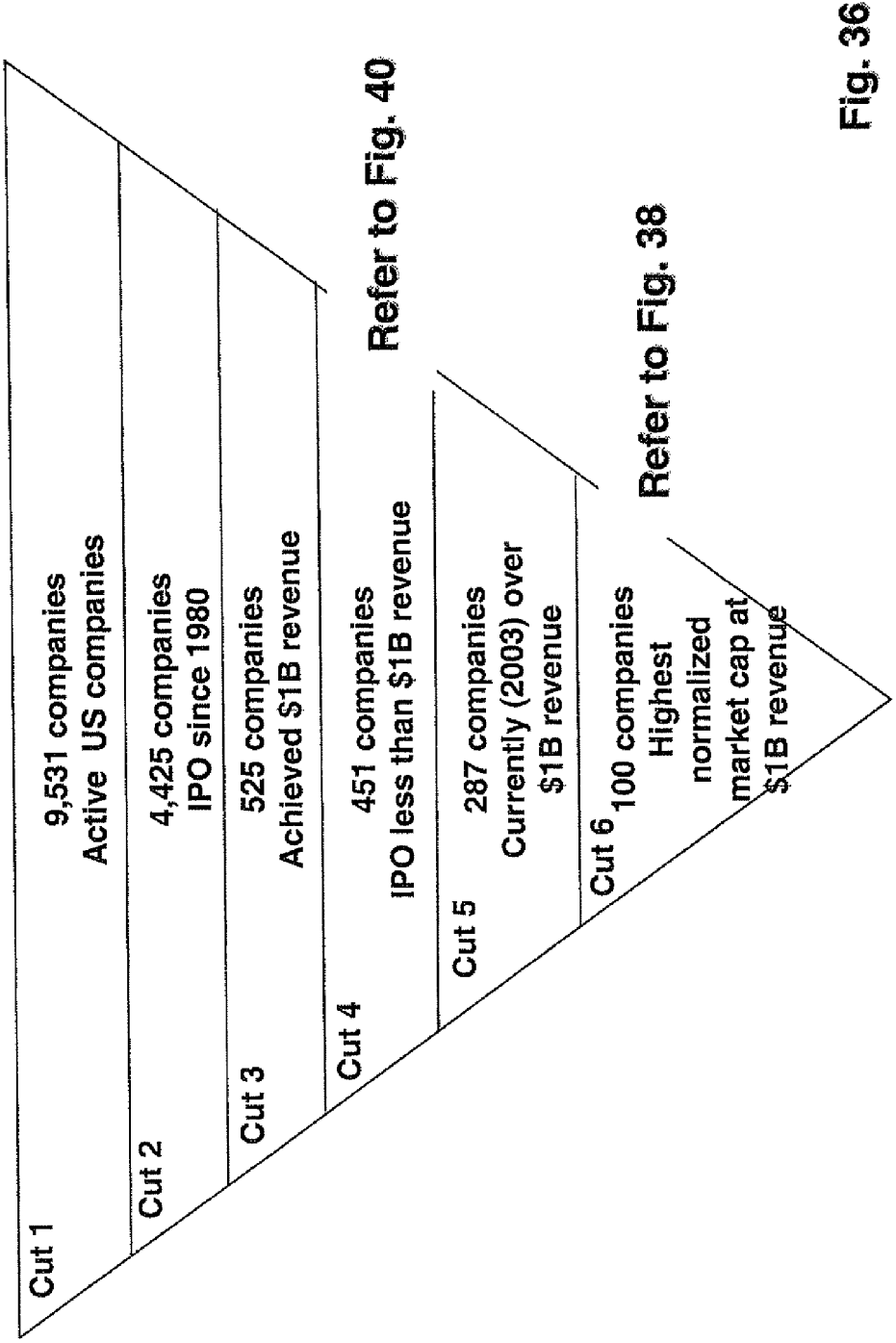
FIG. 36 is a schematic diagram illustrating a screening process in accordance with the principles of some embodiments of this invention.
Figure 38:
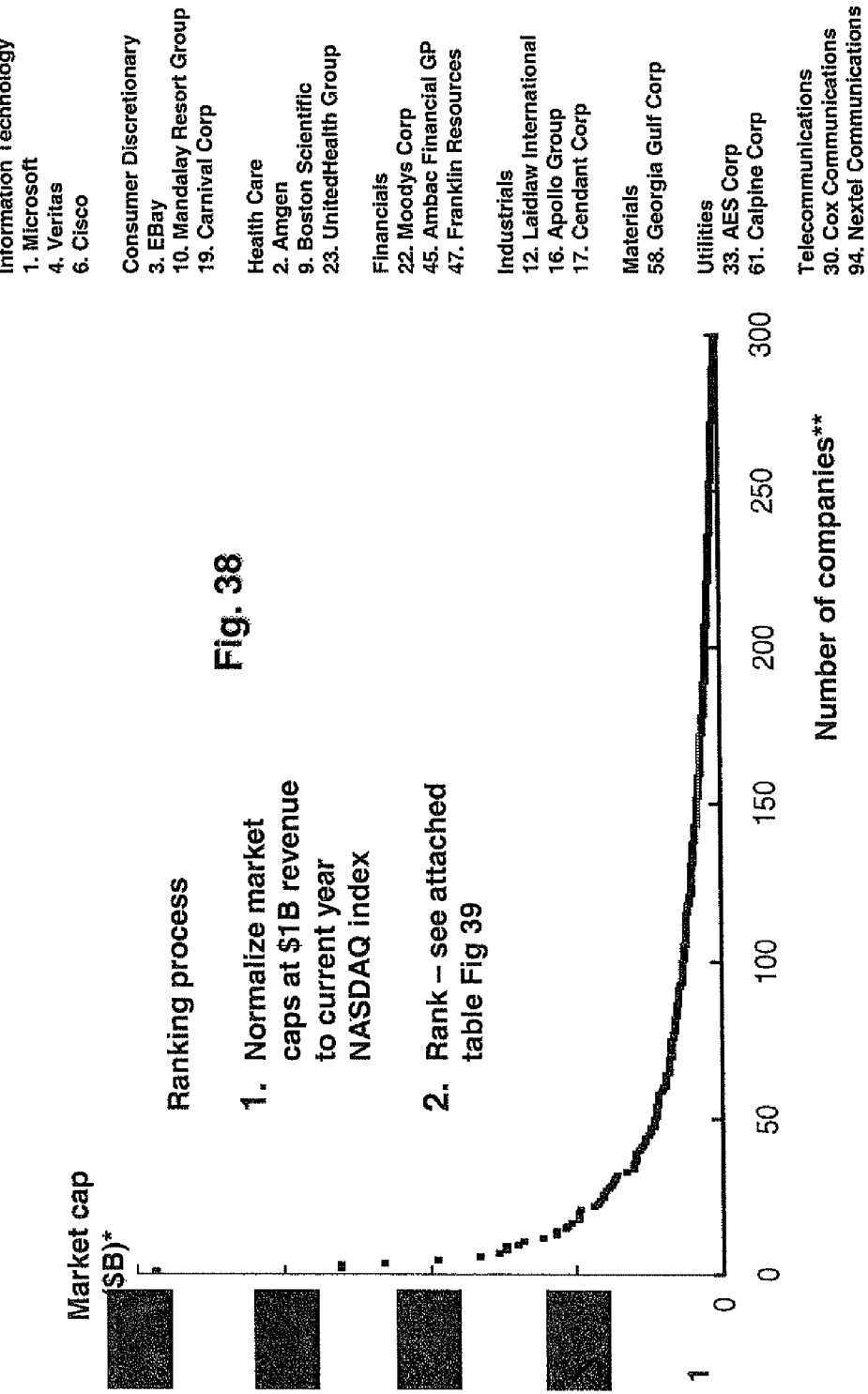
FIG. 38 is a graph of normalized market capitalization at $1 billion in annual revenue.

A corporate business development process based on financial metrics and an essentials report card that can evaluate new divisions against the growth pattern of America's most successful tech companies. As shown in FIG. 33, the process provides a unique feedback loop to management to diagnose, initiate corrective actions and track progress of business building initiatives.

Considering the nine attributes identified financial metrics which identifies success vs. failure; growth rates; gross margins; EBITDA, R&D costs, SG&A costs, and the report card process can be used to measure and track progress, and provide corporate guidelines for business development process. For example, a high growth division of a $700M company had a projected plan that tracked to the 6 year trajectory. Comparing their plan to the benchmark highlighted that the $3^{rd}$ year revenue projection was higher than the mean while SG&A was below the mean. See FIG. 34A. In addition, returns were below average. When management was asked to fill in the report card, the score indicated that the essentials required for top line growth were below average. This score puts in question the revenue forecast and the underlying business plan. See FIG. 34B.

In managing a company for above-average growth, the three areas should be controlled: scalable research and development; scalable sales; and scalable cash management. With respect to sealable research and development, the company should target and invest in scalable initiatives. The company should pursue a scalable solution of architecture. The company should link product development with marquee customers. With respect to scalable sales, the company should target and invest in scalable value propositions. The company should build deep relationships with marquee customers to achieve market credibility. The company should create asymmetric alliance relationships to gain market leverage. The company should link customers and alliances with the management team. With respect to scalable cash management, the company should shape a sustainable business model. The company should achieve a 10-20% EBITDA to achieve positive free cash flow (FCF) which scales proportionately with sales. The company should have a highly connected board, adding customer's alliances and CEO.

Report Card Analysis

Figure 25B:
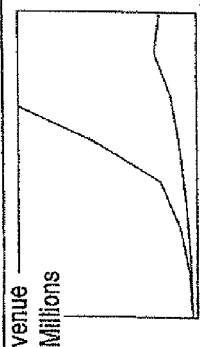

The inventor derived a report card by comparing companies founded in the same year and going after the same space. Typically one made it to $1 billion in annual revenue while the other struggled. The report card template formed the bases for the analysis of the performance required. The comparatives of the nine attributes essentials are highlighted in FIG. 24A, and their application is illustrated in FIG. 25.

For example, the inventor compared companies who were founded in the same year and going after the same space (market). See, e.g., FIGS. 25B and 25C. What differentiated management teams was their ability to create and execute a strategy. A strategy was defined by the external shaping essentials; value proposition, ability to secure marquee customers, leverage asymmetric alliances and a board that was highly connected.

The value proposition is an important attribute, affecting the ability to secure marquee customers, asymmetric alliances, drives the business model and shapes the product line direction. The value proposition tended to fall into one of three waves; wave one—shaping a new architecture or filling architectural gaps, wave two—second but better or filling application niches, wave $3-3^{rd},4^{th},5^{th}$ to market requiring the entrant to out execute the incumbents (FIG. 10A). The value proposition required different emphasis on the essentials, depending on the value proposition. See, e.g., FIG. 10B A marquee customer was a customer who would become a lighthouse customer. Almost all of the most successful companies had marquee customers. A marquee customer uniquely provided four key assets; help shape a value proposition, product requirements, and leverage assets to test the product and serve as an industry reference (a lighthouse customer. Marquee customers often drove the basic sales from customer segments. Marquee customers came in four types depending on the lifecycle of the product. For example, in the case of Sun Microsystems, Kodak was an early marquee customer; gave an initial order, invested in the company and took a board seat. While all marquee customers did not invest, they did align to the 4 points mentioned. In contrast, many failing or struggling companies has small customers who were not marquee, large customers who did not provide the value add or only had a few customers and did not scale. While data is not publicly available, sampling indicates that marquee customers committed to a deep relationship over time; global scale deployment and a full product line deployment. For example, one F50 marquee customer had these purchase patterns; growth from $1 million initially to over $50 million and a full product line deployment (e.g., Cisco). See, e.g., FIGS. 13A-13D.

Marquee customers helped to get these companies an asymmetric alliance or "Big Brother" alliance partner. Over 80% of the companies had a Big Brother to give them market credibility and access to marquee customers. What distinguished these alliances, over 80% were innovation based; integrated products to offer a more complete solution to customers (e.g. Microsoft ported DOS to the IBM PC). See, e.g., FIGS. 13E and 13F.

The average board of winning companies was balanced between investors and other external board members. What distinguished winning companies on the 4 year trajectory was the presence of alliance board members. Over 60% of 4 year trajectory companies had a board member from an alliance partner. In contrast, failed or low growth companies had boards that were investor centric. See, e.g., FIGS. 16A, 16B, 17, and 28.

Operation

A method of evaluating at least one target business in accordance with a preferred embodiment of this invention comprises identifying a plurality of model businesses that have achieved a desired financial performance; identifying at least one financial statistic common to the model businesses; comparing the at least one financial statistic common to the model businesses with at least one financial statistic of the at least one target business; and evaluating the at least one target business based its comparison with the model businesses. These model businesses preferably have at least $400 million in annual revenue, and the target businesses preferably have at least $30 million in annual revenue. The target businesses preferably also have at least 100% annual sales growth, and are preferably less than about seven years old.

A variety of financial statistics can be used for comparison, including one or more of historic annual sales, annual sales growth rates, and time since found to exceed selected annual sales thresholds, gross margins, SG&A, R&D expense, EBIDTA, cash flow from operations, market capitalization.

Figure 39:
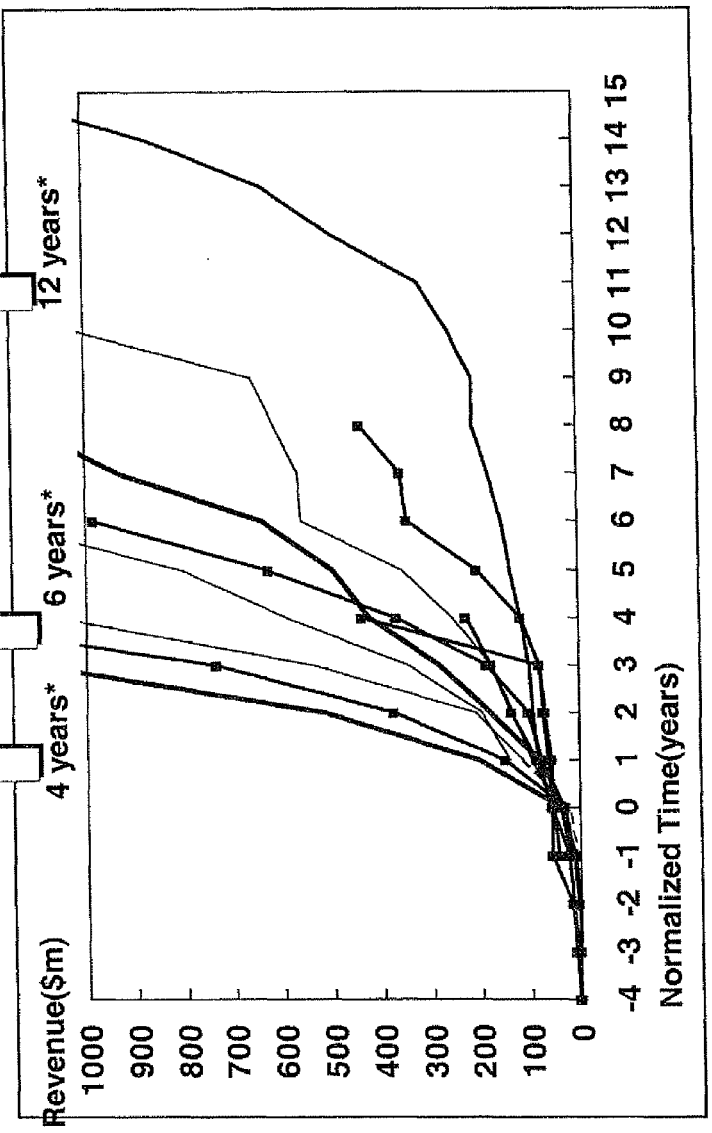
FIG. 39 is a graph of examples of revenue growth of selected exemplary businesses.

A method of investing in businesses in accordance with the principles of one embodiment of the present invention comprises preferentially investing in target businesses selected by a method of identifying businesses with above-average revenue growth potential by selecting from a plurality of companies with annual revenues of at least $30 million, those companies with revenue growth rates that are within the growth rates of the three trajectories identified (reference FIGS. 3A-3H). An example of companies on trajectory reference FIG. 39.

A method of allocating resources among several target businesses comprising an enterprise in accordance with the principles of one embodiment of the present invention comprises preferentially allocating resources to target businesses in the enterprise selected by identifying a plurality of model businesses that have achieved a desired financial performance; identifying at least one financial statistic common to the model businesses; comparing the at least one financial statistic common to the model businesses with at least one financial statistic of the at least one target business; evaluating the at least one target business based its comparison with the model businesses. The model businesses and the target businesses and financial statistics used are preferably the same as described above.

A method of ranking at least two target businesses based upon outlook for financial performance in accordance with the principles of one embodiment of this invention comprises identifying a plurality of model businesses that have achieved a desired financial performance; identifying at least one financial statistic common to the model businesses; and ranking each of the target businesses based upon the at least one financial, managing the finances of the target business to match the financial statistic common to the model businesses. The model businesses and the target businesses and financial statistics used are preferably the same as described above.

A method of managing a target business to achieve a desired financial performance in accordance with the principles of one embodiment of this invention comprises identifying a plurality of model businesses that have achieved a desired financial performance; identifying at least one financial statistic common to the model businesses; managing the finances of the target business to match the financial statistic common to the model businesses. The model businesses and the target businesses and financial statistics used are preferably the same as described above.

A method of identifying businesses with above-average growth potential in accordance with the principles of one embodiment of this invention comprises selecting from a plurality of companies with annual revenues of at least $25 million, those companies whose gross margins exceed 55%, whose EBITDA exceed 20%, and who had a positive case flow since annual revenues exceeded 50 million.

A method of investing comprising preferentially investing in businesses with above-average growth potential in accordance with the principles of one embodiment of this invention comprises selecting from a plurality of companies with annual revenues of at least $25 million, those companies whose revenue growth adheres to the process in FIGS. 3A-3H and whose revenue and revenue growth screen for above average revenue growth; for the information technology sector-gross margins exceed 55%, whose EBITDA exceed 20%, and who had a positive case flow since annual revenues exceeded $30 million.

A method of allocating resources between businesses in accordance with the principles of one embodiment of this invention comprises preferentially allocating resources in businesses with above-average growth potential by selecting from a plurality of companies with annual revenues of at least $25 million, those companies whose gross margins exceed 55%, whose EBITDA exceed 20%, and who had a positive case flow since annual revenues exceeded $30 million.

A method of managing a business for above-average growth potential in accordance with the principles of one embodiment of this invention comprises maintaining gross margins in excess of 55%, EBITDA in excess of 20%, and a positive case flow after annual revenues exceeded $30 million.

A method of identifying target businesses with above-average potential to achieve a selected financial performance target, in accordance with the principles of one embodiment of this invention comprises identifying a plurality of model businesses which have already achieved the selected financial performance target; identifying financial statistics common to the identified model businesses; and screening target businesses for the financial statistics common to the identified businesses. The financial statistics preferably include: at least one of historic annual sales, annual sales growth rates, and time since found to exceed selected annual sales thresholds, gross margins, SG&A, R&D expense, EBIDTA, cash flow from operations, market capitalization.

A method of identifying a businesses with above average growth potential in accordance with the principles of one embodiment of this invention comprises filtering out businesses that have less than about $50,000,000 in annual revenues, and more preferably filtering out businesses that did not reach $50,000,000 within seven years from founding, and still more preferably filtering our businesses that did not reach $50,000,000 within about five years from founding.

In one embodiment, the method can further include filtering out businesses that in the year in which annual revenues first exceeded $30,000,000, did not have an annual revenue growth rate of at least about 30%, and more preferably filtering out businesses that in the year in which annual revenues first exceeded $30,000,000, did not have an annual revenue growth rate of at least about 100%. In another preferred embodiment the method can include filtering out businesses that in the year in which annual revenues first exceeded $50,000,000, did not have an annual revenue growth rate of at least about 30%, and more preferably filtering out businesses that in the year in which annual revenues first exceeded $50,000,000, did not have an annual revenue growth rate of at least about 100%.

In some embodiments the method includes filtering out businesses that did not maintain gross margins of at least fifty-five percent after annual revenues first exceeded $50,000,000, and more preferably filtering out businesses that did not maintain gross margins of at least sixty percent after annual revenues first exceeded $50,000,000.

In some embodiments the method also includes filtering out businesses that did not maintain EBITA of at least 20% after annual revenues first exceeded $50,000,000.

In some embodiments the method also includes filtering out businesses that did not maintain positive cash flow after annual revenues first exceeded $50,000,000, and more preferably filtering out businesses that did not maintain positive cash flow of at least 10% of annual revenues after annual revenues first exceeded $50,000,000.

In some embodiments, the method comprises filtering out businesses that did not maintain gross margins of at least fifty-five percent, EBITA of at least 20%, and positive cash flow after annual revenues first exceeded $50,000,000, and more preferably filtering out businesses that did not maintain gross margins of at least sixty percent after annual revenues first exceeded $50,000,000 and filtering out businesses that did not maintain positive cash flow of at least 10% of annual revenues after annual revenues first exceeded $50,000,000. In some of the preferred embodiments businesses are further filtered out depending based upon market capitalization to annual revenue ratio, for example businesses whose ratio is less than 3, or more preferably 4 or 5.

In some embodiments, the method comprises filtering out businesses that did not have an employee of a customer on its board of directors and/or a customer as an investor. In some preferred embodiments the method comprises filtering out businesses that did not recruit at least one officer from a competitor. In some preferred embodiments the method comprises filtering out businesses that do not have the fastest growing sales in at least one category. In some preferred embodiments the method comprises filtering out businesses that do not have a marquee customer, for example a publicly traded company that allows its name to be used in connection in connection with promotion of the businesses' products or services, and more preferably filtering out businesses that do not have a marquee customer with a representative on the board of directors. In some preferred embodiments the method includes filtering out businesses that do not have a co-selling agreement with a publicly traded entity, and more preferably filtering out businesses that do not have a joint selling or joint marketing arrangement with a publicly traded entity that has an officer, director, or employee that sits on the board of the business.

In some embodiments the method further comprises filtering out businesses that do not have as a director an officer, director, or employee from a company that purchases the businesses' products or services, or an officer, director or employee from a company that jointly sells a product or service with the business' product or service, or businesses that do not have as a director an officer, director, or employee from a company that purchases the businesses' products or services, and an officer, director or employee from a company that jointly sells a product or service with the business' product or service.

A method of comparing two or more businesses to determine the business with the greatest potential for growth, in accordance with the principles of one embodiment of this invention comprises evaluating each of the companies under consideration and scoring them based upon; scoring the founding team based on a plurality of specified factors; scoring the engineering team based upon a plurality of specified factors; scoring the technology discontinuity/value proposition based upon a plurality of specified factors; scoring the management team based upon a plurality of specified factors; scoring the investors based upon a plurality of specified factors; scoring the strategic alliances based upon a plurality of specified factors; scoring the market segment based upon a plurality of specified factors; scoring the marquee customers based upon a plurality of specified factors; and selecting the company with the greater cumulative score.

A method of comparing two or more businesses to determine the business with the greatest potential for growth in accordance with the principles of one embodiment of this invention comprises evaluating each of the companies under consideration and scoring them based upon: scoring the founding team based on a plurality of specified factors; scoring the engineering team based upon a plurality of specified factors; scoring the technology discontinuity/value proposition based upon a plurality of specified factors; scoring the management team based upon a plurality of specified factors; scoring the investors based upon a plurality of specified factors; scoring the strategic alliances based upon a plurality of specified factors; scoring the market segment based upon a plurality of specified factors; scoring the marquee customers based upon a plurality of specified factors; and selecting companies with scores in excess of a predetermined threshold.

The methods can also be used as part of a method of investing. In accordance with this aspect of the invention, investments would preferentially be made in companies with above-average prospects for growth, identified by the method various evaluation methods of this invention. The methods can also be used as a part of a method of managing an investment portfolio. In accordance with this aspect of the invention, the portfolio is preferentially investing in businesses with above-average growth potential selected in accordance with the various evaluation methods of this invention. The methods can also be applied to the active management of a business.

In another aspect of the present disclosure, a computerized method is provided for identifying target businesses with above-average potential to achieve a selected financial performance target of $1 Billion in revenue within a predetermined timeframe. The computerized method comprises using a computer having a software program that is configured to identify financial statistics on revenue growth data for businesses that have achieved a financial performance target of $30 to $70 million in annual revenue, and to determine minimum and maximum curves for screening the identified businesses. The financial statistics on revenue growth data for various businesses may be acquired by financial statistics providers such as Standard and Poor's Compustat Database, for example, or from Thomson Reuters. Standard and Poor's also provides software programs that are capable of performing the step of screening financial data of various businesses to identify those businesses that have achieved a financial performance target of $30 to $70 million in annual revenue. Such software may include Standard and Poor's Backtester software, combined with customized formulae and statistical algorithms which are programmed into the Compustat Database and the Backtesting software. The computer and software program for performing the computerized method are further configured to determine revenue growth trajectory curves from the revenue growth rate data for the identified businesses, from which an inflection point in the revenue growth rate curve may be identified where annual revenue is in the range of $30 million to $70 million. The computer and software program for performing the computerized method are further configured to determine an exponential equation defining a maximum curve associated with a mean 4 year trajectory of revenue growth to $1 billion in revenue. (See FIG. 3D for mean 4 year timeframe and equation defining Max Rev 4 year bound of 4 year mean). The computer and software program for performing the computerized method are further configured to determine an exponential equation defining a minimum curve for a mean 12 year trajectory of revenue growth to $1 billion in revenue. (See FIG. 3F for mean 12 year timeframe and equation defining Max. Rev 12 year bound of 12 year mean). Exemplary software programs that are capable of determining an exponential equation defining the above minimum and maximum curves may include Excel spreadsheets, Standard and Poor's Compustat Databases and Backtester Software, or other suitable software programs.

The computer and software program for performing the computerized method are further configured to screen for target businesses and select those businesses, based on the revenue level and revenue growth rate data for each business, to determine which target businesses have revenue growth rate trajectory curves that fall within the bounds of the above minimum and maximum curves for achieving a forecasted revenue growth to $1 Billion in revenue within a timeframe of between 4 and 12 years from the time of the inflection point in the revenue growth trajectory curve of the identified businesses. Specifically, the computerized method screens businesses that have at least $30,000,000 in annual revenues based on the revenue growth data for the identified businesses, wherein screening includes identifying an inflection point in the deter wined revenue growth rate trajectory curve from which the business's revenue can be normalized, and selecting target businesses that have revenue growth rate trajectory curves that fall within the bounds of the above minimum and maximum curves. The computer and software program for performing the computerized method are further configured to output a list of the target businesses selected by the above screening. One example of a software program configured to perform the above screening may include the combination of Standard and Poor's Backtester software, which may be programmed and combined with customized formulae and statistical algorithms, and a customized database built on Oracle's Enterprise Class Database software, where the customized formulae are programmed into the Backtesting software and/or Compustat Database. The computerized method may further include the step of selecting one or more of the identified target businesses for inclusion in an investment fund. Furthermore, the computerized method may further include the step of segregating identified target businesses whose revenue growth rate trajectory curves fall within a trajectory range for achieving a revenue growth to at least $1 Billion in a mean of 4 years from the inflection point in the revenue growth rate trajectory curve of the identified target business, or whose revenue growth rate trajectory curves fall within a trajectory range for achieving a revenue growth to at least $1 Billion in a mean of 6 years from the inflection point in the revenue growth rate trajectory curve of the identified target business. This provides for ranking businesses into first, second and third trajectory ranges associated with exponential growth curves corresponding to 4, 6 and 12 year means of revenue growth to $1 Billion. It should be noted that while the above embodiment screens publically traded companies, the method may be utilized to screen a plurality of privately owned companies, where financial data is available for such private companies. Additionally, the above method may be utilized to identified and/or rank target businesses having revenue growth rate curves that fall between the bounds of exponential equations defining a minimum curve associated with a trajectory of revenue growth to $10 billion and a maximum curve associated with a trajectory of revenue growth to $10 billion, within a given timeframe from the time of the identified inflection point in the revenue growth trajectory curve of the identified businesses.

Figure 40:
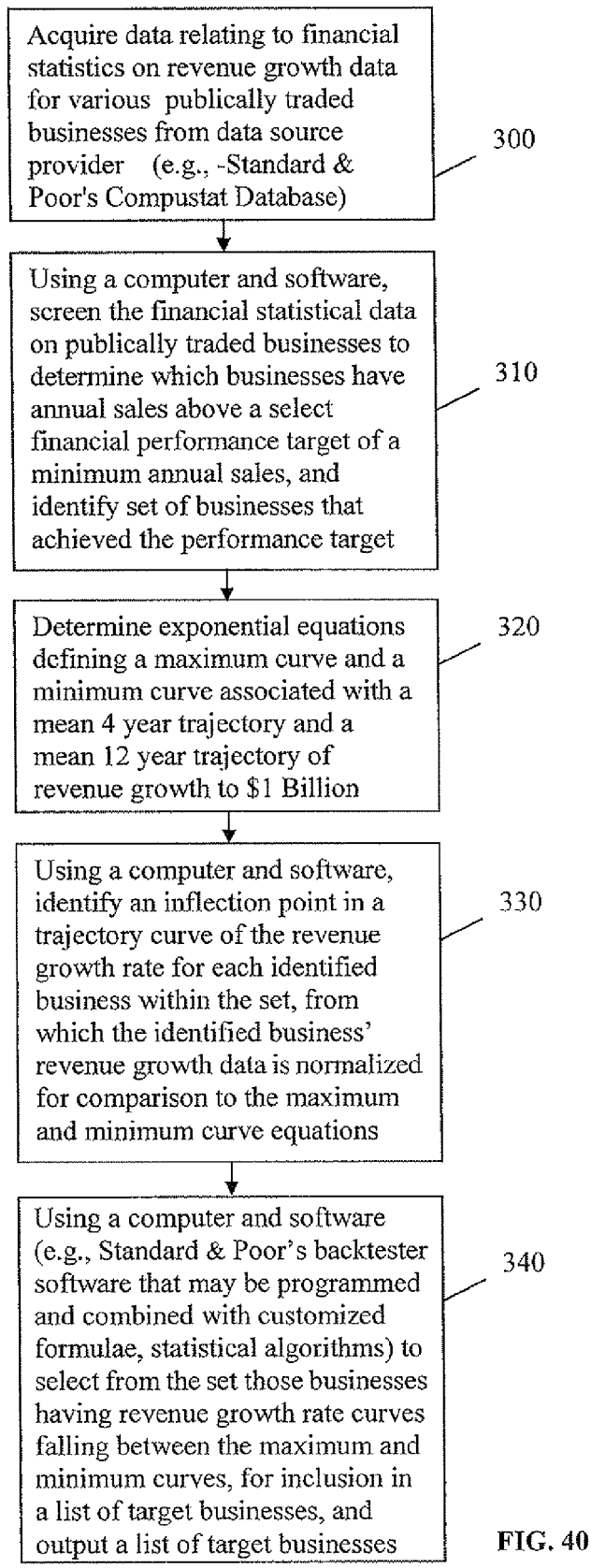
FIG. 40 is a flow chart illustrating one embodiment of a computerized method of identifying target businesses with above-average potential to achieve a selected financial performance target.

Referring to FIG. 40, one preferred embodiment of a computerized method of identifying target businesses with above-average potential to achieve a selected financial performance target of $1 Billion in revenue within a predetermined timeframe is shown. The method comprises acquiring data relating to financial statistics on revenue growth data for various publically traded businesses from data source provider at step 300. The method further includes the step of screening the financial statistical data on publically traded businesses, using a computer and software, to determine which businesses have annual sales above a select financial performance target of a minimum annual sales at 310. Upon completion of the above screening, the method identifies a set of businesses from the various publically traded businesses that have achieved the performance target of $30 million to $70 million in annual revenue (conclusion of step 310). Using a computer, the method then determines at step 320 a maximum curve associated with a mean 4 year trajectory of revenue growth to $1 billion, defined by an equation $Y=86.45\ x^2-206.31x+139.23$, where y=revenue and x=time in years. (See FIG. 3D for mean 4 year timeframe and equation defining Max Rev 4 year bound of 4 year mean). The method also determines a minimum curve associated with a mean 12 year trajectory of revenue growth to $1 billion, defined by an equation $Y=25.313\ e^{0.1926X}$, where y=revenue and x=time in years. (See FIG. 3F for mean 12 year timeframe and equation defining Max. Rev 12 year bound of 12 year mean). Using a computer and software, the method identifies at step 330 an inflection point in a trajectory curve of the revenue growth rate for each identified business within the set, from which the identified business' revenue growth data is normalized for comparison to the maximum and minimum curve equations. The method then performs step 340, using a computer and software such as Standard and Poor's Backtester software that may be programmed and combined with customized formulae and statistical algorithms, to select from the set of identified businesses those businesses having revenue growth rate trajectory curves falling between the maximum and minimum curves, for inclusion in a list of target businesses. Lastly, the method outputs a list of target businesses (conclusion of step 340), which target businesses are identified as being forecasted to achieve a revenue growth to $1 Billion within a time frame of between 4 years and 12 years from the time of the inflection point in the revenue growth rate trajectory curve for the target business.

TABLE I

List of 4, 6, 12 year companies considered in financial analysis selected from the list of companies considered based on: revenue at IPO less than $170 million and followed pure 4, 6 or 12 year revenue trajectory from the inflection point to $1 Billion in revenue:

| | Company | Ticker | Description | Year @ $1B revenue |
|---|---|---|---|---|
| | 4 Year Companies | | | |
| 1 | NVR INC | NVR | OPERATIVE BUILDERS | 1988 |
| 2 | MANPOWER INC/WI | MAN | HELP SUPPLY SERVICES | 1989 |
| 3 | ORACLE CORP | ORCL | PREPACKAGED SOFTWARE | 1990 |

TABLE I-continued

List of 4, 6, 12 year companies considered in financial analysis selected from the list of companies considered based on: revenue at IPO less than $170 million and followed pure 4, 6 or 12 year revenue trajectory from the inflection point to $1 Billion in revenue:

| | Company | Ticker | Description | Year @ $1B revenue |
|---|---|---|---|---|
| 4 | CISCO SYSTEMS INC | CSCO | COMPUTER COMMUNICATION EQUIP | 1994 |
| 5 | TIME WARNER INC | TWX | MOTION PIC, VIDEOTAPE PRODTN | 1996 |
| 6 | BUDGET GROUP INC -CL A | BDGPA | AUTO RENT & LEASE, NO DRIVERS | 1997 |
| 7 | PEOPLESOFT INC | PSFT | PREPACKAGED SOFTWARE | 1998 |
| 8 | INTEGRATED ELECTRICAL SVCS | IES | ELECTRICAL WORK | 1999 |
| 9 | BROADCOM CORP -CL A | BRCM | SEMICONDUCTOR, RELATED DEVICE | 2000 |
| 10 | E TRADE FINANCIAL CORP | ET | SECURITY BROKERS & DEALERS | 2000 |
| 11 | IDT CORP | IDT.C | PHONE COMM EX RADIOTELEPHONE | 2000 |
| 12 | SIEBEL SYSTEMS INC | SEBL | PREPACKAGED SOFTWARE | 2000 |
| 13 | UNITEDGLOBALCOM INC -CL A | UCOMA | COMMUNICATIONS SERVICES, NEC | 2000 |
| 14 | VERITAS SOFTWARE CO | VRTSE | PREPACKAGED SOFTWARE | 2000 |
| 15 | EARTHLINK INC | ELNK | CMP PROGRAMMING, DATA PROCESS | 2001 |
| 16 | NVIDIA CORP | NVDA | SEMICONDUCTOR, RELATED DEVICE | 2001 |
| 17 | XO COMMUNICATIONS INC -CL A | 3XOCM | PHONE COMM EX RADIOTELEPHONE | 2001 |
| 18 | EBAY INC | EBAY | CMP PROGRAMMING, DATA PROCESS | 2002 |
| 19 | KING PHARMACEUTICALS INC | KG | PHARMACEUTICAL PREPARATIONS | 2002 |
| 20 | VERISIGN INC | VRSN | PREPACKAGED SOFTWARE | 2002 |
| | 6 Year Companies | | | |
| 1 | APPLE COMPUTER INC | AAPL | ELECTRONIC COMPUTERS | 1984 |
| 2 | LIZ CLAIBORNE INC | LIZ | WOMENS, MISSES, JRS OUTERWEAR | 1987 |
| 3 | SUN MICROSYSTEMS INC | SUNW | ELECTRONIC COMPUTERS | 1988 |
| 4 | MICROSOFT CORP | MSFT | PREPACKAGED SOFTWARE | 1990 |
| 5 | PACIFICARE HEALTH SYSTEMS | PHS | HOSPITAL & MEDICAL SVC PLANS | 1991 |
| 6 | NOVELL INC | NOVL | CMP PROGRAMMING, DATA PROCESS | 1993 |
| 7 | STAPLES INC | SPLS | MISC SHOPPING GOODS STORES | 1993 |
| 8 | TECH DATA CORP | TECO | COMPUTERS & SOFTWARE-WHSL | 1993 |
| 9 | SOLECTRON CORP | SLR | PRINTED CIRCUIT BOARDS | 1994 |
| 10 | ATMEL CORP | ATML | SEMICONDUCTOR, RELATED DEVICE | 1996 |
| 11 | EXPRESS SCRIPTS INC | ESRX | INS AGENTS, BROKERS & SERVICE | 1997 |
| 12 | FLEXTRONICS INTERNATIONAL | FLEX | PRINTED CIRCUIT BOARDS | 1997 |
| 13 | D R HORTON INC | DHI | OPERATIVE BUILDERS | 1998 |
| 14 | EQUITY RESIDENTIAL | EQR | REAL ESTATE INVESTMENT TRUST | 1998 |
| 15 | STARBUCKS CORP | SBUX | MISC FOOD PREPS, KINDRED PDS | 1998 |
| 16 | TOMMY HILFIGER CORP | TOM | MEN, YTH, BOYS FRNSH, WRK CLTHG | 1998 |
| 17 | US CELLULAR CORP | USM | RADIOTELEPHONE COMMUNICATION | 1998 |
| 18 | BLYTH INC | BTH | MISC MANUFACTURNG INDUSTRIES | 1999 |
| 19 | LITHIA MOTORS INC -CL A | LAD | AUTO DEALERS, GAS STATIONS | 1999 |
| 20 | RENT-A-CENTER INC | RCII | EQUIP RENTAL & LEASING, NEC | 1999 |
| 21 | EGL INC | EAGL | ARRANGE TRANS-FREIGHT, CARGO | 2000 |
| 22 | PETCO ANIMAL SUPPLIES INC | PETC | RETAIL STORES | 2000 |
| 23 | WATSON PHARMACEUTICALS INC | WPI | PHARMACEUTICAL PREPARATIONS | 2001 |
| 24 | WESTERN WIRELESS CORP -CL A | WWCA | RADIOTELEPHONE COMMUNICATION | 2001 |
| 25 | CENTRAL PARKING CORP | CPC | AUTO REPAIR, SERVICES, PARKING | 2002 |
| 26 | ANDRX CORP | ADRX | DRUGS AND PROPRIETARY-WHSL | 2003 |
| 27 | CAREER EDUCATION CORP | CECO | EDUCATIONAL SERVICES | 2003 |
| 28 | MEDIACOM COMMUNICATIONS CORP | MCCC | CABLE AND OTHER PAY TV SVCS | 2003 |
| 29 | MEDIMMUNE INC | MEDI | BIOLOGICAL PDS, EX DIAGNSTICS | 2003 |
| | 12 Year Companies | | | |
| 1 | MAGNA INTERNATIONAL -CL A | MGA | MOTOR VEHICLE PART, ACCESSORY | 1988 |
| 2 | DELL INC | DELL | ELECTRONIC COMPUTERS | 1992 |
| 3 | HUNT (JB) TRANSPRT SVCS INC | JBHT | TRUCKING, EXCEPT LOCAL | 1993 |
| 4 | FIFTH THIRD BANCORP | FITB | COMMERCIAL BANKS | 1994 |
| 5 | BARRICK GOLD CORP | ABX | GOLD AND SILVER ORES | 1995 |
| 6 | BB&T CORP | BBT | COMMERCIAL BANKS | 1995 |
| 7 | BRINKER INTL INC | EAT | EATING PLACES | 1995 |
| 8 | CABLEVISION SYS CORP -CL A | CVC | CABLE AND OTHER PAY TV SVCS | 1995 |
| 9 | LSI LOGIC CORP | LSI | SEMICONDUCTOR, RELATED DEVICE | 1995 |
| 10 | MICHAELS STORES INC | MIK | HOBBY, TOY, AND GAME SHOPS | 1995 |
| 11 | SUN HEALTHCARE GROUP INC | SUNH | SKILLED NURSING CARE FAC | 1995 |
| 12 | AIRGAS INC | ARG | INDUSTRIAL MACH & EQ-WHSL | 1996 |
| 13 | FRANKLIN RESOURCES INC | BEN | INVESTMENT ADVICE | 1996 |

TABLE I-continued

List of 4, 6, 12 year companies considered in financial analysis selected from the list of
companies considered based on: revenue at IPO less than $170 million and followed pure
4, 6 or 12 year revenue trajectory from the inflection point to $1 Billion in revenue:

| | Company | Ticker | Description | Year @ $1B revenue |
|---|---|---|---|---|
| 14 | SYNOVUS FINANCIAL CP | SNV | COMMERCIAL BANKS | 1996 |
| 15 | TELEPHONE & DATA | TDS | RADIOTELEPHONE COMMUNICATION | 1996 |
| 16 | WASTE MANAGEMENT INC | WMI | REFUSE SYSTEMS | 1996 |
| 17 | BED BATH & BEYOND INC | BBBY | HOME FURNITURE & EQUIP STORE | 1997 |
| 18 | BELO CORP -SER A COM | BLC | NEWSPAPER: PUBG, PUBG & PRINT | 1997 |
| 19 | CBRL GROUP INC | CBRL | EATING PLACES | 1997 |
| 20 | CINTAS CORP | CTAS | MEN, YTH, BOYS FRNSH, WRK CLTHG | 1997 |
| 21 | KLA-TENCOR CORP | KLAC | OPTICAL INSTRUMENTS & LENSES | 1997 |
| 22 | NEIGHBORCARE INC | NCRX | SKILLED NURSING CARE FAC | 1997 |
| 23 | PIER 1 IMPORTS INC/DE | PIR | HOME FURNITURE & EQUIP STORE | 1997 |
| 24 | AMERICAN PWR CNVRSION | APCC | ELECTRICAL INDL APPARATUS | 1998 |
| 25 | BMC SOFTWARE INC | BMC | PREPACKAGED SOFTWARE | 1998 |
| 26 | DREYER'S GRAND ICE CRM HLDGS | DRYR | ICE CREAM & FROZEN DESSERTS | 1998 |
| 27 | ELECTRONIC ARTS INC | ERTS | PREPACKAGED SOFTWARE | 1998 |
| 28 | EXPEDITORS INTL WASH INC | EXPD | ARRANGE TRANS-FREIGHT, CARGO | 1998 |
| 29 | FIDELITY NATIONAL FINL INC | FNF | TITLE INSURANCE | 1998 |
| 30 | FISERV INC | FISV | CMP PROCESSING, DATA PREP SVC | 1998 |
| 31 | GENENTECH INC | DNA | PHARMACEUTICAL PREPARATIONS | 1998 |
| 32 | HIBERNIA CORP -CL A | HIB | COMMERCIAL BANKS | 1998 |
| 33 | LEGG MASON INC | LM | SECURITY BROKERS & DEALERS | 1998 |
| 34 | PAYCHEX INC | PAYX | ACCOUNT, AUDIT, BOOKKEEP SVCS | 1998 |
| 35 | SIERRA HEALTH SERVICES | SIE | HOSPITAL & MEDICAL SVC PLANS | 1998 |
| 36 | SUNGARD DATA SYSTEMS INC | SDS | PREPACKAGED SOFTWARE | 1998 |
| 37 | TOLL BROTHERS INC | TOL | OPERATIVE BUILDERS | 1998 |
| 38 | WILLIAMS-SONOMA INC | WSM | HOME FURNITURE & EQUIP STORE | 1998 |
| 39 | ADOBE SYSTEMS INC. | ADBE | PREPACKAGED SOFTWARE | 1999 |
| 40 | MASONITE INTERNATIONAL CORP | MHM | MILLWORK, VENEER, PLYWOOD | 1999 |
| 41 | MENS WEARHOUSE INC | MW | APPAREL AND ACCESSORY STORES | 1999 |
| 42 | PRICE (T. ROWE) GROUP | TROW | INVESTMENT ADVICE | 1999 |
| 43 | TALISMAN ENERGY INC | TLM | CRUDE PETROLEUM & NATURAL GS | 1999 |
| 44 | WERNER ENTERPRISES INC | WERN | TRUCKING, EXCEPT LOCAL | 1999 |
| 45 | WORLD FUEL SERVICES CORP | INT | PETROLEUM, EX BULK STATN-WHSL | 1999 |
| 46 | XILINX INC | XLNX | SEMICONDUCTOR, RELATED DEVICE | 1999 |
| 47 | ACXIOM CORP | ACXM | CMP PROCESSING, DATA PREP SVC | 2000 |
| 48 | AMERN EAGLE OUTFITTERS INC | AEOS | FAMILY CLOTHING STORES | 2000 |
| 49 | BIOMET INC | BMET | ORTHO, PROSTH, SURG APPL, SUPLY | 2000 |
| 50 | CLAIRES STORES INC | CLE | APPAREL AND ACCESSORY STORES | 2000 |
| 51 | D&K HEALTHCARE RESOURCES INC | DKHR | DRUGS AND PROPRIETARY-WHSL | 2000 |
| 52 | HOVNANIAN ENTRPRS INC -CL A | HOV | OPERATIVE BUILDERS | 2000 |
| 53 | INVACARE CORP | IVC | ORTHO, PROSTH, SURG APPL, SUPLY | 2000 |
| 54 | MARKEL CORP | MKL | SURETY INSURANCE | 2000 |
| 55 | MBIA INC | MBI | SURETY INSURANCE | 2000 |
| 56 | NATIONAL COMMERCE FINANCIAL | NCF | COMMERCIAL BANKS | 2000 |
| 57 | NORTH FORK BANCORPORATION | NFB | COMMERCIAL BANKS | 2000 |
| 58 | REGIS CORP/MN | RGS | PERSONAL SERVICES | 2000 |
| 59 | TIMBERLAND CO -CL A | TBL | FOOTWEAR, EXCEPT RUBBER | 2000 |
| 60 | MAXIM INTEGRATED PRODUCTS | MXIM | SEMICONDUCTOR, RELATED DEVICE | 2001 |
| 61 | O REILLY AUTOMOTIVE INC | ORLY | AUTO AND HOME SUPPLY STORES | 2001 |
| 62 | PRIDE INTERNATIONAL INC | PDE | DRILLING OIL AND GAS WELLS | 2001 |
| 63 | SHAW GROUP INC | SGR | ENGINEERING SERVICES | 2001 |
| 64 | SYMANTEC CORP | SYMC | PREPACKAGED SOFTWARE | 2001 |
| 65 | TRENWICK GROUP LTD | TWKGQ | FIRE, MARINE, CASUALTY INS | 2001 |
| 66 | VARCO INTERNATIONAL INC | VRC | OIL & GAS FIELD MACHY, EQUIP | 2001 |
| 67 | WESTCORP | WES | SAVINGS INSTN, FED CHARTERED | 2001 |
| 68 | ALPHARMA INC -CL A | ALO | PHARMACEUTICAL PREPARATIONS | 2002 |
| 69 | APOLLO GROUP INC -CL A | APOL | EDUCATIONAL SERVICES | 2002 |
| 70 | COMMERCE BANCORP INC/NJ | CBH | COMMERCIAL BANKS | 2002 |
| 71 | GENERAL GROWTH PPTYS INC | GGP | REAL ESTATE INVESTMENT TRUST | 2002 |
| 72 | GUITAR CENTER INC | GTRC | HOME FURNITURE & EQUIP STORE | 2002 |
| 73 | M/I HOMES INC | MHO | OPERATIVE BUILDERS | 2002 |
| 74 | PRIORITY HLTHCARE CP -CL B | PHCC | DRUGS AND PROPRIETARY-WHSL | 2002 |
| 75 | RADIAN GROUP INC | RDN | SURETY INSURANCE | 2002 |
| 76 | THOR INDUSTRIES INC | THO | MISC TRANSPORTATION EQUIP | 2002 |
| 77 | AMBAC FINANCIAL GP | ABK | SURETY INSURANCE | 2003 |
| 78 | LANDRYS RESTAURANTS INC | LNY | EATING PLACES | 2003 |
| 79 | LINCARE HOLDINGS INC | LNCR | MISC HEALTH & ALLIED SVC, NEC | 2003 |
| 80 | NEWFIELD EXPLORATION CO | NFX | CRUDE PETROLEUM & NATURAL GS | 2003 |
| 81 | PACIFIC SUNWEAR CALIF INC | PSUN | FAMILY CLOTHING STORES | 2003 |

TABLE I-continued

List of 4, 6, 12 year companies considered in financial analysis selected from the list of companies considered based on: revenue at IPO less than $170 million and followed pure 4, 6 or 12 year revenue trajectory from the inflection point to $1 Billion in revenue:

| | Company | Ticker | Description | Year @ $1B revenue |
|---|---|---|---|---|
| 82 | PENN NATIONAL GAMING INC | PENN | MISC AMUSEMENT & REC SERVICE | 2003 |
| 83 | PIONEER NATURAL RESOURCES CO | PXD | CRUDE PETROLEUM & NATURAL GS | 2003 |
| 84 | SCP POOL CORP | POOL | MISC DURABLE GOODS-WHSL | 2003 |
| 85 | SYNOPSYS INC | SNPS | PREPACKAGED SOFTWARE | 2003 |
| 86 | TOTAL SYSTEM SERVICES INC | TSS | BUSINESS SERVICES, NEC | 2003 |
| 87 | XTO ENERGY INC | XTO | CRUDE PETROLEUM & NATURAL GS | 2003 |
| | Breakout Companies | | | |
| 1 | REEBOK INTERNATIONAL LTD | RBK | RUBBER AND PLASTICS FOOTWEAR | 1987 |
| 2 | AMERICA WEST HLDG CP -CL B | AWA | AIR TRANSPORT, SCHEDULED | 1990 |
| 3 | CONSECO INC | CNO | ACCIDENT & HEALTH INSURANCE | 1991 |
| 4 | UNITEDHEALTH GROUP INC | UNH | HOSPITAL & MEDICAL SVC PLANS | 1992 |
| 5 | MCI INC | MCA | PHONE COMM EX RADIOTELEPHONE | 1993 |
| 6 | POLARIS INDS INC | PII | MISC TRANSPORTATION EQUIP | 1995 |
| 7 | CAREMARK RX INC | CMX | DRUG & PROPRIETARY STORES | 1996 |
| 8 | WYNDHAM INTERNATIONAL INC | WBR | HOTELS, MOTELS, TOURIST COURTS | 1998 |
| 9 | AMAZON.COM INC | AMZN | CATALOG, MAIL-ORDER HOUSES | 1999 |
| 10 | HOLLYWOOD ENTMT CORP | HLYW | VIDEO TAPE RENTAL | 1999 |
| 11 | US ONCOLOGY INC | USON | DRUGS AND PROPRIETARY-WHSL | 1999 |
| 12 | PRIMUS TELECOMM GROUP INC | PRTL | PHONE COMM EX RADIOTELEPHONE | 2000 |
| 13 | QUANTA SERVICES INC | PWR | ELECTRICAL WORK | 2000 |
| 14 | YAHOO INC | YHOO | CMP PROGRAMMING, DATA PROCESS | 2000 |
| 15 | AMERICAN TOWER CORP | AMT | COMMUNICATIONS SERVICES, NEC | 2001 |
| 16 | FELCOR LODGING TR INC | FCH | REAL ESTATE INVESTMENT TRUST | 2001 |
| 17 | MERITAGE CORP | MTH | OPERATIVE BUILDERS | 2002 |
| 18 | INTRAWEST CORP | IDR | MISC AMUSEMENT & REC SERVICE | 2003 |
| 19 | NEXTEL PARTNERS INC | NXTP | RADIOTELEPHONE COMMUNICATION | 2003 |
| 20 | PETROKAZAKHSTAN INC | PKZ | CRUDE PETROLEUM & NATURAL GS | 2003 |
| 21 | TAKE-TWO INTERACTIVE SFTWR | TTWO | PREPACKAGED SOFTWARE | 2003 |

What is claimed is:

1. A computerized method comprising:
identifying a plurality of businesses which have achieved a selected financial performance target of $30 million to $70 million in annual revenue;
identifying financial revenue growth rate statistics for each of the plurality of businesses to screen for exponential revenue growth companies, based upon data for the identified businesses obtained from financial databases;
determining exponential revenue growth trajectory curves from the revenue growth rate data for the identified businesses using a computer, to identify an inflection point in the revenue growth trajectory curve for each business that is indicative of where annual revenue is in the range of $30 million to $70 million;
determining an exponential equation defining a maximum curve for a mean 4 year trajectory of revenue growth to $1 billion in revenue, and an exponential equation defining a minimum curve for a mean 12 year trajectory of revenue growth to $1 billion in revenue, using a computer; and
screening target businesses that have at least $30,000,000 in annual revenues based on the revenue growth rate data for the identified businesses, wherein screening comprises identifying an inflection point in the determined revenue growth rate trajectory curve from which the business's revenue growth can be normalized, and selecting target businesses, based on the revenue level and revenue growth rate data for each business, by using a computer to determine which of the identified businesses have revenue growth rate trajectory curves that fall within the bounds of the minimum and maximum curves for achieving a forecasted revenue growth to $1 Billion in revenue within a predetermined timeframe of between 4 and 12 years from the time of the inflection point in the businesses' revenue growth trajectory curve; and
outputting a list of the target businesses selected by the above screening as having above-average potential to achieve a selected financial performance target of $1 Billion in revenue within the predetermined timeframe.

2. The computerized method of claim 1, further comprising the step of selecting one or more of the identified target businesses for inclusion in an investment fund.

3. The method according to claim 2 wherein each target business has at least 30% annual sales growth.

4. The method according to claim 3 wherein the each target business is less than seven years old.

5. The method according to claim 1 wherein the plurality of businesses are comprised of privately owned businesses.

6. The method according to claim 1 wherein the financial statistics include at least one of historic annual sales, annual sales growth rates, time since found to exceed selected annual sales thresholds, gross margins, SG&A, R&D expense, EBIDTA, cash flow from operations, market capitalization.

7. The method of claim 1 wherein the step of selecting target businesses includes identifying those target businesses whose trajectory curves determined from revenue growth rate data fall between the maximum curve for a mean 4 year trajectory of revenue growth to $1 billion in revenue, and the minimum curve for a mean 12 year trajectory of revenue growth to $1 billion in revenue, wherein the maximum curve for a mean 4 year trajectory of revenue growth to $1 billion in revenue is defined by the equation:

$$Y=86.45x^2-206.31x+139.23, \text{ where } y=\text{revenue and } x=\text{time in years,}$$

and the minimum curve for a mean 12 year trajectory of revenue growth to $1 billion in revenue is defined by the equation:

$$Y=25.313e^{0.1926X}, \text{ where } y=\text{revenue and } x=\text{time in years.}$$

8. The method of claim 7 wherein the inflection point in the trajectory curve of a business's revenue growth rate is a point where the business's revenue is in the range of $30 million to $70 million in sales that provides for normalizing various business's revenue trajectory curves relative to each other, and wherein the method further includes the step of normalizing the trajectory curve for the business's revenue growth rate, for comparing the business trajectory curve to the minimum and maximum curves irrespective of time.

9. The method of claim 8 further comprising the step of selecting those identified target businesses for inclusion in various types of investment funds.

10. The method of claim 1 further comprising the step of determining an exponential equation defining a maximum curve for a mean 4 year trajectory of revenue growth to $10 billion in revenue, and an exponential equation defining a minimum curve for a mean 12 year trajectory of revenue growth to $10 billion in revenue, using a computer.

11. The method of claim 1 wherein the equation defining the maximum curve for a mean 4 year trajectory is an equation selected from the group consisting of an exponential equation, a logarithmic equation, a geometric-progression equation, and combinations thereof, where said equations are configured to yield a curve of compounded revenue growth from $30 million to $1 Billion within 4 years.

12. The method of claim 11 wherein the equation defining a second minimum revenue growth the minimum curve for a mean 12 year trajectory is an equation selected from the group consisting of an exponential equation, a logarithmic equation, a geometric-progression equation, and combinations thereof, where said equation is configured to yield a curve of compounded revenue growth from $30 million to $1 Billion within 12 years.

13. The method of claim 1 further comprising the step of segregating those identified target businesses whose revenue growth rate trajectory curves fall within a trajectory range for achieving a revenue of at least $1 Billion in a mean of 4 years from the inflection point in the revenue growth rate trajectory curve of the identified target business.

14. The method of claim 1 further comprising the step of segregating those identified target businesses whose revenue growth rate trajectory curves fall within a trajectory range for achieving a revenue of at least $1 Billion in a mean of 6 years from the inflection point in the revenue growth rate trajectory curve of the identified target business.

15. The method according to claim 1 further comprising the step of filtering out businesses that in the year in which annual revenues first exceeded $30,000,000, did not have an annual revenue growth rate of at least about 50%.

16. A system for identifying target businesses system comprising one or more computers configured to:

receive and/or provide data identifying a plurality of businesses which have achieved a selected financial performance target of $30 million to $70 million in annual revenue;

receive and/or provide data identifying financial statistics on revenue growth rate data for the identified plurality of businesses;

determine exponential revenue growth rate trajectory curves from the revenue growth rate data for the identified businesses, to identify an inflection point in the revenue growth trajectory curve indicative of where annual revenue is in the range of $30 million to $70 million;

determine a maximum curve for a mean 4 year trajectory of revenue growth to $1 billion, using an equation $Y=86.45 x^2-206.31x+139.23$, and a minimum curve for a mean 12 year trajectory of revenue growth to $1 billion, using an equation $Y=25.313e^{0.1926X}$, where y=revenue and x=time in years;

screen and identify target businesses whose revenue growth rate trajectory curves determined from revenue growth rate data fall within the bounds between the maximum curve for a mean 4 year trajectory and the minimum curve for a mean 12 year trajectory, and select those target businesses for inclusion in a list of target businesses, which are forecasted to have revenue growth to $1 Billion in revenue within a predetermined timeframe of between 4 and 12 years from the time of the inflection point in the businesses' revenue growth trajectory curve; and output the list of selected target businesses as having above-average potential to achieve a selected financial performance target of $1 Billion in revenue within the predetermined timeframe.

17. The system of claim 16 wherein the one or more computers are further configured to segregate those identified target businesses whose revenue growth rate trajectory curves fall within a trajectory range for achieving a revenue growth to at least $1 Billion in a mean of 4 years from the inflection point in the revenue growth rate trajectory curve of the identified target business.

18. The system of claim 16 wherein the one or more computers are further configured to segregate those identified target businesses whose revenue growth rate trajectory curves fall within a trajectory range for achieving a revenue growth to at least $1 Billion in a mean of 6 years from the inflection point in the revenue growth rate trajectory curve of the identified target business.

19. The system of claim 16 wherein the one or more computers are further configured to segregate those identified target businesses whose revenue growth rate trajectory curves fall within a trajectory range for achieving a revenue growth to at least $1 Billion in a mean of 12 years from the inflection point in the revenue growth rate trajectory curve of the identified target business.

20. A computerized method of identifying target businesses, the method comprising:

acquiring data relating to financial statistics on revenue growth data for various publically traded businesses from data source provider;

screening the financial statistical data on publically traded businesses, using a computer and software, to determine which businesses have annual sales above a select financial performance target of $30 million to $70 million in annual revenue;

using a computer to determine a maximum curve for a mean 4 year trajectory of revenue growth to $1 billion, defined by an equation $Y=86.45 x^2-206.31x+139.23$, and a minimum curve for a mean 12 year trajectory of revenue growth to $1 billion, defined by an equation $Y=25.313e^{0.1926X}$, where y=revenue and x=time in years;

using a computer and software to identify an inflection point in a trajectory curve of the revenue growth rate for each identified business within the set, from which the identified business' revenue growth data is normalized for comparison to the maximum and minimum curve equations;

selecting from the set of identified businesses, using a computer and software, those businesses having revenue growth rate trajectory curves falling between the maximum and minimum curves, for inclusion in a list of target businesses, and outputting a list of the target businesses, which are identified as being forecasted to achieve a revenue growth to $1 Billion within a predetermined time frame of between 4 years and 12 years from the time of the inflection point in the revenue growth rate trajectory curve for the target business, and identifying the listed target businesses as having above-average potential to achieve a selected financial performance target of $1 Billion in revenue within the predetermined timeframe.

* * * * *